(12) United States Patent
Oh

(10) Patent No.: US 11,586,065 B2
(45) Date of Patent: Feb. 21, 2023

(54) SPATIALLY VARIABLE LIQUID CRYSTAL DIFFRACTION GRATINGS

(71) Applicant: Magic Leap, Inc., Plantation, FL (US)

(72) Inventor: Chulwoo Oh, Cedar Park, TX (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 17/174,163

(22) Filed: Feb. 11, 2021

(65) Prior Publication Data

US 2021/0311351 A1 Oct. 7, 2021

Related U.S. Application Data

(63) Continuation of application No. 15/815,449, filed on Nov. 16, 2017, now Pat. No. 10,921,630.
(Continued)

(51) Int. Cl.
| | | |
|---|---|---|
| G02F 1/1335 | (2006.01) | |
| G02B 27/42 | (2006.01) | |
| G02B 5/18 | (2006.01) | |
| G02B 27/01 | (2006.01) | |
| G02B 5/30 | (2006.01) | |
| G02B 6/34 | (2006.01) | |

(52) U.S. Cl.
CPC ..... *G02F 1/133504* (2013.01); *G02B 5/1833* (2013.01); *G02B 5/1847* (2013.01); *G02B 27/0172* (2013.01); *G02B 27/4205* (2013.01); *G02B 27/4272* (2013.01); *G02F 1/133524* (2013.01); *G02B 5/3058* (2013.01); *G02B 6/34* (2013.01); *G02B 2027/0178* (2013.01)

(58) Field of Classification Search
CPC .. G02F 2201/30; G02F 1/133504; G02B 5/18
See application file for complete search history.

(56) References Cited

U.S. PATENT DOCUMENTS 1,239,371 A 9/1917 Evans
4,693,544 A 9/1987 Yamasaki et al.
(Continued)

FOREIGN PATENT DOCUMENTS

CN 1146561 A 4/1997
CN 1690783 A 11/2005
(Continued)

OTHER PUBLICATIONS

U.S. Appl. No. 15/841,037, filed Dec. 13, 2017, Oh et al.
(Continued)

*Primary Examiner* — Mariam Qureshi
(74) *Attorney, Agent, or Firm* — Tobias Intellectual Property Law, PLLC

(57) ABSTRACT

The present disclosure relates to display systems and, more particularly, to augmented reality display systems. A diffraction grating includes a plurality of different diffracting zones having a periodically repeating lateral dimension corresponding to a grating period adapted for light diffraction. The diffraction grating additionally includes a plurality of different liquid crystal layers corresponding to the different diffracting zones. The different liquid crystal layers have liquid crystal molecules that are aligned differently, such that the different diffracting zones have different optical properties associated with light diffraction.

18 Claims, 22 Drawing Sheets

Related U.S. Application Data

(60) Provisional application No. 62/424,310, filed on Nov. 18, 2016.

(56) References Cited

U.S. PATENT DOCUMENTS

| | | | |
|---|---|---|---|
| 4,991,924 A | 2/1991 | Shankar et al. | |
| 5,187,372 A | 2/1993 | Clube | |
| 5,544,268 A | 8/1996 | Bishel et al. | |
| 5,566,982 A | 10/1996 | Lehureau et al. | |
| 5,808,797 A | 9/1998 | Bloom et al. | |
| 5,825,448 A * | 10/1998 | Bos | G02F 1/1396 349/128 |
| 5,838,407 A | 11/1998 | Chigrinov et al. | |
| 5,915,051 A | 6/1999 | Damask et al. | |
| 6,014,197 A | 1/2000 | Hikmet | |
| 6,040,885 A * | 3/2000 | Koike | G02F 1/133753 349/123 |
| 6,181,393 B1 | 1/2001 | Enomoto et al. | |
| 6,188,462 B1 | 2/2001 | Lavrentovich et al. | |
| 6,214,439 B1 | 4/2001 | Schadt et al. | |
| 6,334,960 B1 | 1/2002 | Willson et al. | |
| 6,542,671 B1 | 4/2003 | Ma et al. | |
| 6,680,767 B2 | 1/2004 | Coates et al. | |
| 6,690,845 B1 | 2/2004 | Yoshimura et al. | |
| 6,735,224 B2 | 5/2004 | Murry et al. | |
| 6,750,941 B2 | 6/2004 | Satoh et al. | |
| 6,850,221 B1 | 2/2005 | Tickle | |
| 6,873,087 B1 | 3/2005 | Choi et al. | |
| 6,900,881 B2 | 5/2005 | Sreenivasan et al. | |
| 6,982,818 B2 | 1/2006 | Riza et al. | |
| D514,570 S | 2/2006 | Ohta | |
| 7,023,466 B2 | 4/2006 | Favalora et al. | |
| 7,070,405 B2 | 7/2006 | Sreenivasan et al. | |
| 7,098,572 B2 | 8/2006 | Choi et al. | |
| 7,122,482 B2 | 10/2006 | Xu et al. | |
| 7,140,861 B2 | 11/2006 | Watts et al. | |
| 7,206,107 B2 | 4/2007 | Levola | |
| 7,341,348 B2 | 3/2008 | Eagan | |
| 7,375,784 B2 | 5/2008 | Smith et al. | |
| 7,471,362 B1 | 12/2008 | Jones | |
| 7,519,096 B2 | 4/2009 | Bouma et al. | |
| 7,573,640 B2 | 8/2009 | Nivon et al. | |
| 7,692,759 B2 | 4/2010 | Escuti et al. | |
| 7,705,943 B2 | 4/2010 | Kume et al. | |
| 8,064,035 B2 | 11/2011 | Escuti et al. | |
| 8,076,386 B2 | 12/2011 | Xu et al. | |
| 8,160,411 B2 | 4/2012 | Levola et al. | |
| 8,233,204 B1 | 7/2012 | Robbins et al. | |
| 8,248,458 B2 | 8/2012 | Schowengerdt et al. | |
| 8,264,623 B2 | 9/2012 | Marrucci | |
| 8,339,566 B2 | 12/2012 | Escuti et al. | |
| 8,508,848 B2 | 8/2013 | Saarikko | |
| 8,757,812 B2 | 6/2014 | Melville et al. | |
| 8,885,161 B2 | 11/2014 | Scheeline et al. | |
| 8,885,997 B2 | 11/2014 | Nguyen et al. | |
| 8,950,867 B2 | 2/2015 | Macnamara | |
| 9,081,426 B2 | 7/2015 | Armstrong | |
| 9,195,092 B2 | 11/2015 | Escuti et al. | |
| 9,215,293 B2 | 12/2015 | Miller | |
| D752,529 S | 3/2016 | Loretan et al. | |
| 9,310,559 B2 | 4/2016 | Macnamara | |
| 9,345,402 B2 | 5/2016 | Gao | |
| 9,348,143 B2 | 5/2016 | Gao et al. | |
| D758,367 S | 6/2016 | Natsume | |
| D759,657 S | 6/2016 | Kujawski et al. | |
| 9,417,452 B2 | 8/2016 | Schowengerdt et al. | |
| 9,470,906 B2 | 10/2016 | Kaji et al. | |
| 9,547,174 B2 | 1/2017 | Gao et al. | |
| 9,575,366 B2 | 2/2017 | Srivastava et al. | |
| 9,664,905 B2 | 5/2017 | Bohn et al. | |
| 9,671,566 B2 | 6/2017 | Abovitz et al. | |
| D794,288 S | 8/2017 | Beers et al. | |
| 9,740,006 B2 | 8/2017 | Gao | |
| 9,791,700 B2 | 10/2017 | Schowengerdt et al. | |
| D805,734 S | 12/2017 | Fisher et al. | |
| 9,846,967 B2 | 12/2017 | Schowengerdt et al. | |
| 9,851,563 B2 | 12/2017 | Gao et al. | |
| 9,857,591 B2 | 1/2018 | Welch et al. | |
| 9,874,749 B2 | 1/2018 | Bradski | |
| 9,933,684 B2 | 4/2018 | Brown et al. | |
| 10,025,160 B2 | 7/2018 | Park et al. | |
| 10,156,725 B2 | 12/2018 | TeKolste et al. | |
| 10,191,288 B2 | 1/2019 | Singer et al. | |
| 10,254,454 B2 | 4/2019 | Klug et al. | |
| 10,260,864 B2 | 4/2019 | Edwin et al. | |
| 10,261,318 B2 | 4/2019 | TeKolste et al. | |
| 10,345,592 B2 | 7/2019 | Samec et al. | |
| 10,466,478 B2 | 11/2019 | Klug et al. | |
| 10,466,561 B2 | 11/2019 | Oh | |
| 10,690,826 B2 | 6/2020 | Klug et al. | |
| 10,921,630 B2 | 2/2021 | Oh | |
| 11,067,860 B2 | 7/2021 | Oh et al. | |
| 2001/0024255 A1 | 9/2001 | Kitson et al. | |
| 2001/0024256 A1 | 9/2001 | Kitson et al. | |
| 2002/0097962 A1 | 7/2002 | Yoshimura et al. | |
| 2002/0126249 A1 | 9/2002 | Liang et al. | |
| 2002/0167638 A1 | 11/2002 | Byun et al. | |
| 2002/0172237 A1 | 11/2002 | Murry et al. | |
| 2003/0147112 A1 | 8/2003 | Mukawa | |
| 2003/0161573 A1 | 8/2003 | Ishida | |
| 2004/0007465 A1 | 1/2004 | Goldberg et al. | |
| 2004/0022888 A1 | 2/2004 | Sreenivasan et al. | |
| 2004/0120647 A1 | 6/2004 | Sakata et al. | |
| 2004/0150141 A1 | 8/2004 | Chao et al. | |
| 2004/0184163 A1 | 9/2004 | Nishioka et al. | |
| 2004/0191429 A1 | 9/2004 | Patrick | |
| 2005/0042391 A1 | 2/2005 | Ryan et al. | |
| 2005/0072959 A1 | 4/2005 | Moia et al. | |
| 2005/0073577 A1 | 4/2005 | Sudo et al. | |
| 2005/0232530 A1 | 10/2005 | Kekas | |
| 2005/0237471 A1 | 10/2005 | Kawamura | |
| 2005/0248705 A1 | 11/2005 | Smith et al. | |
| 2005/0253112 A1 | 11/2005 | Kelly et al. | |
| 2005/0270312 A1 | 12/2005 | Lad et al. | |
| 2005/0270461 A1 | 12/2005 | Kitson et al. | |
| 2006/0028436 A1 | 2/2006 | Armstrong | |
| 2006/0051024 A1 | 3/2006 | Levola | |
| 2006/0120247 A1 | 6/2006 | Noda et al. | |
| 2006/0121358 A1 | 6/2006 | Rich et al. | |
| 2006/0126179 A1 | 6/2006 | Levola | |
| 2006/0157443 A1 | 7/2006 | Mei | |
| 2006/0221448 A1 | 10/2006 | Nivon | |
| 2006/0227283 A1 | 10/2006 | Ooi et al. | |
| 2007/0031097 A1 | 2/2007 | Heikenfeld et al. | |
| 2007/0081123 A1 | 4/2007 | Lewis | |
| 2007/0229955 A1 | 10/2007 | Kawamura et al. | |
| 2007/0273957 A1 | 11/2007 | Zalevsky et al. | |
| 2008/0043166 A1 | 2/2008 | Liu et al. | |
| 2008/0043334 A1 | 2/2008 | Itzkovitch et al. | |
| 2008/0169479 A1 | 7/2008 | Xu et al. | |
| 2008/0278675 A1 | 11/2008 | Escuti et al. | |
| 2009/0009668 A1 | 1/2009 | Tan et al. | |
| 2009/0141216 A1 | 6/2009 | Marrucci | |
| 2009/0322970 A1 | 12/2009 | Iwane | |
| 2010/0066929 A1 | 3/2010 | Shemo et al. | |
| 2010/0142570 A1 | 6/2010 | Konttinen et al. | |
| 2010/0207964 A1 | 8/2010 | Kimmel et al. | |
| 2010/0225876 A1 | 9/2010 | Escuti et al. | |
| 2010/0260030 A1 | 10/2010 | Tao et al. | |
| 2010/0277803 A1 | 11/2010 | Pockett et al. | |
| 2010/0284090 A1 | 11/2010 | Simmonds | |
| 2010/0321781 A1 | 12/2010 | Levola et al. | |
| 2011/0002143 A1 | 1/2011 | Saarikko et al. | |
| 2011/0024950 A1 | 2/2011 | Kruglick | |
| 2011/0049761 A1 | 3/2011 | Mataki | |
| 2011/0051066 A1 | 3/2011 | Ahn et al. | |
| 2011/0194058 A1 | 8/2011 | Amos et al. | |
| 2011/0213664 A1 | 9/2011 | Osterhout et al. | |
| 2011/0242461 A1 | 10/2011 | Escuti et al. | |
| 2011/0242478 A1 | 10/2011 | Yakushiji et al. | |
| 2011/0304782 A1 | 12/2011 | Akao et al. | |
| 2012/0021140 A1 | 1/2012 | Dijksman et al. | |
| 2012/0033306 A1 | 2/2012 | Valera et al. | |

(56) References Cited

U.S. PATENT DOCUMENTS

| | | |
|---|---|---|
| 2012/0127062 A1 | 5/2012 | Bar-Zeev et al. |
| 2012/0162549 A1 | 6/2012 | Gao et al. |
| 2012/0206485 A1 | 8/2012 | Osterhout et al. |
| 2012/0206812 A1 | 8/2012 | Saito et al. |
| 2012/0212696 A1 | 8/2012 | Trajkovska et al. |
| 2012/0218301 A1 | 8/2012 | Miller |
| 2012/0242918 A1 | 9/2012 | Valyukh et al. |
| 2012/0327330 A1 | 12/2012 | Takahashi et al. |
| 2013/0027656 A1 | 1/2013 | Escuti et al. |
| 2013/0051730 A1 | 2/2013 | Travers et al. |
| 2013/0077040 A1 | 3/2013 | Escuti et al. |
| 2013/0082922 A1 | 4/2013 | Miller |
| 2013/0117377 A1 | 5/2013 | Miller |
| 2013/0125027 A1 | 5/2013 | Abovitz |
| 2013/0169909 A1 | 7/2013 | Srivastava et al. |
| 2013/0208234 A1 | 8/2013 | Lewis |
| 2013/0222384 A1 | 8/2013 | Futterer |
| 2013/0235440 A1 | 9/2013 | Takeda et al. |
| 2013/0242262 A1 | 9/2013 | Lewis |
| 2013/0242392 A1 | 9/2013 | Amirparviz et al. |
| 2013/0314765 A1 | 11/2013 | Padilla et al. |
| 2013/0314789 A1 | 11/2013 | Saarikko et al. |
| 2013/0321747 A1 | 12/2013 | Kondo et al. |
| 2013/0322810 A1 | 12/2013 | Robbins |
| 2013/0335683 A1 | 12/2013 | Escuti et al. |
| 2014/0003762 A1 | 1/2014 | Macnamara |
| 2014/0016081 A1 | 1/2014 | Kakubari et al. |
| 2014/0055740 A1 | 2/2014 | Spaulding et al. |
| 2014/0064655 A1 | 3/2014 | Nguyen et al. |
| 2014/0071539 A1 | 3/2014 | Gao |
| 2014/0104665 A1 | 4/2014 | Popovich et al. |
| 2014/0140653 A1 | 5/2014 | Brown et al. |
| 2014/0140654 A1 | 5/2014 | Brown et al. |
| 2014/0177023 A1 | 6/2014 | Gao et al. |
| 2014/0211322 A1 | 7/2014 | Bohn et al. |
| 2014/0218468 A1 | 8/2014 | Gao et al. |
| 2014/0232993 A1 | 8/2014 | Kim |
| 2014/0233879 A1 | 8/2014 | Gibson et al. |
| 2014/0237817 A1 | 8/2014 | Trajkovska-Broach |
| 2014/0267420 A1 | 9/2014 | Schowengerdt |
| 2014/0300695 A1 | 10/2014 | Smalley et al. |
| 2014/0306866 A1 | 10/2014 | Miller et al. |
| 2015/0002528 A1 | 1/2015 | Bohn et al. |
| 2015/0015879 A1 | 1/2015 | Papadopoulos et al. |
| 2015/0016777 A1 | 1/2015 | Abovitz et al. |
| 2015/0062500 A1 | 3/2015 | Park et al. |
| 2015/0103306 A1 | 4/2015 | Kaji et al. |
| 2015/0146147 A1 | 5/2015 | Choi et al. |
| 2015/0168731 A1 | 6/2015 | Robbins |
| 2015/0178939 A1 | 6/2015 | Bradski et al. |
| 2015/0205126 A1 | 7/2015 | Schowengerdt |
| 2015/0205182 A1 | 7/2015 | Leister |
| 2015/0222883 A1 | 8/2015 | Welch |
| 2015/0222884 A1 | 8/2015 | Cheng |
| 2015/0234205 A1 | 8/2015 | Schowengerdt |
| 2015/0235431 A1 | 8/2015 | Schowengerdt |
| 2015/0241705 A1 | 8/2015 | Abovitz et al. |
| 2015/0268415 A1 | 9/2015 | Schowengerdt et al. |
| 2015/0293409 A1 | 10/2015 | Usukura et al. |
| 2015/0301249 A1 | 10/2015 | Pau et al. |
| 2015/0302652 A1 | 10/2015 | Miller et al. |
| 2015/0309263 A2 | 10/2015 | Abovitz et al. |
| 2015/0326570 A1 | 11/2015 | Publicover et al. |
| 2015/0346490 A1 | 12/2015 | TeKolste et al. |
| 2015/0346495 A1 | 12/2015 | Welch et al. |
| 2016/0011353 A1* | 1/2016 | Escuti ............... G02B 6/105 359/15 |
| 2016/0011419 A1 | 1/2016 | Gao |
| 2016/0026253 A1 | 1/2016 | Bradski et al. |
| 2016/0033698 A1 | 2/2016 | Escuti et al. |
| 2016/0033771 A1 | 2/2016 | Tremblay et al. |
| 2016/0041390 A1 | 2/2016 | Poon et al. |
| 2016/0055801 A1 | 2/2016 | Kim et al. |
| 2016/0077338 A1 | 3/2016 | Robbins et al. |
| 2016/0085300 A1 | 3/2016 | Robbins et al. |
| 2016/0097930 A1 | 4/2016 | Robbins et al. |
| 2016/0116739 A1 | 4/2016 | TeKolste et al. |
| 2016/0116979 A1 | 4/2016 | Border |
| 2016/0167422 A1 | 6/2016 | Brehm et al. |
| 2016/0209648 A1 | 7/2016 | Haddick et al. |
| 2016/0270656 A1 | 9/2016 | Samec et al. |
| 2016/0282808 A1 | 9/2016 | Smalley |
| 2016/0320536 A1 | 11/2016 | Simmonds et al. |
| 2017/0007182 A1 | 1/2017 | Samec et al. |
| 2017/0010466 A1 | 1/2017 | Klug et al. |
| 2017/0010488 A1 | 1/2017 | Klug et al. |
| 2017/0131595 A1 | 5/2017 | Yim et al. |
| 2017/0269453 A1 | 9/2017 | Galstian et al. |
| 2017/0277003 A1 | 9/2017 | Zhu |
| 2017/0322419 A1 | 11/2017 | TeKolste et al. |
| 2017/0363794 A1 | 12/2017 | Wan et al. |
| 2017/0373459 A1 | 12/2017 | Weng et al. |
| 2018/0004289 A1 | 1/2018 | Wilson et al. |
| 2018/0046859 A1 | 2/2018 | Jarvenpaa |
| 2018/0113309 A1* | 4/2018 | Robbins ............... G02B 6/124 |
| 2018/0113310 A1 | 4/2018 | Rolland et al. |
| 2018/0143438 A1 | 5/2018 | Oh |
| 2018/0143470 A1 | 5/2018 | Oh et al. |
| 2018/0143485 A1 | 5/2018 | Oh |
| 2018/0143509 A1 | 5/2018 | Oh |
| 2018/0164627 A1 | 6/2018 | Oh |
| 2018/0164645 A1 | 6/2018 | Oh et al. |
| 2018/0188528 A1 | 7/2018 | Browy |
| 2018/0188542 A1 | 7/2018 | Waldern et al. |
| 2018/0217395 A1 | 8/2018 | Lin et al. |
| 2018/0239147 A1 | 8/2018 | Schowengerdt |
| 2018/0239177 A1 | 8/2018 | Oh |
| 2018/0275350 A1 | 9/2018 | Oh |
| 2018/0275409 A1 | 9/2018 | Gao |
| 2019/0033684 A1 | 1/2019 | Favalora et al. |
| 2019/0086674 A1 | 3/2019 | Sinay et al. |
| 2019/0121142 A1 | 4/2019 | Tekolste |
| 2019/0227211 A1 | 7/2019 | Klug et al. |
| 2019/0243141 A1 | 8/2019 | TeKolste |
| 2019/0243142 A1 | 8/2019 | TeKolste |
| 2020/0174304 A1 | 6/2020 | Oh |
| 2021/0341775 A1 | 11/2021 | Oh |

FOREIGN PATENT DOCUMENTS

| | | |
|---|---|---|
| CN | 1727966 A | 2/2006 |
| CN | 101339335 A | 1/2009 |
| CN | 101688937 A | 3/2010 |
| CN | 101133348 B | 9/2010 |
| CN | 102317818 A | 1/2012 |
| CN | 102683803 | 9/2012 |
| CN | 102890366 A | 1/2013 |
| CN | 103038568 A | 4/2013 |
| CN | 103460083 A | 12/2013 |
| CN | 103558704 A | 2/2014 |
| CN | 104145208 | 11/2014 |
| CN | 104145208 A | 11/2014 |
| CN | 104460115 A | 3/2015 |
| CN | 104737061 A | 6/2015 |
| CN | 105849628 A | 8/2016 |
| CN | 105934902 A | 9/2016 |
| CN | 105934902 A | 9/2016 |
| CN | 107209437 A | 9/2017 |
| EP | 0 132 077 | 1/1985 |
| EP | 0 415 735 | 3/1991 |
| EP | 0 525 478 | 2/1993 |
| EP | 0 549 283 | 6/1993 |
| EP | 1 843 198 | 10/2007 |
| EP | 2 065 750 | 6/2009 |
| EP | 2 664 430 | 11/2013 |
| JP | 62-269174 | 11/1987 |
| JP | 1991-84516 | 4/1991 |
| JP | H10-96929 A | 4/1998 |
| JP | 2000-075405 A | 3/2000 |
| JP | 2002-357804 A | 12/2002 |
| JP | 2003-161834 A | 6/2003 |
| JP | 2003-232910 A | 8/2003 |
| JP | 2004-219750 A | 8/2004 |
| JP | 2005-250486 A | 9/2005 |

(56) References Cited

FOREIGN PATENT DOCUMENTS

| | | |
|---|---|---|
| JP | 2005-316304 | 11/2005 |
| JP | 2005-316304 A | 11/2005 |
| JP | 2005-316314 | 11/2005 |
| JP | 2005-316314 A | 11/2005 |
| JP | 2006-201388 A | 8/2006 |
| JP | 2006-215186 A | 8/2006 |
| JP | 2006-252638 A | 9/2006 |
| JP | 2008-090259 A | 4/2008 |
| JP | 2008-209710 A | 9/2008 |
| JP | 2009-015329 A | 1/2009 |
| JP | 2010-066765 A | 3/2010 |
| JP | 2010-271565 | 12/2010 |
| JP | 2010-271565 A | 12/2010 |
| JP | WO 2009-084604 A | 5/2011 |
| JP | 2012-505430 A | 3/2012 |
| JP | 2012-073515 | 4/2012 |
| JP | 2012-073522 A | 4/2012 |
| JP | 2012-215614 A | 11/2012 |
| JP | 2014-508320 A | 4/2014 |
| JP | 2014-132328 | 7/2014 |
| JP | 2014-132328 A | 7/2014 |
| JP | 2014-528597 A | 10/2014 |
| JP | WO 2014/156167 | 10/2014 |
| JP | 2014-224846 | 12/2014 |
| JP | 2014-224846 A | 12/2014 |
| JP | 2015-049376 | 3/2015 |
| JP | 2015-089638 A | 5/2015 |
| JP | 2016-519327 A | 6/2016 |
| KR | 1999-0016200 A | 3/1999 |
| KR | 2011-0117178 A | 10/2011 |
| TW | 200834190 A | 8/2008 |
| WO | WO 2005/024469 | 3/2005 |
| WO | WO 2006/064301 | 6/2006 |
| WO | WO 2006/092758 | 9/2006 |
| WO | WO 2006/106501 | 10/2006 |
| WO | WO 2008/130555 | 10/2008 |
| WO | WO 2008/130561 | 10/2008 |
| WO | WO 2010/067114 | 6/2010 |
| WO | WO 2010/070772 | 6/2010 |
| WO | WO 2011/130718 | 10/2011 |
| WO | WO 2012/103497 | 8/2012 |
| WO | WO 2013/052834 | 4/2013 |
| WO | WO 2013/054115 | 4/2013 |
| WO | WO 2013/188464 | 12/2013 |
| WO | WO 2014/016403 | 1/2014 |
| WO | WO 2014/036537 | 3/2014 |
| WO | WO 2014/091204 | 6/2014 |
| WO | WO 2014/159045 | 10/2014 |
| WO | WO 2014/172252 | 10/2014 |
| WO | WO 2015/081313 | 6/2015 |
| WO | WO 2016/054092 | 4/2016 |
| WO | WO 2016/082031 | 6/2016 |
| WO | WO 2016/113533 | 7/2016 |
| WO | WO 2016/205249 | 12/2016 |
| WO | WO 2016/205256 | 12/2016 |
| WO | WO 2018/093730 | 5/2018 |
| WO | WO 2018/094079 | 5/2018 |
| WO | WO 2018/094093 | 5/2018 |
| WO | WO 2018/106963 | 6/2018 |
| WO | WO 2018/112101 | 6/2018 |
| WO | WO 2018/156779 | 8/2018 |
| WO | WO 2018/156784 | 8/2018 |
| WO | WO 2018/175343 | 9/2018 |
| WO | WO 2018/175488 | 9/2018 |
| WO | WO 2020/069026 | 4/2020 |

OTHER PUBLICATIONS

U.S. Appl. No. 15/879,005, filed Jan. 24, 2018, Lin et al.
U.S. Appl. No. 15/926,920, filed Mar. 20, 2018, Oh et al.
Invitation to Pay Additional Fees And, Where Applicable, Protest Fee for PCT Application No. PCT/US18/19250, dated May 2, 2018.
International Search Report and Written Opinion for PCT Application No. PCT/US18/19250, dated Jun. 29, 2018.
Invitation to Pay Additional Fees And, Where Applicable, Protest Fee for PCT Application No. PCT/US18/19257, dated May 3, 2018.
International Search Report and Written Opinion for PCT Application No. PCT/US18/19257, dated Jul. 2, 2018.
International Search Report and Written Opinion for PCT Application No. PCT/US2017/062063, dated Jan. 25, 2018.
International Preliminary Report on Patentability for PCT Application No. PCT/US2017/062063, dated May 21, 2019.
Invitation to Pay Additional Fees And, Where Applicable, Protest Fee for PCT Application No. PCT/US2017/65182, dated Feb. 14, 2018.
International Search Report and Written Opinion for PCT Application No. PCT/US2017/65182, dated Apr. 6, 2018.
International Search Report and Written Opinion for PCT Application No. PCT/US2018/023425, dated Jun. 22, 2018.
Chiu et al.: "P-33: Large Area Self-aligning of Liquid Crystal Molecules induced by Nanoimprinting Lithography and a Multiple Function Film Made Therein," EURODISPLAY, Sep. 20, 2005-Sep. 22, 2020, pp. 323-325.
Aieta, F. et al., "Multiwavelength achromatic metasurfaces by dispersive phase compensation," Science, vol. 347, Issue 6228, Mar. 20, 2015, in 5 pages. URL: www.sciencemag.org.
Arbabi, A. et al., "Dielectric metasurfaces for complete control of phase and polarization with subwavelength spatial resolution and high transmission," Nature Nanotechnology, published online Aug. 31, 2015, in 8 pages. URL: www.nature.com/naturenanotechnology.
ARToolKit: https://web.archive.org/web/20051013062315/http://www.hitl.washington.edu:80/artoolkit/documentation/hardware.htm, archived Oct. 13, 2005.
Azuma, "A Survey of Augmented Reality," Teleoperators and Virtual Environments 6, (Aug. 4, 1997), pp. 355-385. https://web.archive.org/web/20010604100006/http://www.cs.unc.edu/~azuma/ARpresence.pdf.
Azuma, "Predictive Tracking for Augmented Realty," TR95-007, Department of Computer Science, UNC-Chapel Hill, NC, Feb. 1995.
Bimber, et al., "Spatial Augmented Reality—Merging Real and Virtual Worlds," 2005 https://web.media.mit.edu/~raskar/book/BimberRaskarAugmentedRealityBook.pdf.
Chigrinov, V.: Photoaligning and Photopatterning Technology: Applications in Displays and Photonics, Proceedings of SPIE, Emerging Liquid Crystal Technologies I, vol. 9769, Mar. 7, 2016, in 11 pages.
Choi, Y. et al.: "Determination of Surface Nematic Liquid Crystal Anchoring Strength Using Nano-scale Surface Grooves," Optical Society of America, May 2013, in 10 pages.
Crawford, et al.: "Liquid-crystal diffraction gratings using polarization holography alignment techniques," Journal of Applied Physics 98, 123102, 2005.
Cunningham et al., "A plastic colorimetric resonant optical biosensor for multiparallel detection of label-free biochemical interactions," Sensors and Actuators B, vol. 85, 2190226, Jul. 2002, in 8 pages.
Dierking, I.: "Chiral Liquid Crystals: Structures, Phases, Effects," Symmetry, (Jun. 2014) 6(2): 444-472.
"Metamateriais". Duke University. Center for Metamateriais and Integrated Plasmonics. May 11, 2015 (Retrieved from the internet Aug. 12, 2016). URL: http://web.archive.org/web/20150511045547/http://metamaterials.duke.edu/research/metamaterials.
Escuti, M. et al., "39.4: Polarization-Independent switching with high contrast from a liquid crystal polarization grating", SID Symposium Digest, vol. 37, pp. 1443-1446, Jun. 2006, in 5 pages.
Escuti, M. et al., "Polarization-Independent LC Microdisplays Using Liquid Crystal Polarization Gratings: A Viable Solution", ILCC presentation, Jul. 1, 2008, in 15 pages.
Escuti J., "Polarization-Independent Modulation & Simplified Spectropolarimetry Using LC Polarization Gratings," paper #39.4, posters p. 209, p. 167, SID Symposium Digest, 2006.
Gear, C. et al.: "Engineered Liquid Crystal Anchoring Energies with Nanopatterned Surfaces," Optical Society of America, Jan. 2015, in 8 pages.
Jacob, "Eye Tracking in Advanced Interface Design," Human-Computer Interaction Lab Naval Research Laboratory, Washington, D.C. / paper/ in Virtual Environments and Advanced Interface

(56) References Cited

OTHER PUBLICATIONS

Design, ed. by W. Barfield and T.A. Furness, pp. 258-288, Oxford University Press, New York (1995).
Kim, J. et al., "Wide-angle, nonmechanical beam steering with high throughput utilizing polarization gratings", Applied Optics, vol. 50, No. 17, Jun. 10, 2011, in 4 pages.
Komanduri, et al., "Multi-twist retarders: broadband retadation control using self-aligning reactive liquid crystal layers," Optical Society of America, Optics Express 404, vol. 21, No. 1, Jan. 14, 2013.
Komanduri, R. et al., "18:3: Late-News Paper: Polarization Independent Liquid Crystal Microdisplays", SID Digest, vol. 39, No. 1, pp. 236-239, May 2008, in 4 pages.
Komanduri, R. et al., "34.4L: Late-News Paper: Polarization Independent Projection Systems using Thin Film Polymer Polarization Gratings and Standard Liquid Crystal Microdisplays", SID Digest, vol. 40, No. 1, Jun. 2009, in 4 pages.
Komanduri, R. et al., "Elastic Continuum Analysis of the Liquid Crystal Polarization Grating", Physical review. E, Statistical, nonlinear, and soft matter physics, May 25, 2007, in 8 pages.
Komanduri, R. et al., "Polarization Independent Projection Systems using Thin Film Polymer Polarization Gratings and Standard Liquid Crystal Microdisplays", SID-Display week presentation, Jun. 3, 2009, in 12 pages.
Komanduri, R. et al., "Polarization-Independent modulation for projection displays using small-period LC polarization gratings", Journal of the Society for information display, vol. 15, No. 8, pp. 589-594, Aug. 2007, in 7 pages.
Kurioz, Y. et al.: "P-128: Orientation of a Reactive Mesogen on Photosensitive Surface," Society for Information Display (SID) Symposium Digest of Technical Papers, May 2007, in 3 pages.
Lee, et al., Negative dispersion of birefringence in two-dimensionally self-organized smectic liquid crystal and monomer thin film, Optics Letters, vol. 39, No. 17, Sep. 1, 2014.
Lim, Y. et al., "Anisotropic Nano-Imprinting Technique for Fabricating a Patterned Optical Film of a Liquid Crystalline Polymer", Journal of Nanoscience and Nanotechnology, vol. 8, pp. 4775-4778, Oct. 2008, in 4 pages.
Lin, D. et al., "Dielectric gradient metasurface optical elements", Science, vol. 345, Issue 6194, Jul. 18, 2014, in 6 pages.
Lin, D. et al., "Supplementary Materials for Dielectric gradient metasurface optical elements", Science, vol. 345, Issue 6194, Jul. 18, 2014, in 22 pages.
Lin, R. et al. Molecular-Scale soft imprint lithography for alignment layers in liquid crystal devices; Nano Letters, vol. 7, No. 6; Publication [online]. May 23, 2007 [retrieved Feb. 7, 2018]. Retrieved from the Internet: URL:https://pubs.acs.org/doi/abs/10.1021/nl070559y; pp. 1613-1621.
Lub J. et al.: "Formation of Optical Films by Photo-Polymerisation of Liquid Crystalline Acrylates and Application of These Films in Liquid Crystal Display Technology," Mol Cryst Liq Cryst., (May 2005) 429(1):77-99.
Nikolova et al., "Diffraction Efficiency and Selectivity of Polarization Holographic Recording", Optica Acta: Int'l J Optics (1984) 31(5):579-588.
Oh C. et al.: "Achromatic Diffraction from Polarization Gratings with High Efficiency", Opt Lett. (Oct. 2008) 33(20):2287-2289 & Erratum Opt Lett. (Dec. 2009) 34(23):3637.
Oh C., Thesis: "Broadband Polarization Gratings for Efficient Liquid Crystal Display, Beam Steering, Spectropolarimetry, and Fresnel Zone Plate", N. C. State University, Electrical Engineering (2009) in 190 pages.
Oh, C. et al., "Numerical analysis of polarization gratings using the finite-difference time-domain method", Physical review A, vol. 76, Oct. 12, 2007, in 8 pages.
Oh, C. et al., "Polarization-Independent Modulation using Standard LCDs and Polymer PGs", 2008, in 6 pages.
Oh, C. et al., 16.2: Polarization-Independent Modulation Using Standard Liquid Crystal Microdisplays and Polymer Polarization Gratings, IDRC, 2008, in 4 pages.
Oh et al., "Polarization-Independent Modulation Using Standard Liquid Crystal Microdisplays and Polymer Polarization Gratings," NC State University; International Display Research Conference, vol. 28, pp. 298-301, 2008. in 16 pages.
Rongsheng, et al., "Molecular-Scale Soft imprint Litography for Alignment: Layers in Liquid Crystal Devices," NANO Letters, vol. 7, No. 6, May 23, 2007.
Scheeline, et al., "Stacked Mutually Rotated Diffraction Gratings as Enablers of Portable Visible Spectrometry," Appl. Spectrosc. 70, 766-777, May 11, 2016.
Tanriverdi and Jacob, "Interacting Witn Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).
Wikipedia Blind spot (vision), archived Jun. 9, 2016, in 2 pages. URL: https://web.archive.org/web/20160609224858/https:en.wikipedia.org/wiki/Blind_spot(vision).
Yang et al. Negative dispersion of birefringence of smectic liquid crystal-polymer compostie: dependence on the constituent molecules and temperature, Optical Society of America, Optics Express 2466, vol. 23, No. 3, Feb. 9, 2015.
Yu, N. et al., "Flat optics with designer metasurfaces", Review Article; Nature Materials, (Feb. 2014) 13: 139-150.
Yu, N. et al., "Light Propagation with Phase Discontinuities: Generalized Laws of Reflection and Refraction," Science, vol. 334, No. 333, Oct. 21, 2011, in 6 pages. URL: www.sciencemag.org.

* cited by examiner

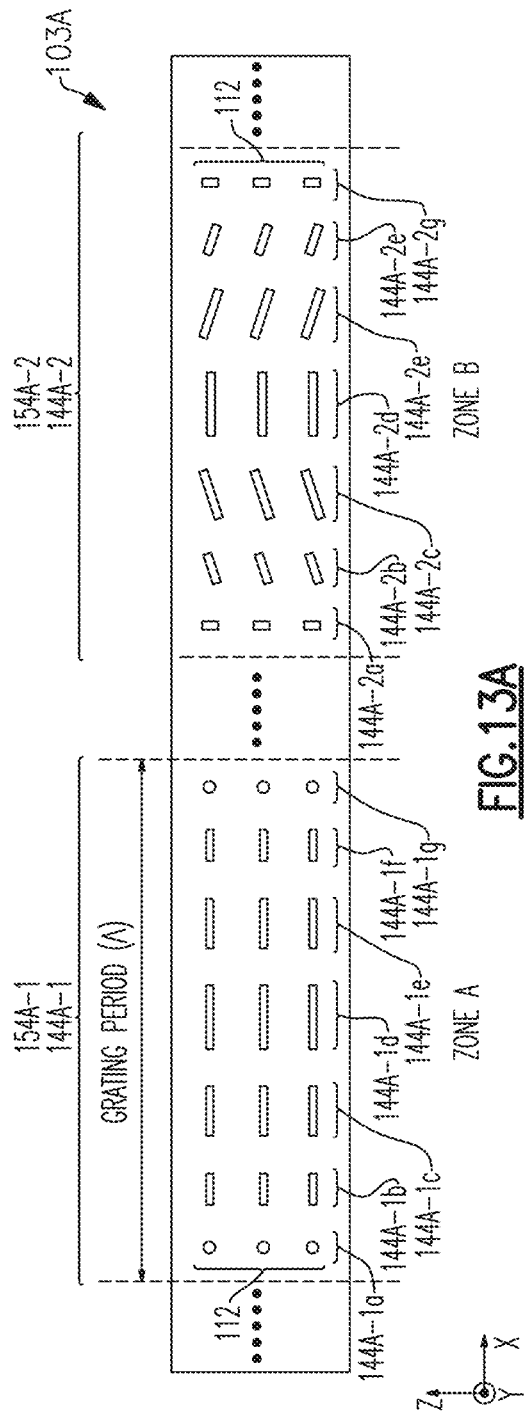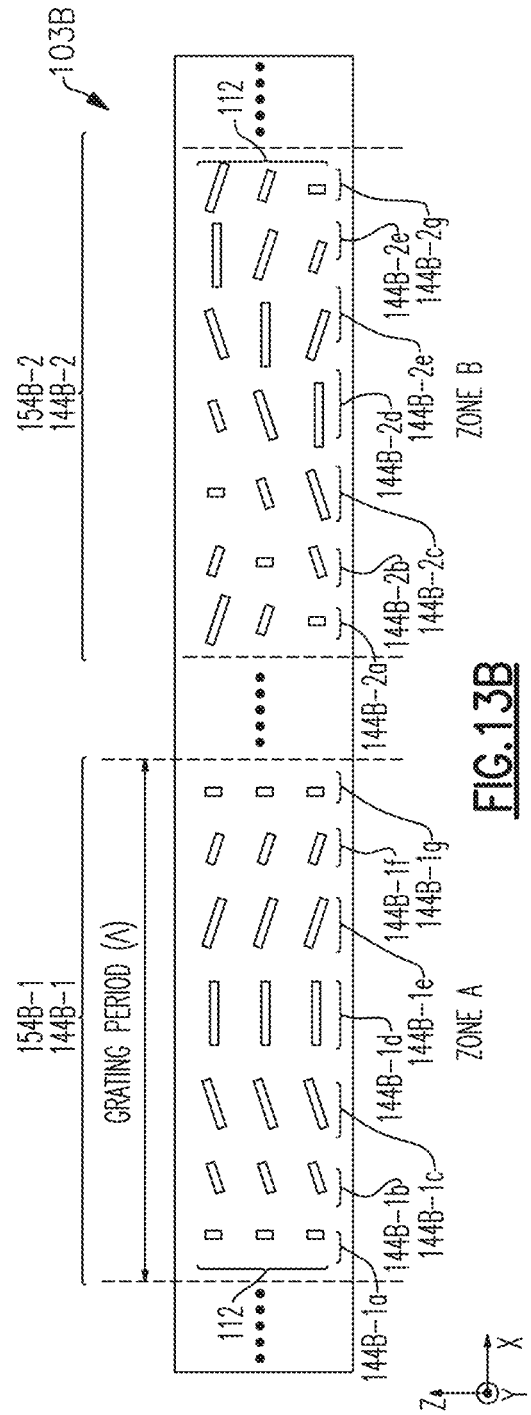

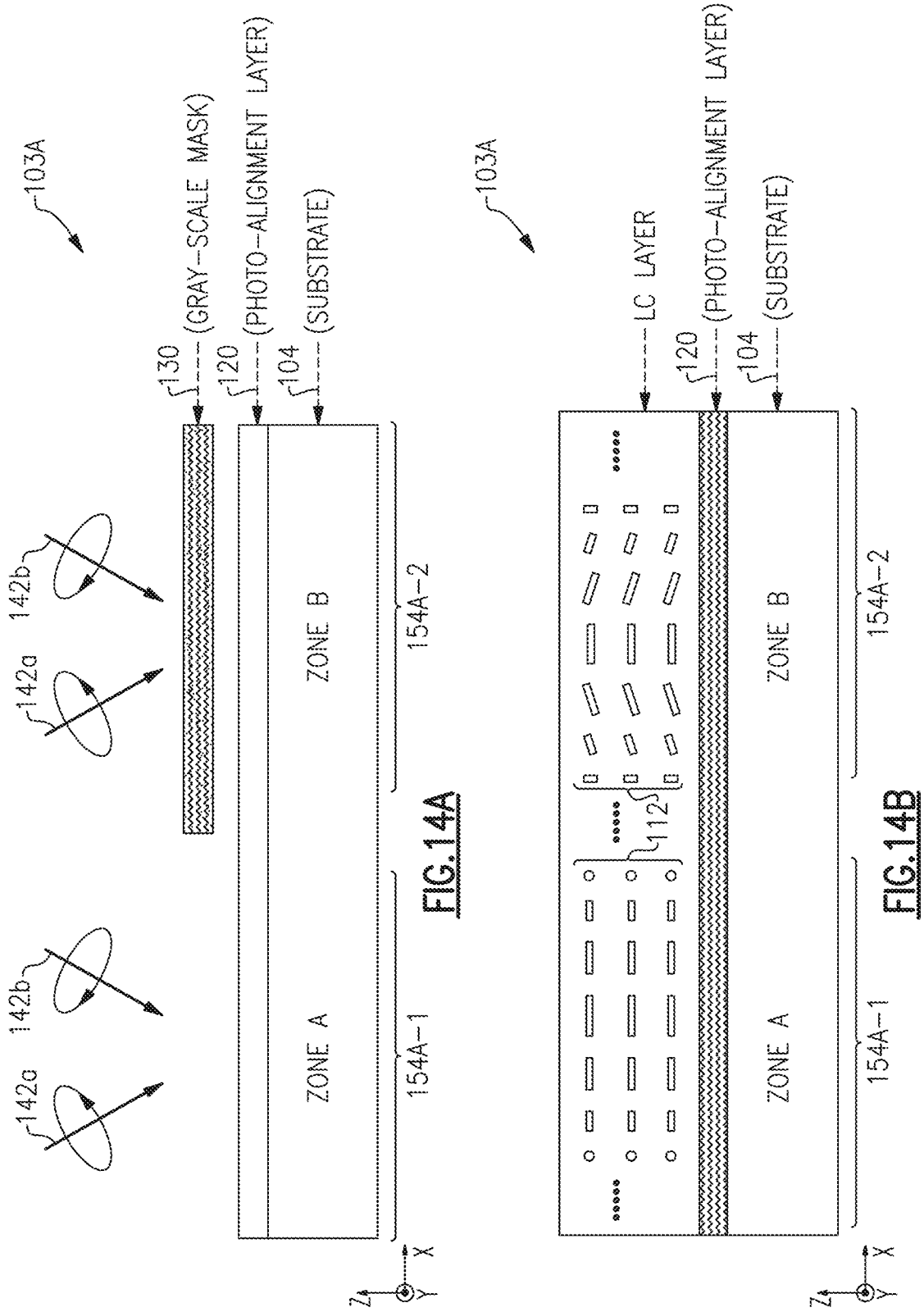

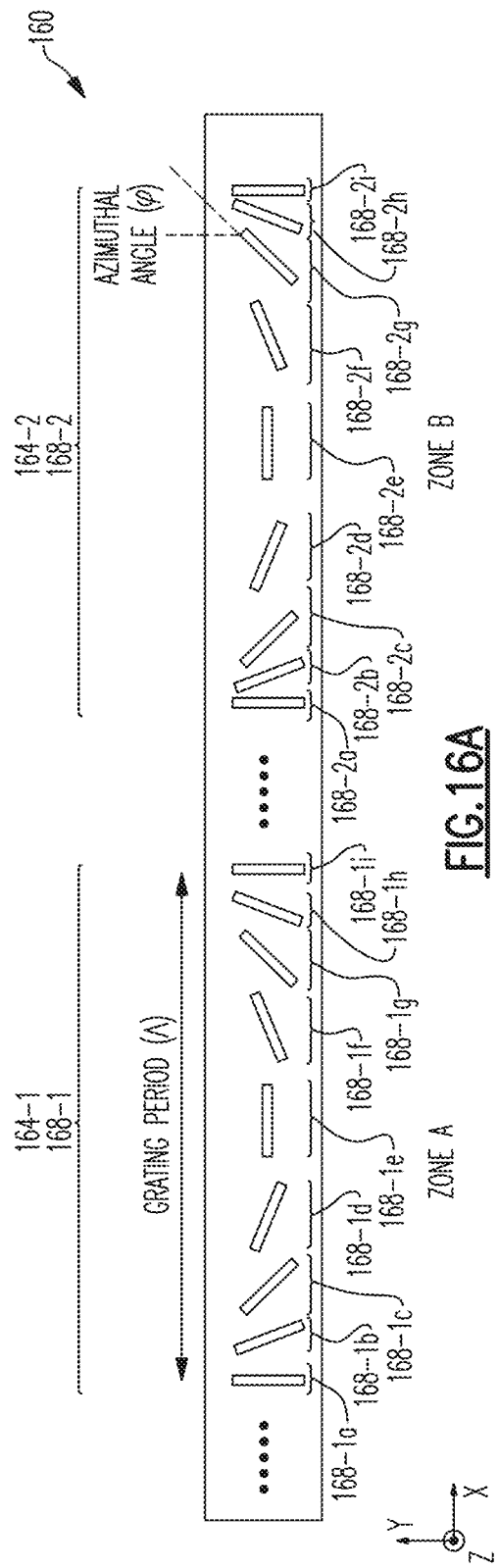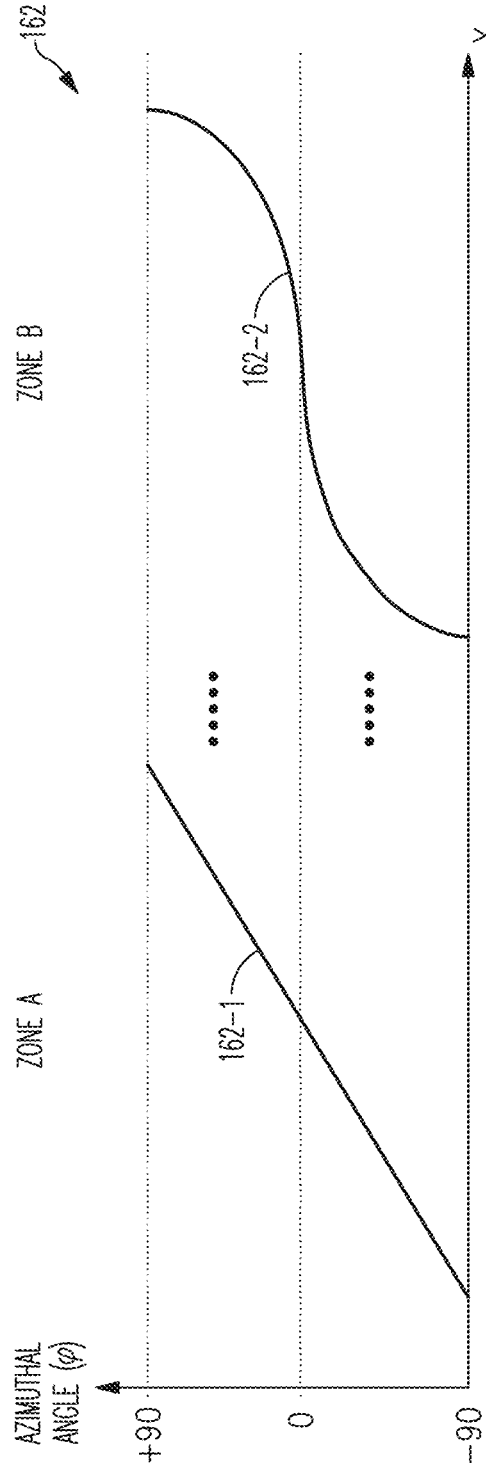
FIG.16A
FIG.16B

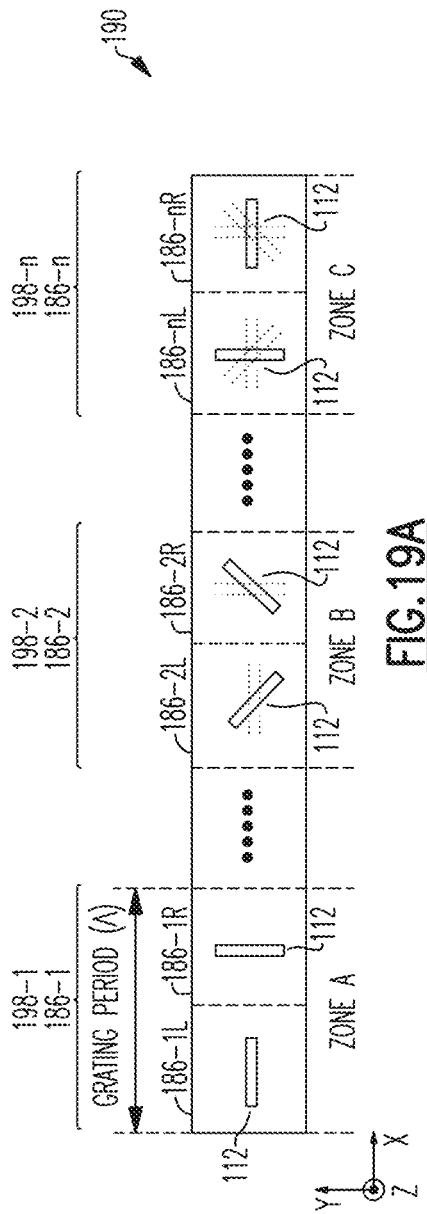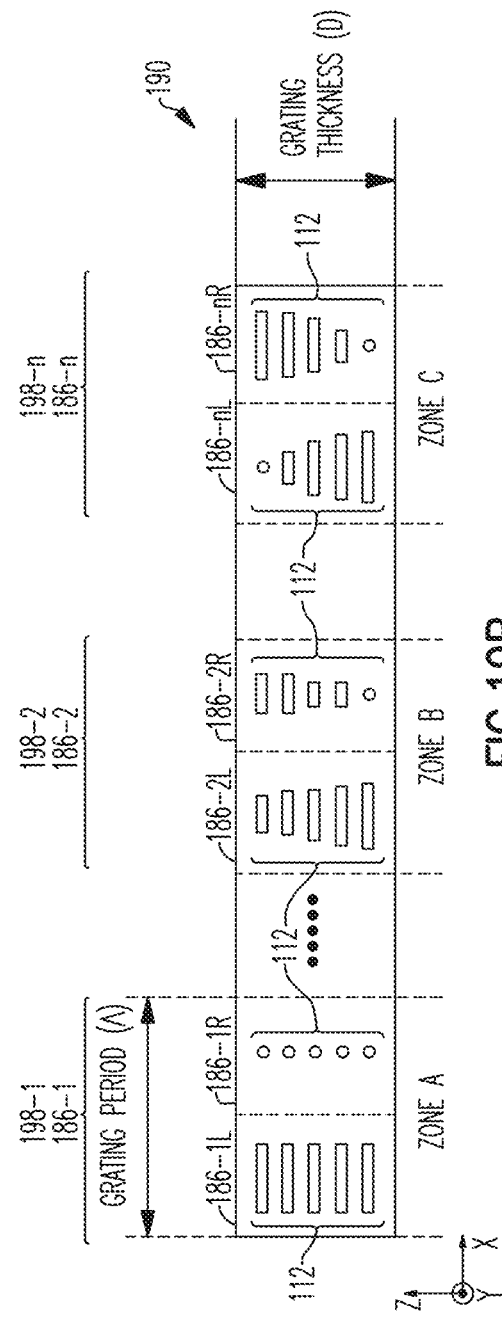

SPATIALLY VARIABLE LIQUID CRYSTAL DIFFRACTION GRATINGS

CROSS-REFERENCE TO RELATED APPLICATIONS

This application is a continuation application of U.S. patent application Ser. No. 15/815,449, filed Nov. 16, 2017, entitled "SPATIALLY VARIABLE LIQUID CRYSTAL DIFFRACTION GRATINGS," which claims the benefit of priority to U.S. Provisional Patent Application No. 62/424,310, filed Nov. 18, 2016, entitled "SPATIALLY VARIABLE LIQUID CRYSTAL DIFFRACTION GRATINGS." The content of each of these applications is hereby incorporated by reference herein in its entirety.

BACKGROUND

Field

The present disclosure relates to display systems and, more particularly, to augmented reality display systems.

Description of the Related Art

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, in an MR scenario, AR image content may be blocked by or otherwise be perceived as interacting with objects in the real world.

Referring to FIG. 1, an augmented reality scene 1 is depicted wherein a user of an AR technology sees a real-world park-like setting 1100 featuring people, trees, buildings in the background, and a concrete platform 1120. In addition to these items, the user of the AR technology also perceives that he "sees" "virtual content" such as a robot statue 1110 standing upon the real-world platform 1120, and a cartoon-like avatar character 1130 flying by which seems to be a personification of a bumble bee, even though these elements 1130, 1110 do not exist in the real world. Because the human visual perception system is complex, it is challenging to produce an AR technology that facilitates a comfortable, natural-feeling, rich presentation of virtual image elements amongst other virtual or real-world imagery elements.

Systems and methods disclosed herein address various challenges related to AR and VR technology.

SUMMARY

Accordingly, numerous devices, systems, structures and methods are disclosed herein. For instance, an example diffraction grating is disclosed that includes a plurality of different diffracting zones having a periodically repeating lateral dimension corresponding to a grating period adapted for light diffraction. The diffraction grating additionally includes a plurality of different liquid crystal layers corresponding to the different diffracting zones. The different liquid crystal layers have liquid crystal molecules that are aligned differently, such that the different diffracting zones have different optical properties associated with light diffraction.

An example method of fabricating a diffraction grating is disclosed that includes providing a substrate and providing a plurality of different diffracting zones on the substrate having a periodically repeating lateral dimension corresponding to a grating period adapted for light diffraction. The method further includes forming a plurality of different liquid crystal layers comprising liquid crystal molecules over the substrate, the different liquid crystal layers corresponding to the different diffracting zones, wherein forming the different liquid crystal layers comprises aligning the liquid crystal molecules differently, thereby providing different optical properties associated with light diffraction to the different diffracting zones.

Another example diffraction grating is disclosed that includes a plurality of contiguous liquid crystal layers extending in a lateral direction and arranged to have a periodically repeating lateral dimension, a thickness and indices of refraction such that the liquid crystal layers are configured to diffract light. Liquid crystal molecules of the liquid crystal layers are arranged differently in different liquid crystal layers along the lateral direction such that the contiguous liquid crystal layers are configured to diffract light with a gradient in diffraction efficiency.

An example head-mounted display device that is configured to project light to an eye of a user to display augmented reality image content is also disclosed. The head-mounted display device includes a frame configured to be supported on a head of the user. The head-mounted display device additionally includes a display disposed on the frame, at least a portion of said display comprising one or more waveguides, said one or more waveguides being transparent and disposed at a location in front of the user's eye when the user wears said head-mounted display device such that said transparent portion transmits light from a portion of an environment in front of the user to the user's eye to provide a view of said portion of the environment in front of the user, said display further comprising one or more light sources and at least one diffraction grating configured to couple light from the light sources into said one or more waveguides or to couple light out of said one or more waveguides. The diffraction grating includes a plurality of different diffracting zones having a periodically repeating lateral dimension corresponding to a grating period adapted for light diffraction. The diffraction grating additionally includes a plurality of different liquid crystal layers corresponding to the different diffracting zones, wherein the different liquid crystal layers have liquid crystal molecules that are aligned differently, such that the different diffracting zones have different optical properties associated with light diffraction.

BRIEF DESCRIPTION OF THE DRAWINGS

FIGS. 13A-13B illustrate cross-sectional side views of diffraction gratings having zones in which liquid crystal molecules have different pre-tilt angles, according to embodiments.

FIGS. 14A-14B are cross-sectional side views of an intermediate structure and a diffraction grating illustrating a method of fabricating the diffraction gratings illustrated in FIGS. 13A-13B, according to embodiments.

FIG. 16A illustrates a top down plan view of a diffraction grating having zones in which liquid crystal molecules have different azimuthal angles, according to embodiments.

FIG. 16B is a schematic graph illustrating variations in azimuthal angles in a lateral direction across different zones of the diffraction grating illustrated in FIG. 16A.

FIGS. 19A-19B illustrate top down and cross-sectional side views of a diffraction grating having zones in which liquid crystal molecules have different chirality, according to embodiments.

DETAILED DESCRIPTION

Figure 1:
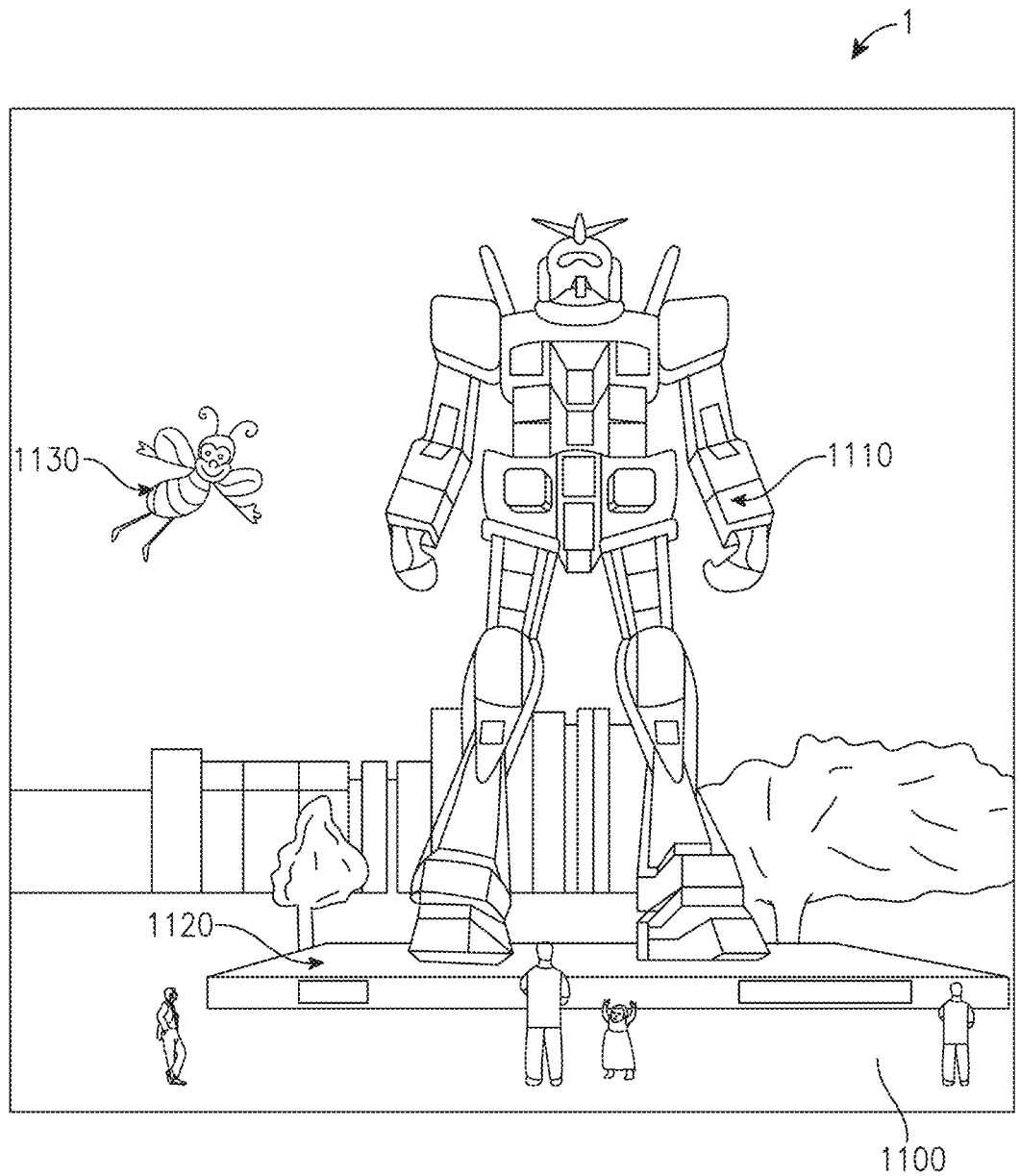
FIG. 1 illustrates a user's view of augmented reality (AR) through an AR device.

AR systems may display virtual content to a user, or viewer, while still allowing the user to see the world around them. Preferably, this content is displayed on a head-mounted display, e.g., as part of eyewear, that projects image information to the user's eyes. In addition, the display may also transmit light from the surrounding environment to the user's eyes, to allow a view of that surrounding environment. As used herein, it will be appreciated that a "head-mounted" display is a display that may be mounted on the head of a viewer.

Reference will now be made to the drawings, in which like reference numerals refer to like parts throughout.

Figure 2:
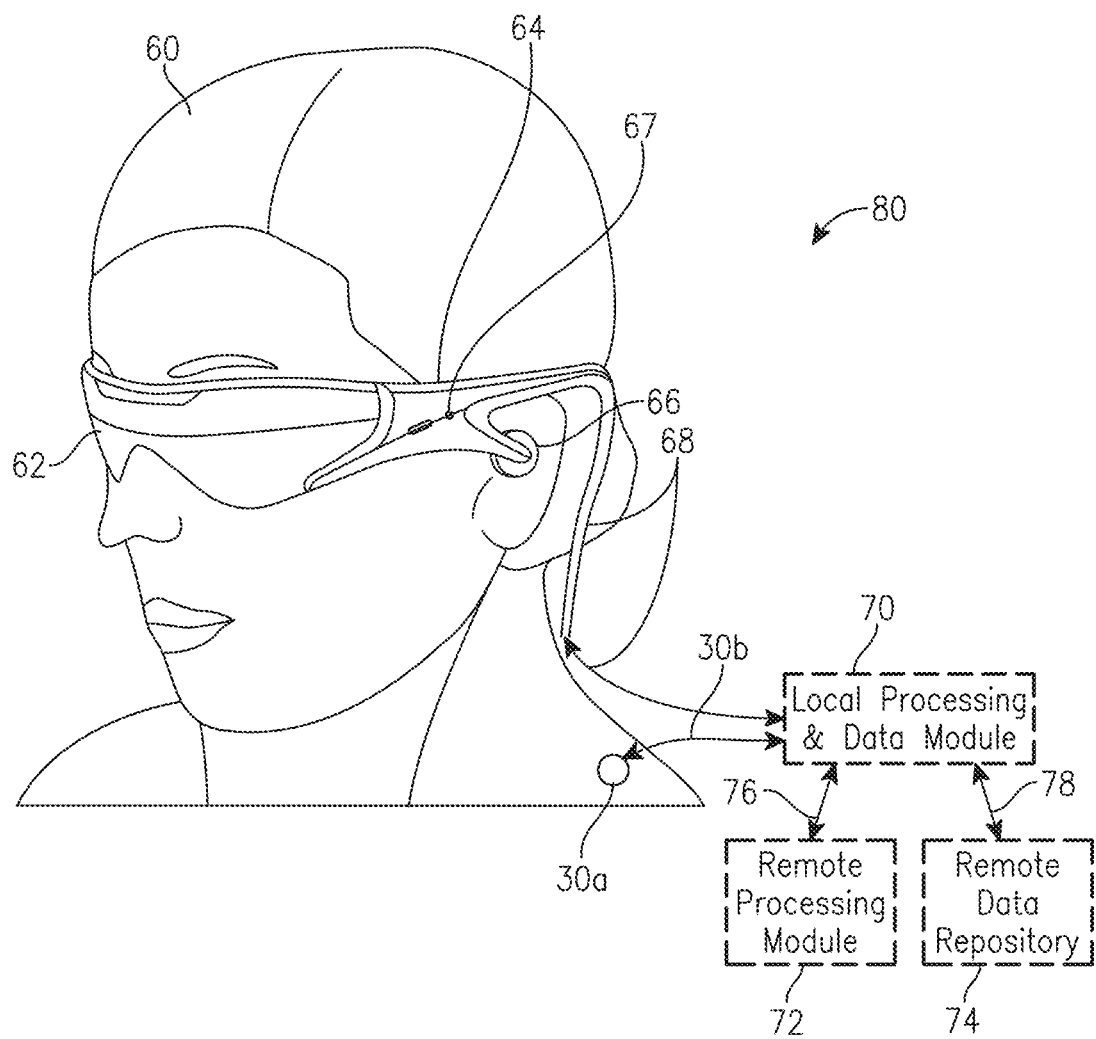
FIG. 2 illustrates an example of wearable display system.

FIG. 2 illustrates an example of wearable display system 80. The display system 80 includes a display 62, and various mechanical and electronic modules and systems to support the functioning of that display 62. The display 62 may be coupled to a frame 64, which is wearable by a display system user or viewer 60 and which is configured to position the display 62 in front of the eyes of the user 60. The display 62 may be considered eyewear in some embodiments. In some embodiments, a speaker 66 is coupled to the frame 64 and positioned adjacent the ear canal of the user 60 (in some embodiments, another speaker, not shown, is positioned adjacent the other ear canal of the user to provide for stereo/shapeable sound control). In some embodiments, the display system may also include one or more microphones 67 or other devices to detect sound. In some embodiments, the microphone is configured to allow the user to provide inputs or commands to the system 80 (e.g., the selection of voice menu commands, natural language questions, etc.), and/or may allow audio communication with other persons (e.g., with other users of similar display systems. The microphone may further be configured as a peripheral sensor to continuously collect audio data (e.g., to passively collect from the user and/or environment). Such audio data may include user sounds such as heavy breathing, or environmental sounds, such as a loud bang indicative of a nearby event. The display system may also include a peripheral sensor 30a, which may be separate from the frame 64 and attached to the body of the user 60 (e.g., on the head, torso, an extremity, etc. of the user 60). The peripheral sensor 30a may be configured to acquire data characterizing the physiological state of the user 60 in some embodiments, as described further herein. For example, the sensor 30a may be an electrode.

With continued reference to FIG. 2, the display 62 is operatively coupled by communications link 68, such as by a wired lead or wireless connectivity, to a local data processing module 70 which may be mounted in a variety of configurations, such as fixedly attached to the frame 64, fixedly attached to a helmet or hat worn by the user, embedded in headphones, or otherwise removably attached to the user 60 (e.g., in a backpack-style configuration, in a belt-coupling style configuration). Similarly, the sensor 30a may be operatively coupled by communications link 30b, e.g., a wired lead or wireless connectivity, to the local processor and data module 70. The local processing and data module 70 may comprise a hardware processor, as well as digital memory, such as non-volatile memory (e.g., flash memory or hard disk drives), both of which may be utilized to assist in the processing, caching, and storage of data. The data include data a) captured from sensors (which may be, e.g., operatively coupled to the frame 64 or otherwise attached to the user 60), such as image capture devices (such as cameras), microphones, inertial measurement units, accelerometers, compasses, GPS units, radio devices, gyros, and/or other sensors disclosed herein; and/or b) acquired and/or processed using remote processing module 72 and/or remote data repository 74 (including data relating to virtual content), possibly for passage to the display 62 after such processing or retrieval. The local processing and data module 70 may be operatively coupled by communication links 76, 78, such as via a wired or wireless communication links, to the remote processing module 72 and remote data repository 74 such that these remote modules 72, 74 are operatively coupled to each other and available as resources to the local processing and data module 70. In some embodiments, the local processing and data module 70 may include one or more of the image capture devices, microphones, inertial measurement units, accelerometers, compasses, GPS units, radio devices, and/or gyros. In some other embodiments, one or more of these sensors may be attached to the frame 64, or may be standalone structures that communicate with the local processing and data module 70 by wired or wireless communication pathways.

With continued reference to FIG. 2, in some embodiments, the remote processing module 72 may comprise one or more processors configured to analyze and process data and/or image information. In some embodiments, the remote data repository 74 may comprise a digital data storage facility, which may be available through the internet or other networking configuration in a "cloud" resource configuration. In some embodiments, the remote data repository 74 may include one or more remote servers, which provide information, e.g., information for generating augmented reality content, to the local processing and data module 70 and/or the remote processing module 72. In some embodiments, all data is stored and all computations are performed in the local processing and data module, allowing fully autonomous use from a remote module.

Figure 3:
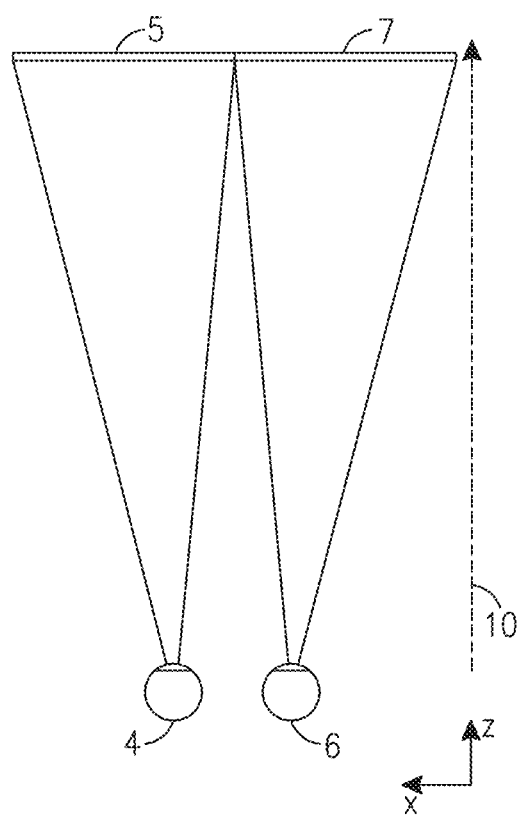
FIG. 3 illustrates a conventional display system for simulating three-dimensional imagery for a user.

The perception of an image as being "three-dimensional" or "3-D" may be achieved by providing slightly different presentations of the image to each eye of the viewer. FIG. 3 illustrates a conventional display system for simulating three-dimensional imagery for a user. Two distinct images 5, 7—one for each eye 4, 6—are outputted to the user. The images 5, 7 are spaced from the eyes 4, 6 by a distance 10 along an optical or z-axis parallel to the line of sight of the viewer. The images 5, 7 are flat and the eyes 4, 6 may focus on the images by assuming a single accommodated state. Such systems rely on the human visual system to combine the images 5, 7 to provide a perception of depth and/or scale for the combined image.

It will be appreciated, however, that the human visual system is more complicated and providing a realistic perception of depth is more challenging. For example, many viewers of conventional "3-D" display systems find such systems to be uncomfortable or may not perceive a sense of depth at all. Without being limited by theory, it is believed that viewers of an object may perceive the object as being "three-dimensional" due to a combination of vergence and accommodation. Vergence movements (i.e., rotation of the eyes so that the pupils move toward or away from each other to converge the lines of sight of the eyes to fixate upon an object) of the two eyes relative to each other are closely associated with focusing (or "accommodation") of the lenses and pupils of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex," as well as pupil dilation or constriction. Likewise, a change in vergence will trigger a matching change in accommodation of lens shape and pupil size, under normal conditions. As noted herein, many stereoscopic or "3-D" display systems display a scene using slightly different presentations (and, so, slightly different images) to each eye such that a three-dimensional perspective is perceived by the human visual system. Such systems are uncomfortable for many viewers, however, since they, among other things, simply provide a different presentation of a scene, but with the eyes viewing all the image information at a single accommodated state, and work against the "accommodation-vergence reflex." Display systems that provide a better match between accommodation and vergence may form more realistic and comfortable simulations of three-dimensional imagery contributing to increased duration of wear and in turn compliance to diagnostic and therapy protocols.

Figure 4:
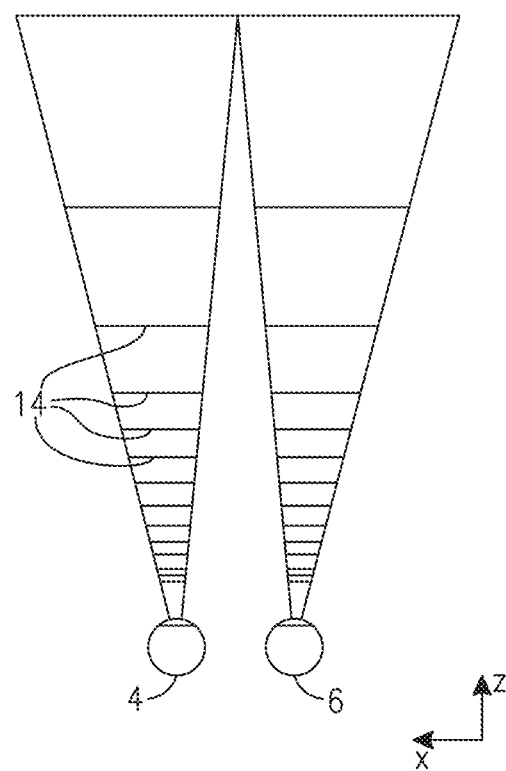
FIG. 4 illustrates aspects of an approach for simulating three-dimensional imagery using multiple depth planes.

FIG. 4 illustrates aspects of an approach for simulating three-dimensional imagery using multiple depth planes. With reference to FIG. 4, objects at various distances from eyes 4, 6 on the z-axis are accommodated by the eyes 4, 6 so that those objects are in focus. The eyes (4 and 6) assume particular accommodated states to bring into focus objects at different distances along the z-axis. Consequently, a particular accommodated state may be said to be associated with a particular one of depth planes 14, with has an associated focal distance, such that objects or parts of objects in a particular depth plane are in focus when the eye is in the accommodated state for that depth plane. In some embodiments, three-dimensional imagery may be simulated by providing different presentations of an image for each of the eyes 4, 6, and also by providing different presentations of the image corresponding to each of the depth planes. While shown as being separate for clarity of illustration, it will be appreciated that the fields of view of the eyes 4, 6 may overlap, for example, as distance along the z-axis increases. In addition, while shown as flat for ease of illustration, it will be appreciated that the contours of a depth plane may be curved in physical space, such that all features in a depth plane are in focus with the eye in a particular accommodated state.

Figure 5A:
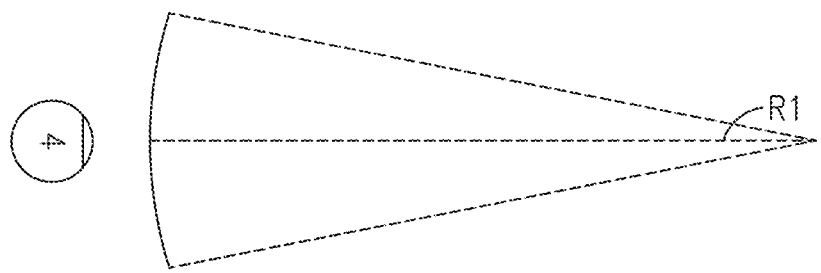
FIGS. 5A-5C illustrate relationships between radius of curvature and focal radius.
Figure 5B:
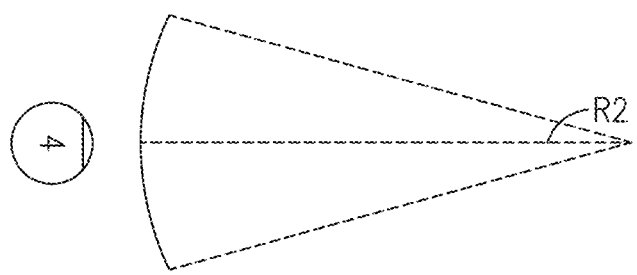
Figure 5C:
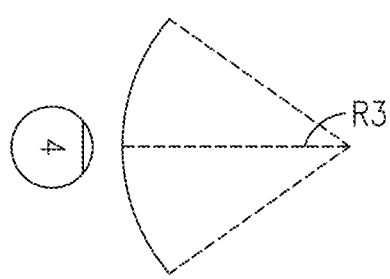

The distance between an object and the eye 4 or 6 may also change the amount of divergence of light from that object, as viewed by that eye. FIGS. 5A-5C illustrates relationships between distance and the divergence of light rays. The distance between the object and the eye 4 is represented by, in order of decreasing distance, R1, R2, and R3. As shown in FIGS. 5A-5C, the light rays become more divergent as distance to the object decreases. As distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 4. Consequently, at different depth planes, the degree of divergence of light rays is also different, with the degree of divergence increasing with decreasing distance between depth planes and the viewer's eye 4. While only a single eye 4 is illustrated for clarity of illustration in FIGS. 5A-5C and other figures herein, it will be appreciated that the discussions regarding eye 4 may be applied to both eyes 4 and 6 of a viewer.

Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes. The different presentations may be separately focused by the viewer's eyes, thereby helping to provide the user with depth cues based on the accommodation of the eye required to bring into focus different image features for the scene located on different depth plane and/or based on observing different image features on different depth planes being out of focus.

Figure 6:
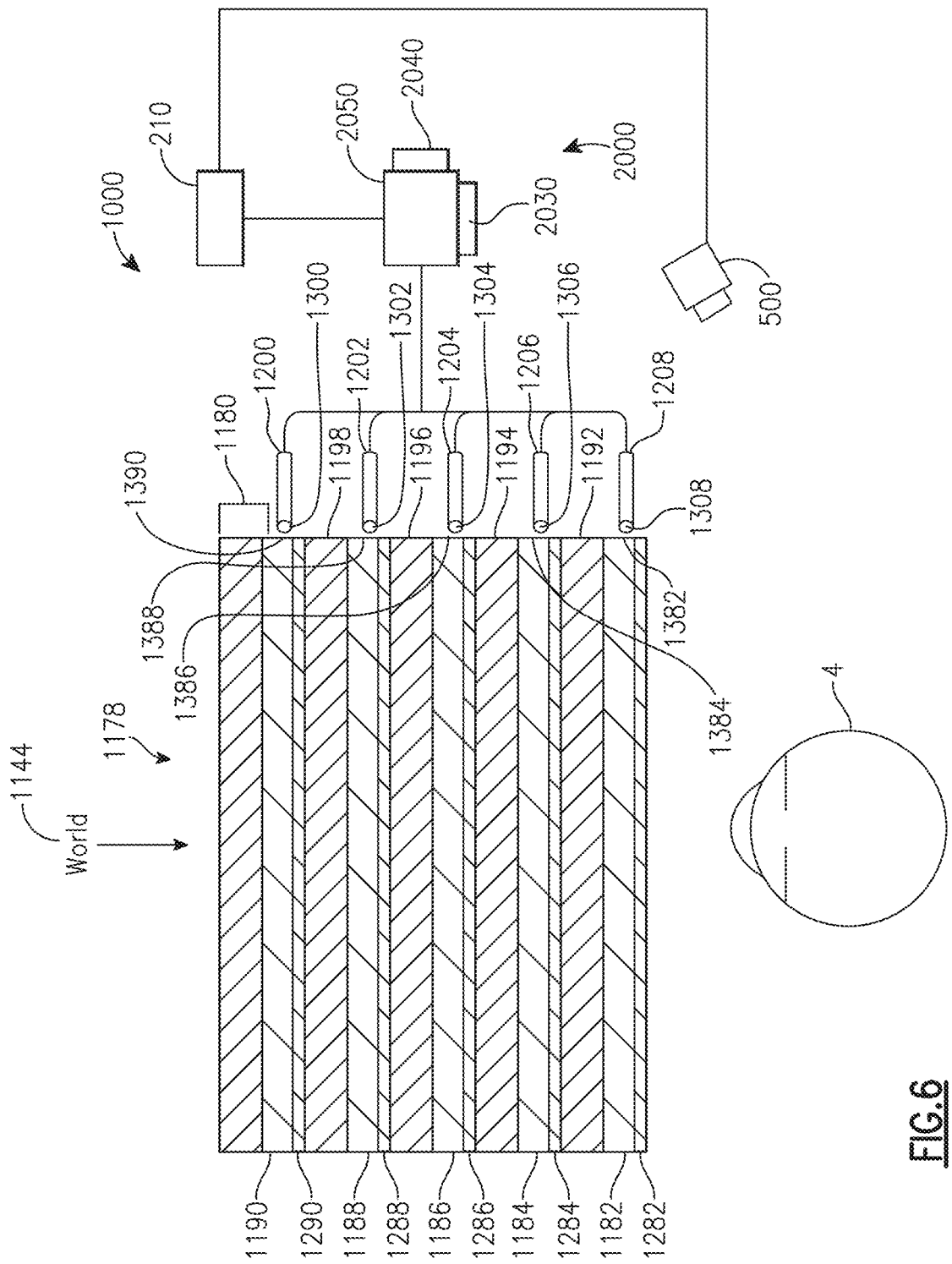
FIG. 6 illustrates an example of a waveguide stack for outputting image information to a user.

FIG. 6 illustrates an example of a waveguide stack for outputting image information to a user. A display system 1000 includes a stack of waveguides, or stacked waveguide assembly, 1178 that may be utilized to provide three-dimensional perception to the eye/brain using a plurality of waveguides 1182, 1184, 1186, 1188, 1190. In some embodiments, the display system 1000 is the system 80 of FIG. 2, with FIG. 6 schematically showing some parts of that system 80 in greater detail. For example, the waveguide assembly 1178 may be part of the display 62 of FIG. 2. It will be appreciated that the display system 1000 may be considered a light field display in some embodiments.

With continued reference to FIG. 6, the waveguide assembly 1178 may also include a plurality of features 1198, 1196, 1194, 1192 between the waveguides. In some embodiments, the features 1198, 1196, 1194, 1192 may be one or more lenses. The waveguides 1182, 1184, 1186, 1188, 1190 and/or the plurality of lenses 1198, 1196, 1194, 1192 may be configured to send image information to the eye with various levels of wavefront curvature or light ray divergence. Each waveguide level may be associated with a particular depth plane and may be configured to output image information corresponding to that depth plane. Image injection devices 1200, 1202, 1204, 1206, 1208 may function as a source of light for the waveguides and may be utilized to inject image information into the waveguides 1182, 1184, 1186, 1188, 1190, each of which may be configured, as described herein, to distribute incoming light across each respective waveguide, for output toward the eye 4. Light exits an output surface 1300, 1302, 1304, 1306, 1308 of the image injection devices 1200, 1202, 1204, 1206, 1208 and is injected into a corresponding input surface 1382, 1384, 1386, 1388, 1390 of the waveguides 1182, 1184, 1186, 1188, 1190. In some embodiments, the each of the input surfaces 1382, 1384, 1386, 1388, 1390 may be an edge of a corresponding waveguide, or may be part of a major surface of the corresponding waveguide (that is, one of the waveguide surfaces directly facing the world 1144 or the viewer's eye 4). In some embodiments, a single beam of light (e.g. a collimated beam) may be injected into each waveguide to output an entire field of cloned collimated beams that are directed toward the eye 4 at particular angles (and amounts of divergence) corresponding to the depth plane associated with a particular waveguide. In some embodiments, a single one of the image injection devices 1200, 1202, 1204, 1206, 1208 may be associated with and inject light into a plurality (e.g., three) of the waveguides 1182, 1184, 1186, 1188, 1190.

In some embodiments, the image injection devices 1200, 1202, 1204, 1206, 1208 are discrete displays that each produce image information for injection into a corresponding waveguide 1182, 1184, 1186, 1188, 1190, respectively. In some other embodiments, the image injection devices 1200, 1202, 1204, 1206, 1208 are the output ends of a single multiplexed display which may, e.g., pipe image information via one or more optical conduits (such as fiber optic cables) to each of the image injection devices 1200, 1202, 1204, 1206, 1208. It will be appreciated that the image information provided by the image injection devices 1200, 1202, 1204, 1206, 1208 may include light of different wavelengths, or colors (e.g., different component colors, as discussed herein).

In some embodiments, the light injected into the waveguides 1182, 1184, 1186, 1188, 1190 is provided by a light projector system 2000, which comprises a light module 2040, which may include a light emitter, such as a light emitting diode (LED). The light from the light module 2040 may be directed to and modified by a light modulator 2030, e.g., a spatial light modulator, via a beam splitter 2050. The light modulator 2030 may be configured to change the perceived intensity of the light injected into the waveguides 1182, 1184, 1186, 1188, 1190. Examples of spatial light modulators include liquid crystal displays (LCD) including a liquid crystal on silicon (LCOS) displays.

In some embodiments, the display system 1000 may be a scanning fiber display comprising one or more scanning fibers configured to project light in various patterns (e.g., raster scan, spiral scan, Lissajous patterns, etc.) into one or more waveguides 1182, 1184, 1186, 1188, 1190 and ultimately to the eye 4 of the viewer. In some embodiments, the illustrated image injection devices 1200, 1202, 1204, 1206, 1208 may schematically represent a single scanning fiber or a bundles of scanning fibers configured to inject light into one or a plurality of the waveguides 1182, 1184, 1186, 1188, 1190. In some other embodiments, the illustrated image injection devices 1200, 1202, 1204, 1206, 1208 may schematically represent a plurality of scanning fibers or a plurality of bundles of scanning, fibers each of which are configured to inject light into an associated one of the waveguides 1182, 1184, 1186, 1188, 1190. It will be appreciated that the one or more optical fibers may be configured to transmit light from the light module 2040 to the one or more waveguides 1182, 1184, 1186, 1188, 1190. It will be appreciated that one or more intervening optical structures may be provided between the scanning fiber, or fibers, and the one or more waveguides 1182, 1184, 1186, 1188, 1190 to, e.g., redirect light exiting the scanning fiber into the one or more waveguides 1182, 1184, 1186, 1188, 1190.

A controller 1210 controls the operation of one or more of the stacked waveguide assembly 1178, including operation of the image injection devices 1200, 1202, 1204, 1206, 1208, the light source 2040, and the light modulator 2030. In some embodiments, the controller 1210 is part of the local data processing module 70. The controller 1210 includes programming (e.g., instructions in a non-transitory medium) that regulates the timing and provision of image information to the waveguides 1182, 1184, 1186, 1188, 1190 according to, e.g., any of the various schemes disclosed herein. In some embodiments, the controller may be a single integral device, or a distributed system connected by wired or wireless communication channels. The controller 1210 may be part of the processing modules 70 or 72 (FIG. 1) in some embodiments.

With continued reference to FIG. 6, the waveguides 1182, 1184, 1186, 1188, 1190 may be configured to propagate light within each respective waveguide by total internal reflection (TIR). The waveguides 1182, 1184, 1186, 1188, 1190 may each be planar or have another shape (e.g., curved), with major top and bottom surfaces and edges extending between those major top and bottom surfaces. In the illustrated configuration, the waveguides 1182, 1184, 1186, 1188, 1190 may each include outcoupling optical elements 1282, 1284, 1286, 1288, 1290 that are configured to extract light out of a waveguide by redirecting the light, propagating within each respective waveguide, out of the waveguide to output image information to the eye 4. Extracted light may also be referred to as outcoupled light and the outcoupling optical elements light may also be referred to light extracting optical elements. An extracted beam of light is outputted by the waveguide at locations at which the light propagating in the waveguide strikes a light extracting optical element. The outcoupling optical elements 1282, 1284, 1286, 1288, 1290 may, for example, be gratings, including diffractive optical features, as discussed further herein. While illustrated disposed at the bottom major surfaces of the waveguides 1182, 1184, 1186, 1188, 1190 for ease of description and drawing clarity, in some embodiments, the outcoupling optical elements 1282, 1284, 1286, 1288, 1290 may be disposed at the top and/or bottom major surfaces, and/or may be disposed directly in the volume of the waveguides 1182, 1184, 1186, 1188, 1190, as discussed further herein. In some embodiments, the outcoupling optical elements 1282, 1284, 1286, 1288, 1290 may be formed in a layer of material that is attached to a transparent substrate to form the waveguides 1182, 1184, 1186, 1188, 1190. In some other embodiments, the waveguides 1182, 1184, 1186, 1188, 1190 may be a monolithic piece of material and the outcoupling optical elements 1282, 1284, 1286, 1288, 1290 may be formed on a surface and/or in the interior of that piece of material.

With continued reference to FIG. 6, as discussed herein, each waveguide 1182, 1184, 1186, 1188, 1190 is configured to output light to form an image corresponding to a particular depth plane. For example, the waveguide 1182 nearest the eye may be configured to deliver collimated light, as injected into such waveguide 1182, to the eye 4. The collimated light may be representative of the optical infinity focal plane. The next waveguide up 1184 may be configured to send out collimated light which passes through the first lens 1192 (e.g., a negative lens) before it can reach the eye 4; such first lens 1192 may be configured to create a slight convex wavefront curvature so that the eye/brain interprets light coming from that next waveguide up 1184 as coming from a first focal plane closer inward toward the eye 4 from optical infinity. Similarly, the third up waveguide 1186 passes its output light through both the first 1192 and second 1194 lenses before reaching the eye 4; the combined optical power of the first 1192 and second 1194 lenses may be configured to create another incremental amount of wavefront curvature so that the eye/brain interprets light coming from the third waveguide 1186 as coming from a second focal plane that is even closer inward toward the person from optical infinity than was light from the next waveguide up 1184.

The other waveguide layers 1188, 1190 and lenses 1196, 1198 are similarly configured, with the highest waveguide 1190 in the stack sending its output through all of the lenses between it and the eye for an aggregate focal power representative of the closest focal plane to the person. To compensate for the stack of lenses 1198, 1196, 1194, 1192 when viewing/interpreting light coming from the world 1144 on the other side of the stacked waveguide assembly 1178, a compensating lens layer 1180 may be disposed at the top of the stack to compensate for the aggregate power of the lens stack 1198, 1196, 1194, 1192 below. Such a configuration provides as many perceived focal planes as there are available waveguide/lens pairings. Both the outcoupling optical elements of the waveguides and the focusing aspects of the lenses may be static (i.e., not dynamic or electro-active). In some alternative embodiments, either or both may be dynamic using electro-active features.

In some embodiments, two or more of the waveguides 1182, 1184, 1186, 1188, 1190 may have the same associated depth plane. For example, multiple waveguides 1182, 1184, 1186, 1188, 1190 may be configured to output images set to the same depth plane, or multiple subsets of the waveguides 1182, 1184, 1186, 1188, 1190 may be configured to output images set to the same plurality of depth planes, with one set for each depth plane. This can provide advantages for forming a tiled image to provide an expanded field of view at those depth planes.

With continued reference to FIG. 6, the outcoupling optical elements 1282, 1284, 1286, 1288, 1290 may be configured to both redirect light out of their respective waveguides and to output this light with the appropriate amount of divergence or collimation for a particular depth plane associated with the waveguide. As a result, waveguides having different associated depth planes may have different configurations of outcoupling optical elements 1282, 1284, 1286, 1288, 1290, which output light with a different amount of divergence depending on the associated depth plane. In some embodiments, the light extracting optical elements 1282, 1284, 1286, 1288, 1290 may be volumetric or surface features, which may be configured to output light at specific angles. For example, the light extracting optical elements 1282, 1284, 1286, 1288, 1290 may be volume holograms, surface holograms, and/or diffraction gratings. In some embodiments, the features 1198, 1196, 1194, 1192 may not be lenses; rather, they may simply be spacers (e.g., cladding layers and/or structures for forming air gaps).

In some embodiments, the outcoupling optical elements 1282, 1284, 1286, 1288, 1290 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 4 with each intersection of the DOE, while the rest continues to move through a waveguide via total internal reflection. The light carrying the image information is thus divided into a number of related exit beams that exit the waveguide at a multiplicity of locations and the result is a fairly uniform pattern of exit emission toward the eye 4 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 500 (e.g., a digital camera, including visible light and infrared light cameras) may be provided to capture images of the eye 4 and/or tissue around the eye 4 to, e.g., detect user inputs and/or to monitor the physiological state of the user. As used herein, a camera may be any image capture device. In some embodiments, the camera assembly 500 may include an image capture device and a light source to project light (e.g., infrared light) to the eye, which may then be reflected by the eye and detected by the image capture device. In some embodiments, the camera assembly 500 may be attached to the frame 64 (FIG. 2) and may be in electrical communication with the processing modules 70 and/or 72, which may process image information from the camera assembly 500 to make various determinations regarding, e.g., the physiological state of the user, as discussed herein. It will be appreciated that information regarding the physiological state of user may be used to determine the behavioral or emotional state of the user. Examples of such information include movements of the user and/or facial expressions of the user. The behavioral or emotional state of the user may then be triangulated with collected environmental and/or virtual content data so as to determine relationships between the behavioral or emotional state, physiological state, and environmental or virtual content data. In some embodiments, one camera assembly 500 may be utilized for each eye, to separately monitor each eye.

Figure 7:
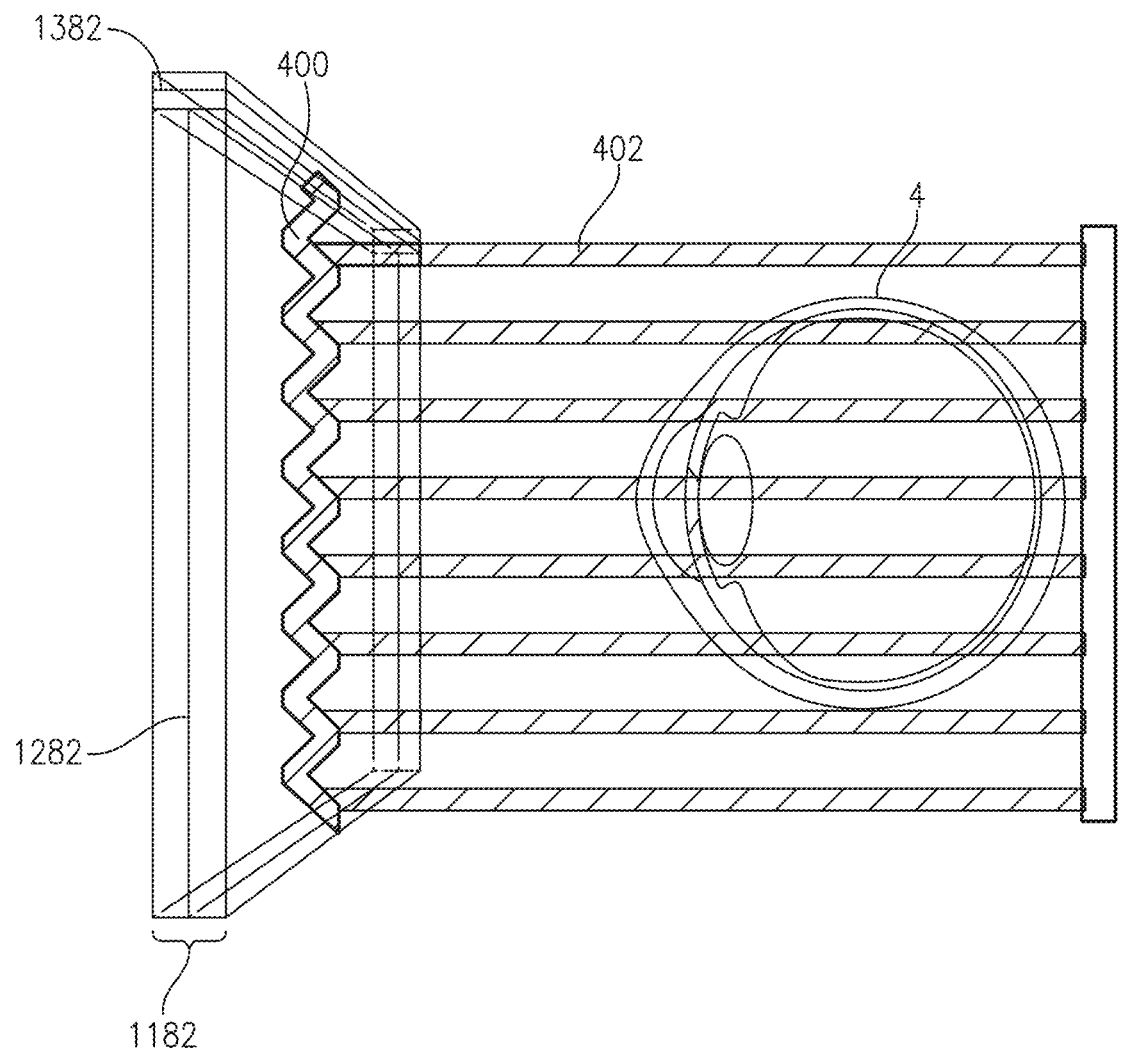
FIG. 7 illustrates an example of exit beams outputted by a waveguide.

With reference now to FIG. 7, an example of exit beams outputted by a waveguide is shown. One waveguide is illustrated, but it will be appreciated that other waveguides in the waveguide assembly 1178 (FIG. 6) may function similarly, where the waveguide assembly 1178 includes multiple waveguides. Light 400 is injected into the waveguide 1182 at the input surface 1382 of the waveguide 1182 and propagates within the waveguide 1182 by TIR. At points where the light 400 impinges on the DOE 1282, a portion of the light exits the waveguide as exit beams 402. The exit beams 402 are illustrated as substantially parallel but, as discussed herein, they may also be redirected to propagate to the eye 4 at an angle (e.g., forming divergent exit beams), depending on the depth plane associated with the waveguide 1182. It will be appreciated that substantially parallel exit beams may be indicative of a waveguide with outcoupling optical elements that outcouple light to form images that appear to be set on a depth plane at a large distance (e.g., optical infinity) from the eye 4. Other waveguides or other sets of outcoupling optical elements may output an exit beam pattern that is more divergent, which would require the eye 4 to accommodate to a closer distance to bring it into focus on the retina and would be interpreted by the brain as light from a distance closer to the eye 4 than optical infinity.

Figure 8:
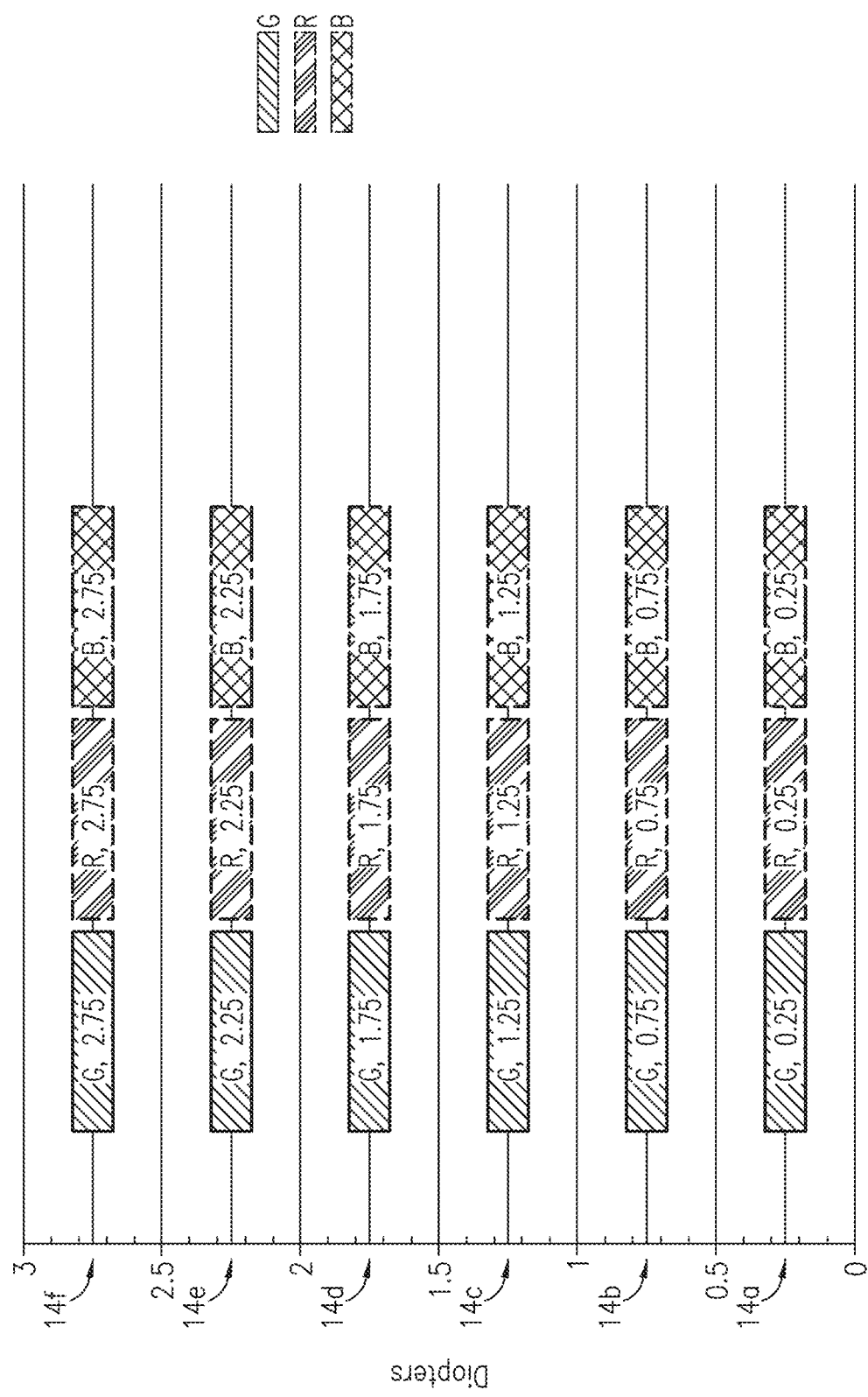
FIG. 8 illustrates an example of a stacked waveguide assembly in which each depth plane includes images formed using multiple different component colors.

In some embodiments, a full color image may be formed at each depth plane by overlaying images in each of the component colors, e.g., three or more component colors. FIG. 8 illustrates an example of a stacked waveguide assembly in which each depth plane includes images formed using multiple different component colors. The illustrated embodiment shows depth planes 14a-14f, although more or fewer depths are also contemplated. Each depth plane may have three component color images associated with it: a first image of a first color, G; a second image of a second color, R; and a third image of a third color, B. Different depth planes are indicated in the figure by different numbers for diopters (dpt) following the letters G, R, and B. Just as examples, the numbers following each of these letters indicate diopters (1/m), or inverse distance of the depth plane from a viewer, and each box in the figures represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort and/or may decrease chromatic aberrations.

In some embodiments, light of each component color may be outputted by a single dedicated waveguide and, consequently, each depth plane may have multiple waveguides associated with it. In such embodiments, each box in the figures including the letters G, R, or B may be understood to represent an individual waveguide, and three waveguides may be provided per depth plane where three component color images are provided per depth plane. While the waveguides associated with each depth plane are shown adjacent to one another in this drawing for ease of description, it will be appreciated that, in a physical device, the waveguides may all be arranged in a stack with one waveguide per level. In some other embodiments, multiple component colors may be outputted by the same waveguide, such that, e.g., only a single waveguide may be provided per depth plane.

With continued reference to FIG. 8, in some embodiments, G is the color green, R is the color red, and B is the color blue. In some other embodiments, other colors associated with other wavelengths of light, including magenta and cyan, may be used in addition to or may replace one or more of red, green, or blue. In some embodiments, features 198, 196, 194, and 192 may be active or passive optical filters configured to block or selectively light from the ambient environment to the viewer's eyes.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some embodiments, the light source 2040 (FIG. 6) may be configured to emit light of one or more wavelengths outside the visual perception range of the viewer, for example, infrared and/or ultraviolet wavelengths. In addition, the incoupling, outcoupling, and other light redirecting structures of the waveguides of the display 1000 may be configured to direct and emit this light out of the display towards the user's eye 4, e.g., for imaging and/or user stimulation applications.

Figure 9A:
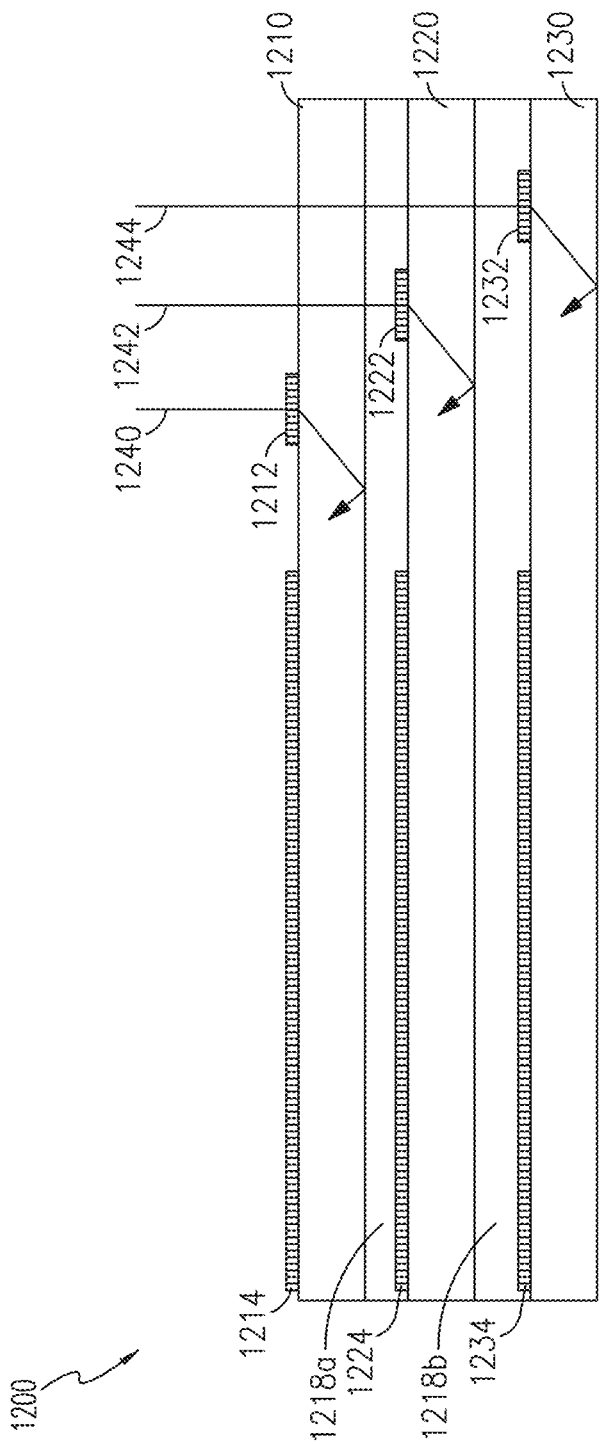
FIG. 9A illustrates a cross-sectional side view of an example of a set of stacked waveguides that each includes an incoupling optical element.

With reference now to FIG. 9A, in some embodiments, light impinging on a waveguide may need to be redirected to incouple that light into the waveguide. An incoupling optical element may be used to redirect and incouple the light into its corresponding waveguide. FIG. 9A illustrates a cross-sectional side view of an example of a plurality or set 1200 of stacked waveguides that each includes an incoupling optical element. The waveguides may each be configured to output light of one or more different wavelengths, or one or more different ranges of wavelengths. It will be appreciated that the stack 1200 may correspond to the stack 1178 (FIG. 6) and the illustrated waveguides of the stack 1200 may correspond to part of the plurality of waveguides 1182, 1184, 1186, 1188, 1190, except that light from one or more of the image injection devices 1200, 1202, 1204, 1206, 1208 is injected into the waveguides from a position that requires light to be redirected for incoupling.

The illustrated set 1200 of stacked waveguides includes waveguides 1210, 1220, and 1230. Each waveguide includes an associated incoupling optical element (which may also be referred to as a light input area on the waveguide), with, e.g., incoupling optical element 1212 disposed on a major surface (e.g., an upper major surface) of waveguide 1210, incoupling optical element 1224 disposed on a major surface (e.g., an upper major surface) of waveguide 1220, and incoupling optical element 1232 disposed on a major surface (e.g., an upper major surface) of waveguide 1230. In some embodiments, one or more of the incoupling optical elements 1212, 1222, 1232 may be disposed on the bottom major surface of the respective waveguide 1210, 1220, 1230 (particularly where the one or more incoupling optical elements are reflective, deflecting optical elements). As illustrated, the incoupling optical elements 1212, 1222, 1232 may be disposed on the upper major surface of their respective waveguide 1210, 1220, 1230 (or the top of the next lower waveguide), particularly where those incoupling optical elements are transmissive, deflecting optical elements. In some embodiments, the incoupling optical elements 1212, 1222, 1232 may be disposed in the body of the respective waveguide 1210, 1220, 1230. In some embodiments, as discussed herein, the incoupling optical elements 1212, 1222, 1232 are wavelength selective, such that they selectively redirect one or more wavelengths of light, while transmitting other wavelengths of light. While illustrated on one side or corner of their respective waveguide 1210, 1220, 1230, it will be appreciated that the incoupling optical elements 1212, 1222, 1232 may be disposed in other areas of their respective waveguide 1210, 1220, 1230 in some embodiments.

As illustrated, the incoupling optical elements 1212, 1222, 1232 may be laterally offset from one another. In some embodiments, each incoupling optical element may be offset such that it receives light without that light passing through another incoupling optical element. For example, each incoupling optical element 1212, 1222, 1232 may be configured to receive light from a different image injection device 1200, 1202, 1204, 1206, and 1208 as shown in FIG. 6, and may be separated (e.g., laterally spaced apart) from other incoupling optical elements 1212, 1222, 1232 such that it substantially does not receive light from the other ones of the incoupling optical elements 1212, 1222, 1232.

Each waveguide also includes associated light distributing elements, with, e.g., light distributing elements 1214 disposed on a major surface (e.g., a top major surface) of waveguide 1210, light distributing elements 1224 disposed on a major surface (e.g., a top major surface) of waveguide 1220, and light distributing elements 1234 disposed on a major surface (e.g., a top major surface) of waveguide 1230. In some other embodiments, the light distributing elements 1214, 1224, 1234, may be disposed on a bottom major surface of associated waveguides 1210, 1220, 1230, respectively. In some other embodiments, the light distributing elements 1214, 1224, 1234, may be disposed on both top and bottom major surface of associated waveguides 1210, 1220, 1230, respectively; or the light distributing elements 1214, 1224, 1234, may be disposed on different ones of the top and bottom major surfaces in different associated waveguides 1210, 1220, 1230, respectively.

The waveguides 1210, 1220, 1230 may be spaced apart and separated by, e.g., gas, liquid, and/or solid layers of material. For example, as illustrated, layer 1218a may separate waveguides 1210 and 1220; and layer 1218b may separate waveguides 1220 and 1230. In some embodiments, the layers 1218a and 1218b are formed of low refractive index materials (that is, materials having a lower refractive index than the material forming the immediately adjacent one of waveguides 1210, 1220, 1230). Preferably, the refractive index of the material forming the layers 1218a, 1218b is 0.05 or more, or 0.10 or more less than the refractive index of the material forming the waveguides 1210, 1220, 1230. Advantageously, the lower refractive index layers 1218a, 1218b may function as cladding layers that facilitate total internal reflection (TIR) of light through the waveguides 1210, 1220, 1230 (e.g., TIR between the top and bottom major surfaces of each waveguide). In some embodiments, the layers 1218a, 1218b are formed of air. While not illustrated, it will be appreciated that the top and bottom of the illustrated set 1200 of waveguides may include immediately neighboring cladding layers.

Preferably, for ease of manufacturing and other considerations, the material forming the waveguides 1210, 1220, 1230 are similar or the same, and the material forming the layers 1218a, 1218b are similar or the same. In some embodiments, the material forming the waveguides 1210, 1220, 1230 may be different between one or more waveguides, and/or the material forming the layers 1218a, 1218b may be different, while still holding to the various refractive index relationships noted above.

With continued reference to FIG. 9A, light rays 1240, 1242, 1244 are incident on the set 1200 of waveguides. It will be appreciated that the light rays 1240, 1242, 1244 may be injected into the waveguides 1210, 1220, 1230 by one or more image injection devices 1200, 1202, 1204, 1206, 1208 (FIG. 6).

In some embodiments, the light rays 1240, 1242, 1244 have different properties, e.g., different wavelengths or different ranges of wavelengths, which may correspond to different colors. The incoupling optical elements 1212, 122, 1232 each deflect the incident light such that the light propagates through a respective one of the waveguides 1210, 1220, 1230 by TIR.

For example, incoupling optical element 1212 may be configured to deflect ray 1240, which has a first wavelength or range of wavelengths. Similarly, the transmitted ray 1242 impinges on and is deflected by the incoupling optical element 1222, which is configured to deflect light of a second wavelength or range of wavelengths. Likewise, the ray 1244 is deflected by the incoupling optical element 1232, which is configured to selectively deflect light of third wavelength or range of wavelengths.

With continued reference to FIG. 9A, the deflected light rays 1240, 1242, 1244 are deflected so that they propagate through a corresponding waveguide 1210, 1220, 1230; that is, the incoupling optical elements 1212, 1222, 1232 of each waveguide deflects light into that corresponding waveguide 1210, 1220, 1230 to incouple light into that corresponding waveguide. The light rays 1240, 1242, 1244 are deflected at angles that cause the light to propagate through the respective waveguide 1210, 1220, 1230 by TIR. The light rays 1240, 1242, 1244 propagate through the respective waveguide 1210, 1220, 1230 by TIR until impinging on the waveguide's corresponding light distributing elements 1214, 1224, 1234.

Figure 9B:
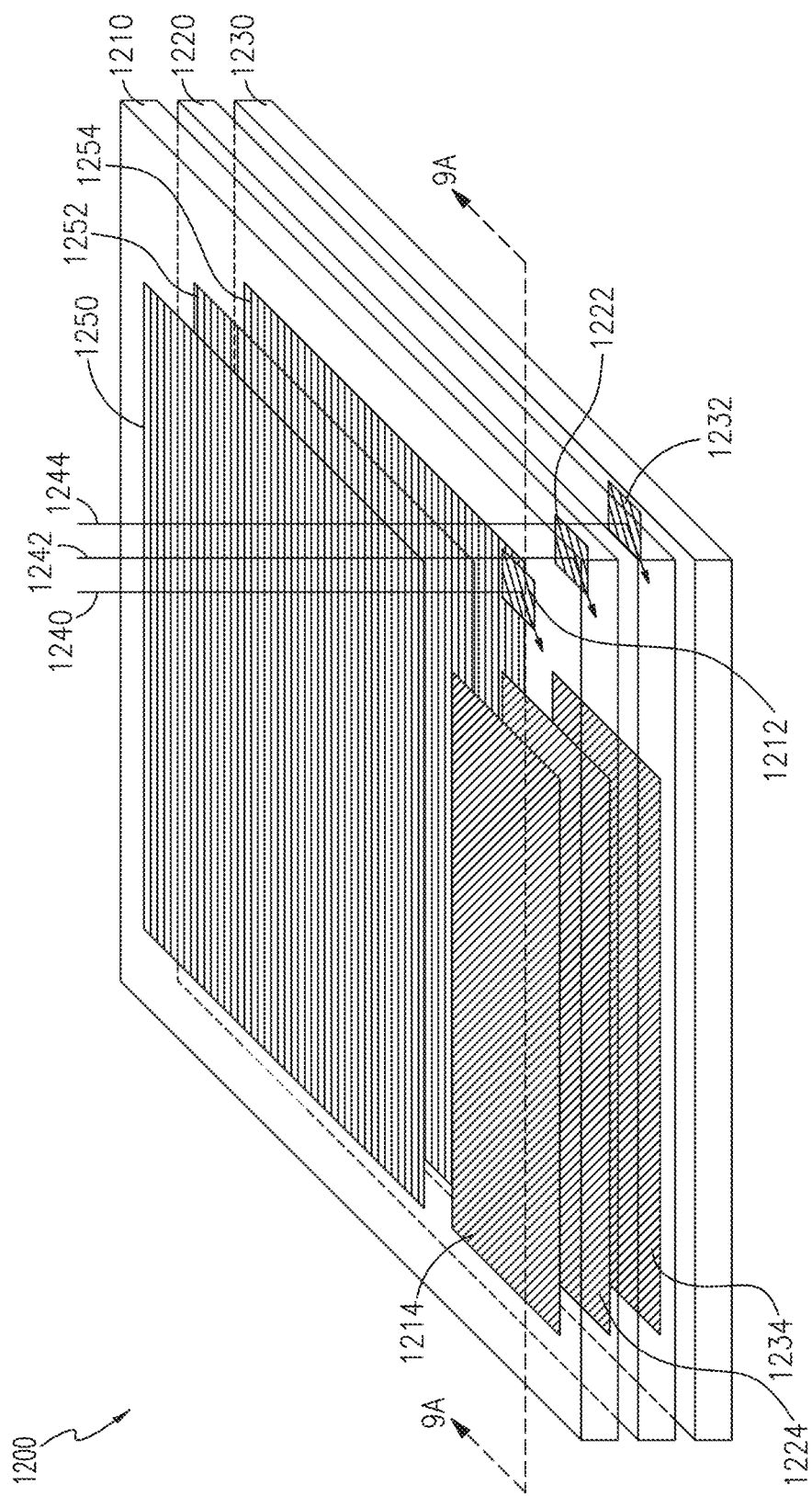
FIG. 9B illustrates a perspective view of an example of the plurality of stacked waveguides of FIG. 9A.

With reference now to FIG. 9B, a perspective view of an example of the plurality of stacked waveguides of FIG. 9A is illustrated. As noted above, the incoupled light rays 1240, 1242, 1244, are deflected by the incoupling optical elements 1212, 1222, 1232, respectively, and then propagate by TIR within the waveguides 1210, 1220, 1230, respectively. The light rays 1240, 1242, 1244 then impinge on the light distributing elements 1214, 1224, 1234, respectively. The light distributing elements 1214, 1224, 1234 deflect the light rays 1240, 1242, 1244 so that they propagate towards the outcoupling optical elements 1250, 1252, 1254, respectively.

In some embodiments, the light distributing elements 1214, 1224, 1234 are orthogonal pupil expanders (OPE's). In some embodiments, the OPE's both deflect or distribute light to the outcoupling optical elements 1250, 1252, 1254 and also increase the beam or spot size of this light as it propagates to the outcoupling optical elements. In some embodiments, e.g., where the beam size is already of a desired size, the light distributing elements 1214, 1224, 1234 may be omitted and the incoupling optical elements 1212, 1222, 1232 may be configured to deflect light directly to the outcoupling optical elements 1250, 1252, 1254. For example, with reference to FIG. 9A, the light distributing elements 1214, 1224, 1234 may be replaced with outcoupling optical elements 1250, 1252, 1254, respectively. In some embodiments, the outcoupling optical elements 1250, 1252, 1254 are exit pupils (EP's) or exit pupil expanders (EPE's) that direct light in a viewer's eye 4 (FIG. 7).

Accordingly, with reference to FIGS. 9A and 9B, in some embodiments, the set 1200 of waveguides includes waveguides 1210, 1220, 1230; incoupling optical elements 1212, 1222, 1232; light distributing elements (e.g., OPE's) 1214, 1224, 1234; and outcoupling optical elements (e.g., EP's) 1250, 1252, 1254 for each component color. The waveguides 1210, 1220, 1230 may be stacked with an air gap/cladding layer between each one. The incoupling optical elements 1212, 1222, 1232 redirect or deflect incident light (with different incoupling optical elements receiving light of different wavelengths) into its waveguide. The light then propagates at an angle which will result in TIR within the respective waveguide 1210, 1220, 1230. In the example shown, light ray 1240 (e.g., blue light) is deflected by the first incoupling optical element 1212, and then continues to bounce down the waveguide, interacting with the light distributing element (e.g., OPE's) 1214 and then the outcoupling optical element (e.g., EPs) 1250, in a manner described earlier. The light rays 1242 and 1244 (e.g., green and red light, respectively) will pass through the waveguide 1210, with light ray 1242 impinging on and being deflected by incoupling optical element 1222. The light ray 1242 then bounces down the waveguide 1220 via TIR, proceeding on to its light distributing element (e.g., OPEs) 1224 and then the outcoupling optical element (e.g., EP's) 1252. Finally, light ray 1244 (e.g., red light) passes through the waveguide 1220 to impinge on the light incoupling optical elements 1232 of the waveguide 1230. The light incoupling optical elements 1232 deflect the light ray 1244 such that the light ray propagates to light distributing element (e.g., OPEs) 1234 by TIR, and then to the outcoupling optical element (e.g., EPs) 1254 by TIR. The outcoupling optical element 1254 then finally outcouples the light ray 1244 to the viewer, who also receives the outcoupled light from the other waveguides 1210, 1220.

Figure 9C:
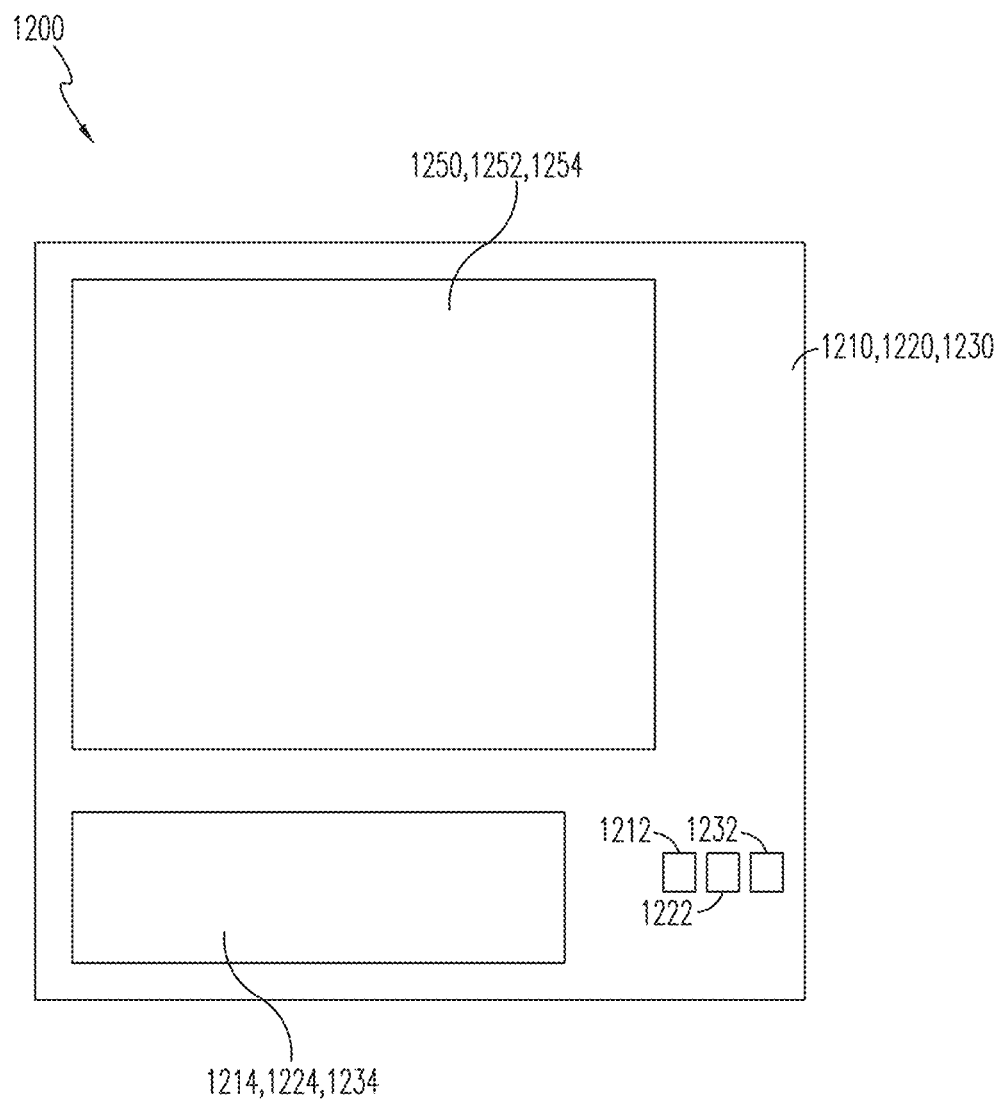
FIG. 9C illustrates a top-down plan view of an example of the plurality of stacked waveguides of FIGS. 9A and 9B.

FIG. 9C illustrates a top-down plan view of an example of the plurality of stacked waveguides of FIGS. 9A and 9B. As illustrated, the waveguides 1210, 1220, 1230, along with each waveguide's associated light distributing element 1214, 1224, 1234 and associated outcoupling optical element 1250, 1252, 1254, may be vertically aligned. However, as discussed herein, the incoupling optical elements 1212, 1222, 1232 are not vertically aligned; rather, the incoupling optical elements are preferably non-overlapping (e.g., laterally spaced apart as seen in the top-down view). As discussed further herein, this nonoverlapping spatial arrangement facilitates the injection of light from different resources into different waveguides on a one-to-one basis, thereby allowing a specific light source to be uniquely coupled to a specific waveguide. In some embodiments, arrangements including nonoverlapping spatially-separated incoupling optical elements may be referred to as a shifted pupil system, and the in coupling optical elements within these arrangements may correspond to sub pupils.

Spatially Variable Liquid Crystal Diffraction Gratings

As described above in reference to FIGS. 6 and 7, display systems according to various embodiments described herein may include outcoupling optical elements (e.g., optical elements 1282, 1284, 1286, 1288, 1290 in FIG. 6), which may include diffraction gratings. As described above in reference to FIG. 7, light 400 that is injected into the waveguide 1182 at the input surface 1382 of the waveguide 1182 propagates within the waveguide 1182 by total internal reflection (TIR). Referring back to FIG. 7, at points where the light 400 impinges on the outcoupling optical element 1282, a portion of the light exits the waveguide as exit beams 402. In some implementations, it may be desirable to have the optical element 1282 be configured as a diffraction grating having spatially varying optical properties, including diffraction properties. Such configuration may be desirable, for example, when the intensity of the light substantially attenuates as it propagates within the waveguide 1182. Under such circumstances, it may be desirable have certain diffraction characteristics of the grating 1282, e.g., diffraction efficiency (a ratio of diffracted beam intensity to the incident beam intensity) or refractive index, vary along the light propagation direction, such that uniformity of the intensity of the exiting beams 402 are improved. Such configurations may also be desirable, for example, to intentionally skew the light intensity across the grating 1282 to adapt to spatial and/or angular variation of sensing efficiencies associated with the human eye to maximize the user experience. Thus, there is a need for outcoupling optical elements, e.g., diffraction gratings, having spatially varying optical characteristics.

For some applications, graded diffraction properties can be achieved by structurally varying periodic structures of the grating, e.g., by using semiconductor processing technology. For example, semiconductor etching technology can be used to holographically pattern gratings into rigid substrate materials such as fused silica. By spatially varying the etch profiles, for instance, correspondingly spatially varying duty cycle or grating depth can be produced. However, such approaches often involve relatively complex and expensive processes, e.g., multiple etch processes. Thus, diffraction gratings with spatially varying optical properties, which can be fabricated with relatively simple processing technologies, could be beneficial. To this end, according to various embodiments disclosed herein, liquid crystal materials are used to spatially vary diffraction characteristics across the area of a diffraction gratings, e.g., by spatially varying alignment characteristics or other material properties of the liquid crystal molecules. In various embodiments, photopolymerizable liquid crystal materials, or reactive mesogens, are used to spatially vary the diffraction characteristics of diffraction gratings. For example, by coating different areas of a grating with a liquid crystal material and spatially varying its properties, e.g., alignment properties, spatially varying diffraction properties can be generated.

In the following, various embodiments of liquid crystal (LC) gratings having varying optical properties, e.g., gradient optical properties, such as varying diffraction properties including diffraction efficiency. Generally, diffraction gratings have a periodic structure, which splits and diffracts light into several beams travelling in different directions. The directions of these beams depend, among other things, on the period of the periodic structure and the wavelength of the light. To achieve optical properties that spatially vary across the area of the grating, e.g., spatially varying diffraction efficiencies, for certain applications such as outcoupling optical element 282 having uniform intensity of the exiting light beams 402, material properties of liquid crystals can be spatially varied.

Generally, liquid crystals possess physical properties that may be intermediate between conventional fluids and solids. While liquid crystals are fluid-like in some aspects, unlike most fluids, the arrangement of molecules within them exhibits some structural order. Different types of liquid crystals include thermotropic, lyotropic, and polymeric liquid crystals. Thermotropic liquid crystals disclosed herein can be implemented in various physical states, e.g., phases, including a nematic state/phase, a smectic state/phase, a chiral nematic state/phase or a chiral smectic state/phase.

As described herein, liquid crystals in a nematic state or phase can have calamitic (rod-shaped) or discotic (disc-shaped) organic molecules that have relatively little positional order, while having a long-range directional order with their long axes being roughly parallel. Thus, the organic molecules may be free to flow with their center of mass positions being randomly distributed as in a liquid, while still maintaining their long-range directional order. In some implementations, liquid crystals in a nematic phase can be uniaxial; i.e., the liquid crystals have one axis that is longer and preferred, with the other two being roughly equivalent. In other implementations, liquid crystals can be biaxial; i.e., in addition to orienting their long axis, the liquid crystals may also orient along a secondary axis.

As described herein, liquid crystals in a smectic state or phase can have the organic molecules that form relatively well-defined layers that can slide over one another. In some implementations, liquid crystals in a smectic phase can be positionally ordered along one direction. In some implementations, the long axes of the molecules can be oriented along a direction substantially normal to the plane of the liquid crystal layer, while in other implementations, the long axes of the molecules may be tilted with respect to the direction normal to the plane of the layer.

As described herein, nematic liquid crystals are composed of rod-like molecules with the long axes of neighboring molecules approximately aligned to one another. To describe this anisotropic structure, a dimensionless unit vector n called the director, may be used to describe the direction of preferred orientation of the liquid crystal molecules.

As describe herein, liquid crystals in a nematic state or a smectic state can also exhibit chirality. In a chiral phase, the liquid crystals can exhibit a twisting of the molecules perpendicular to the director, with the molecular axis parallel to the director. The finite twist angle between adjacent molecules is due to their asymmetric packing, which results in longer-range chiral order.

As described herein, liquid crystals in a chiral smectic state or phase can be configured such that the molecules have positional ordering in a layered structure, with the molecules tilted by a finite angle with respect to the layer normal. In addition, chirality can induce successive azimuthal twists from one layer to the next, producing a spiral twisting of the molecular axis along the layer normal.

As described herein, liquid crystals displaying chirality can be described as having a chiral pitch, p, which can refer to the distance over which the liquid crystal molecules undergo a full 360° twist. The pitch, p, can change when the temperature is altered or when other molecules are added to the liquid crystal host (an achiral liquid host material can form a chiral phase if doped with a chiral material), allowing the pitch of a given material to be tuned accordingly. In some liquid crystal systems, the pitch is of the same order as the wavelength of visible light. As described herein, liquid crystals displaying chirality can also be described as having a twist angle, which can refer, for example, to the relative azimuthal angular rotation between an uppermost liquid crystal molecule and a lowermost liquid crystal molecule across a thickness of the liquid crystal material.

According to various embodiments described herein, liquid crystals having various states or phases as described above can be configured to offer various desirable material properties for diffraction gratings, including, e.g., birefringence, optical anisotropy, and manufacturability using thin-film processes. For example, by changing surface conditions of liquid crystal layers and/or mixing different liquid crystal materials, grating structures that exhibit spatially varying diffraction properties, e.g., gradient diffraction efficiencies, can be fabricated.

As described herein, "polymerizable liquid crystals" may refer to liquid crystal materials that can be polymerized, e.g., in-situ photopolymerized, and may also be described herein as reactive mesogens (RM).

It will be appreciated that the liquid crystal molecules may be polymerizable in some embodiments and, once polymerized, may form a large network with other liquid crystal molecules. For example, the liquid crystal molecules may be linked by chemical bonds or linking chemical species to other liquid crystal molecules. Once joined together, the liquid crystal molecules may form liquid crystal domains having substantially the same orientations and locations as before being linked together. For ease of description, the term "liquid crystal molecule" is used herein to refer to both the liquid crystal molecules before polymerization and to the liquid crystal domains formed by these molecules after polymerization.

According to particular embodiments described herein, photo-polymerizable liquid crystal materials can be configured to form a diffraction grating, whose material properties, including birefringence, chirality, and ease for multiple-coating, can be utilized to create gratings with graded diffraction efficiencies, as changes in these material properties (e.g., birefringence, chirality, and thickness) result in variations in diffraction efficiencies accordingly.

It will be appreciated that, as described herein, a "transmissive" or "transparent" structure, e.g., a transparent substrate, may allow at least some, e.g., at least 20, 30 or 50%, of an incident light, to pass therethrough. Accordingly, a transparent substrate may be a glass, sapphire or a polymeric substrate in some embodiments. In contrast, a "reflective" structure, e.g., a reflective substrate, may reflect at least some, e.g., at least 20, 30, 50, 70, 90% or more of the incident light, to reflect therefrom.

Optical properties of a grating are determined by the physical structures of the grating (e.g., the periodicity, the depth, and the duty cycle), as well as material properties of the grating (e.g., refractive index, absorption, and birefringence). When liquid crystals are used, optical properties of the grating can be controlled by controlling, e.g., molecular orientation or distribution of the liquid crystal materials. For example, by varying molecular orientation or distribution of the liquid crystal material across the grating area, the grating may exhibit graded diffraction efficiencies. Such approaches are described in the following, in reference to the figures.

In various embodiments, a diffraction grating comprises a substrate and a plurality of different diffracting zones having a periodically repeating lateral dimension corresponding to a grating period adapted for light diffraction. The diffraction grating further comprises a plurality of different liquid crystal layers corresponding the different diffracting zones, wherein the different liquid crystal layers have liquid crystal molecules that are aligned differently, such that the different diffracting zones have different optical properties associated with light diffraction.

Photo-Aligned Spatially Variable Liquid Crystal Diffraction Gratings

Figure 10A:
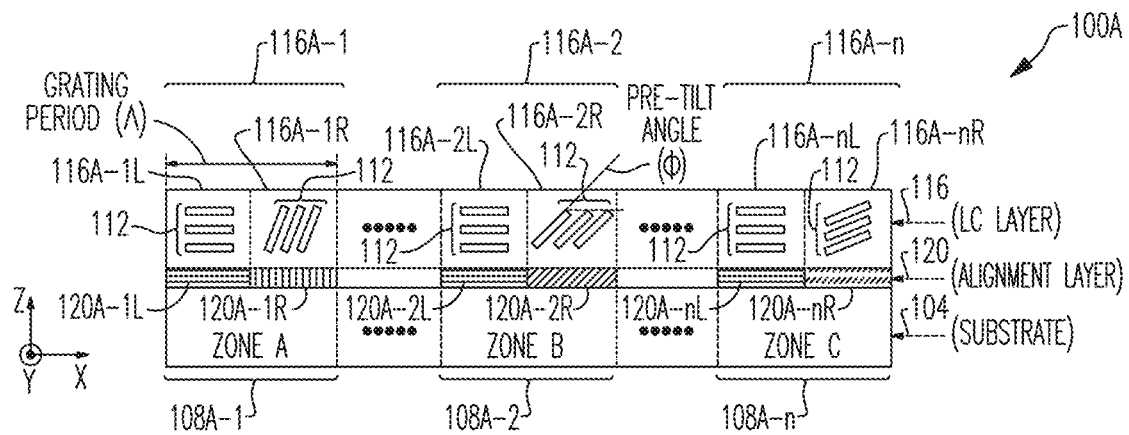
FIGS. 10A-10C illustrate cross-sectional side views of diffraction gratings having zones in which liquid crystal molecules have different pre-tilt angles, according to embodiments.
Figure 10B:
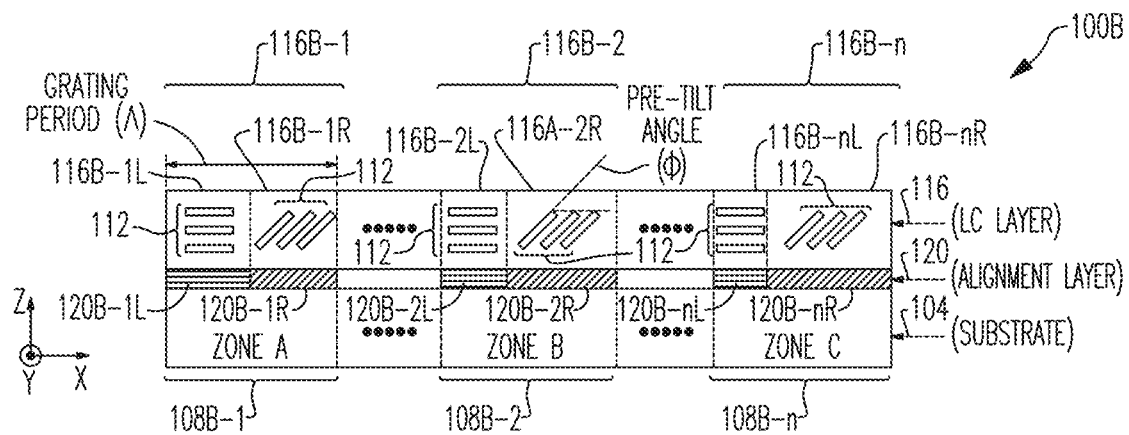
Figure 10C:
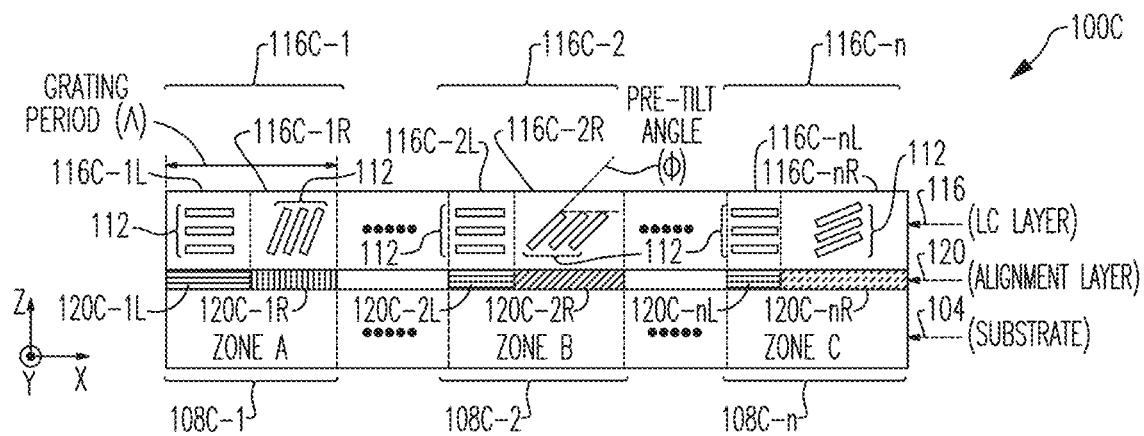

Referring to FIGS. 10A-10C, cross-sectional side views (viewed along the x-z plane) of diffraction gratings 100A-100C according to some embodiments are illustrated. Each of the diffraction gratings 100A-100C comprises a substrate 104 and a plurality of diffracting zones, i.e., diffracting zones 108A-1, 108A-2, . . . and 108A-n as illustrated in FIG. 10A, diffracting zones 108B-1, 108B-2, . . . and 108B-n as illustrated in FIG. 10B, and diffracting zones 108C-1, 108C-2, . . . and 108C-n as illustrated in FIG. 10C.

The diffracting zones of each of the diffraction gratings 100A-100C have a periodically repeating lateral dimension or a grating period Λ and include corresponding liquid crystal layers formed of liquid crystal molecules 112. In the illustrated embodiment and throughout this disclosure, the liquid crystal molecules 112 can be in a nematic state or a smectic state, or a mixture thereof, among other possible states of liquid crystal molecules. In the illustrated embodiment and throughout, various embodiments can have the grating period Λ that is between about 100 nm and about 10,000 nm, between about 200 nm and about 2000 nm or between about 300 nm and about 1000 nm, such that the plurality of diffracting zones are configured to diffract visible light.

The diffracting zones 108A-1, 108A-2, . . . 108A-n of the diffraction grating 100A have corresponding liquid crystal layers 116A-1, 116A-2, . . . 116A-n, respectively; diffracting zones 108B-1, 108B-2, . . . 108B-n of the diffraction grating 100B have corresponding liquid crystal layers 116B-1, 116B-2, . . . 116B-n, respectively; and diffracting zones 108C-1, 108C-2, . . . 108C-n of the diffraction grating 100C have corresponding liquid crystal layers 116C-1, 116C-2 and 116C-n, respectively.

It will be understood herein and throughout the specification that "n" can be a suitable integer for representing the number of different zones. For example, diffracting zones 108B-1, 108B-2, . . . 108B-n indicates that there can be n number of diffracting zones, where n is an integer. The number (n) of diffracting zones that is omitted from the Figures can be, for example, between 1 and about 500, between about 1 and about 200 or between about 1 and about 100. In some implementations, optical properties of a diffraction grating can vary continuously across the surface. In one implementation, for example, there can be one grating period Λ per diffracting zone for at least some of the diffracting zones. When each diffracting zone has one grating period Λ, the number (n) of diffracting zones can represent the number of grating periods Λ.

It will be understood herein and throughout the specification that, " . . . ," when indicated in a Figure, can represent the presence of additional diffracting zones between the illustrated zones, which can be contiguously connected and similar or the same as any other adjacently illustrated zone. In addition, " . . . " can also represent an arrangement of diffracting zones that periodically repeat any suitable number of times.

Each of the liquid crystal layers 116A-1, 116A-2 and 116A-n of the diffraction grating 100A in turn has differently arranged first and second diffracting regions 116A-1L and 116A-1R, 116A-2L and 116A-2R, . . . and 116A-nL and 116A-nR, respectively. Similarly, each of the liquid crystal layers 116B-1, 116B-2 and 116B-n of the diffraction grating 100B in turn has differently arranged first and second diffracting regions 116B-1L and 116B-1R, 116B-2L and 116B-2R, . . . and 116B-nL and 116B-nR, respectively. Similarly, each of the liquid crystal layers 116C-1, 116C-2 and 116C-n of the diffraction grating 100C in turn has differently arranged first and second diffracting regions 116C-1L and 116C-1R, 116C-2L and 116C-2R, . . . and 116C-nL and 116C-nR, respectively. The regions are sometimes referred to as domains of liquid crystal molecules Still referring to FIGS. 10A-10C, each of the different diffracting zones further comprises an alignment layer 120 interposed between the substrate 104 and the corresponding liquid crystal layer, wherein the alignment layer is configured to induce the alignment of the liquid crystal molecules in different regions of each zone. Interposed between the substrate 104 and the first/second diffracting regions 116A-1L/116A-1R, 116A-2L/116A-2R, . . . and 116A-nL/116A-nR of the diffraction grating 100A of FIG. 10A are first and second alignment layers 120A-1L/120A-1R, 120A-2L/120A-2R, . . . and 120A-nL/120A-nR, respectively. Similarly interposed between the substrate 104 and the first/second diffracting regions 116B-1L/116B-1R, 116B-2R/116B-2R, . . . and 116B-nL/116B-nR of the diffraction grating 100C of FIG. 10B are first/second alignment layers 120B-1L/120B-1R, 120B-2L/120B-2R, . . . and 120B-nL/120B-nR, respectively. Similarly, interposed between the substrate 104 and differently arranged first/second diffracting regions 116C-1L/116C-1R, 116C-2L/116C-2R, . . . and 116C-nL/116C-nR of the diffraction grating 100C of FIG. 10C are first/second alignment layers 120C-1L/120C-1R, 120C-2L/120C-2R, . . . and 120C-nL/120C-nR, respectively.

Herein and throughout the disclosure, an alignment direction of elongated liquid crystal molecules can refer to the direction of elongation of the liquid crystal molecules, or the direction of the director vector n.

Herein and throughout the disclosure, a tilt angle or a pre-tilt angle Φ can refer to an angle measured in a plane perpendicular to a major surface (in an x-y plane) of the liquid crystal layers or of the substrate, e.g., the x-z plane, and measured between an alignment direction and the major surface or a direction parallel to the major surface, e.g., the x-direction.

Herein and throughout the disclosure, an azimuthal angle or a rotation angle φ is used to describe an angle of rotation about an axis normal to a major surface (in an x-y plane), which is measured in a plane parallel to a major surface of the liquid crystal layers or of the substrate, e.g., the x-y plane, and measured between an alignment direction and a direction parallel to the major surface, e.g., the y-direction.

Herein and throughout the disclosure, when an alignment angle such as a pre-tilt angle Φ or a rotation angle φ are referred to as being substantially the same between different regions, it will be understood that an average alignment angles can, for example, be within about 1%, about 5% or about 10% of each other although the average alignment can be larger in some cases.

Herein and throughout the specification, a duty cycle can, for example, refers to a ratio between a first lateral dimension of a first region having liquid crystal molecules aligned in a first alignment direction, and the grating period of the zone having the first region. Where applicable, the first region corresponds to the region in which the alignment of the liquid crystals does not vary between different zones.

Still referring to FIGS. 10A-10C, each zone of the diffraction gratings 100A, 100B and 100C include first and second regions that alternate in the x-direction. Each of the first regions 116A-1L, 116A-2L, . . . and 116A-nL of the diffraction grating 100A, each of the first regions 116B-1L, 116B-2L, . . . and 116B-nL of the diffraction grating 100B and each of the first regions 116C-1L, 116C-2L, . . . and 116A-nL of the diffraction grating 100C have liquid crystal molecules 112 that are aligned substantially along the same first alignment direction and have a first pre-tilt angle Φ that is substantially the same. Each of the second regions 116A-1R, 116A-2R, . . . and 116A-nR of the diffraction grating 100A, each of the second regions 116B-1R, 116B-2R, . . . and 116B-nL of the diffraction grating 100B and each of the second regions 116C-1R, 116C-2R, . . . and 116C-nR of the diffraction grating 100C have liquid crystal molecules 112 that are aligned substantially along a second alignment direction different from the first alignment direction and have second pre-tilt angles Φ that are different, e.g., greater, than the first pre-tilt angle Φ of the respective first regions.

In each of the diffraction gratings 100A-100C of FIGS. 10A-10C, respectively, at least some of the diffracting zones have liquid crystal layers formed of liquid crystal molecules that are spatially arranged differently, e.g., have different pre-tilt angles from each other (FIGS. 10A and 10C), or have laterally varying duty cycles (FIGS. 10B and 10C), such that the diffracting zones have different optical properties, e.g., different refractive indices and different diffraction efficiencies, according to embodiments.

In particular, referring to diffraction grating 100A of FIG. 10A, in addition to having alignment directions and pre-tilt angles Φ that are different from the first pre-tilt angle Φ of the first regions 116A-1L, 116A-2L, . . . and 116A-nL, the liquid crystal molecules of different second regions 116A-1R, 116A-2R, . . . and 116A-nR are aligned along second alignment directions that are different from each other. For example, in the illustrated embodiment, the zones 108A-1, 108A-2 and 108A-n are arranged such that the first regions and second regions alternate in the x-direction, where each of the first regions 116A-1L, 116A-2L, . . . and 116A-nL has substantially the same pre-tilt angle Φ, while the second regions 116A-1R, 116A-2R, . . . and 116A-nR have pre-tilt angles Φ that are different from each other. By way of example, the first regions 116A-1L, 116A-2L, . . . and 116A-nL have a pre-tilt angle Φ that is between about ±15 degrees or between about ±10 degrees or between about ±5, e.g., 0 degrees. The second regions 116A-1R, 116A-2R, . . . and 116A-nR can have pre-tilt angles Φ that are different from each other and are each between about 60 degrees and about 90 degrees or between about 65 degrees and about 85 degrees, for instance about 75 degree; between about 35 degrees and about 65 degrees or between about 40 degrees and about 60 degrees, for instance about 50 degrees; between about 10 degrees and about 40 degrees or between about 15 degrees and about 35 degrees, for instance about 25 degrees.

Still referring to FIG. 10A, in some embodiments, as illustrated, the second regions 116A-1R, 116A-2R, . . . and 116A-nR can have tilt angles Φ that vary, e.g., increase or decrease in one direction in a lateral direction, such that a gradient in diffraction properties is created. In other embodiments, the second regions 116A-1R, 116A-2R, . . . and 116A-nR can have tilt angles Φ that do not vary in one direction in the lateral direction.

Still referring to FIG. 10A, the duty cycle, defined above, can be between about 10% and about 30%, between about 30% and about 50%, between about 40% and 60% (e.g., about 50%), between about 50% and about 70% or between about 70% and about 90%.

Referring now to FIG. 10B, the diffraction grating 100B share some common features as the diffraction grating 100A of FIG. 10A. However, unlike the diffracting grating 100B of FIG. 10A, while the liquid crystal molecules of different second regions 116B-1R, 116B-2R, . . . and 116B-nR have pre-tilt angles Φ that are different from the first pre-tilt angle Φ of the first regions 116B-1L, 116B-2L, . . . and 116B-nL, they are not aligned differently from each other. For example, in the illustrated embodiment, the zones 108B-1, 108B-2 and 108B-n are arranged such that the first regions and second regions alternate in the x-direction, where each of the first regions 116B-1L, 116B-2L, . . . and 116B-nL has substantially the same first pre-tilt angle Φ, and each of the second regions 116B-1R, 116B-2R, . . . and 116B-nR has substantially the same second pre-tilt angles Φ. The first and second pre-tilt angles of the first and second regions can have any of the values discussed above with respect to the diffraction grating 100A of FIG. 10A.

Still referring to FIG. 10B, unlike the grating 100A of FIG. 10A, the zones 116B-1, 116B-2 and 116B-3 have substantially the same pre-tilt angle, e.g., between about 0 to 90 degrees, while having a duty cycle between about 40% and about 60%, for instance about 50%; between about 30% and about 50%, for instance about 40% and a duty cycle between about 20% and about 40%, for instance about 30%, respectively, such that the diffraction grating 100B has spatially varying optical properties.

Still referring to FIG. 10B, in some embodiments, as illustrated, the zones can have duty cycles that vary, e.g., increase or decrease in one direction in a lateral direction, such that a gradient in optical properties is created. In other embodiments, the duty cycles do not vary in one direction in the lateral direction.

Referring now to FIG. 10C, the illustrated diffraction grating 100C combines features similar to those described above with respect to the diffraction gratings 100A and 100B of FIGS. 10A and 10B. In particular, the liquid crystal molecules of different second regions 116C-1R, 116C-2R, . . . and 116C-nR can have pre-tilt angles Φ that are different from the first pre-tilt angle Φ of the first regions 116C-1L, 116C-2L, . . . and 116C-nL, and aligned differently from each other. In addition, the duty cycle varies between adjacent zones across a lateral direction, e.g., x-direction. The first and second pre-tilt angles of the first and second regions can have any of the values discussed above with respect to the diffraction grating 100A of FIG. 10A. In addition, the duty cycle variation between adjacent zones across a lateral direction, e.g., x-direction, can also have values discussed above with respect to the diffraction grating 100B of FIG. 10B.

In the diffraction gratings 100A-100C illustrated in FIGS. 10A-10C and throughout the disclosure, it will be appreciated that, in addition to the grating period and duty cycle discussed above, the diffraction properties can be further defined by, among other things, the thickness and the refractive index of the liquid crystal layer 116. According to various embodiments disclosed herein, the thickness of the liquid crystal layers disclosed herein can have a thickness between about 1 μm and about 100 μm, between about 0.5 μm and about 20 μm or between about 0.1 μm and about 10 μm. An average refractive index of the liquid crystal layers disclosed herein can be between about 1.8 and about 2.0, between about 1.6 and about 1.8 or between about between about 1.4 and about 1.2. The resulting average diffraction efficiency of various diffraction gratings disclosed herein can be between about 1% and about 80%, between about 1% and about 50% or between about between about 5% and about 30%.

As a result of implementing various embodiments disclosed herein and throughout the disclosure, different zones can have indices of refraction that vary between about −30% and about +30%, between about −20% and about +20% or between about −10% and about +10% across the surface area of the diffraction grating, with respect to the average refractive index. As a further result, different zones can have diffraction efficiencies that vary between about 1% and about 80%, between about 1% and about 50% or between about 1% and about 30% across the surface area of the diffraction grating, with respect to the average diffraction efficiency.

Figure 11A:
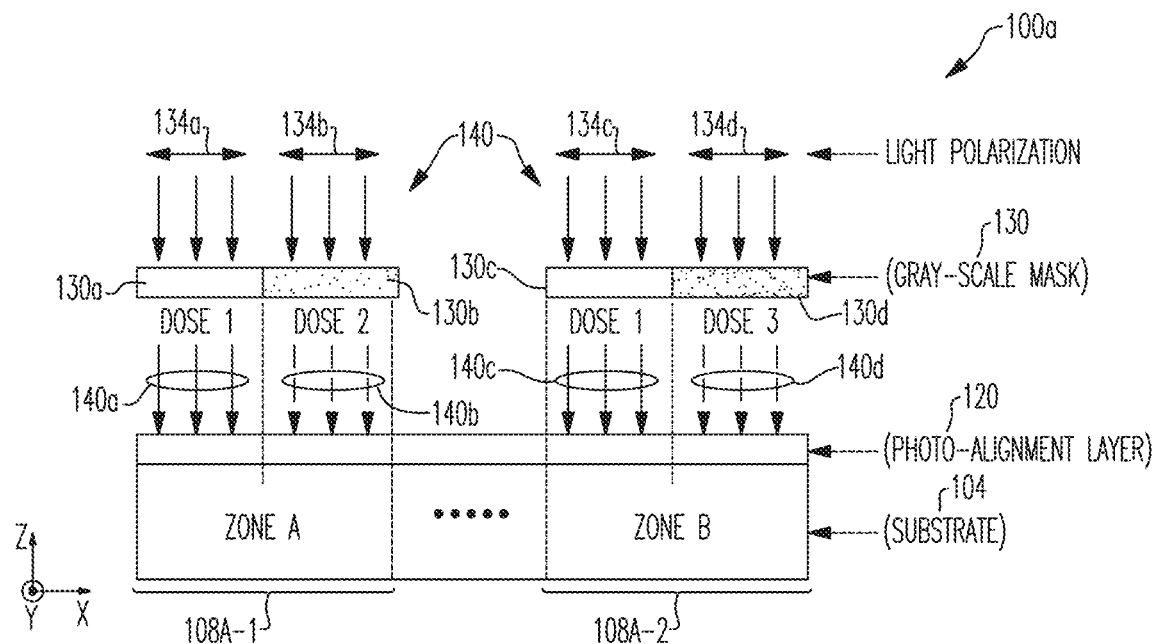
FIGS. 11A-11B are cross-sectional side views of an intermediate structure and a diffraction grating illustrating a method of fabricating the diffraction gratings illustrated in FIGS. 10A-10C, according to embodiments.
Figure 11B:
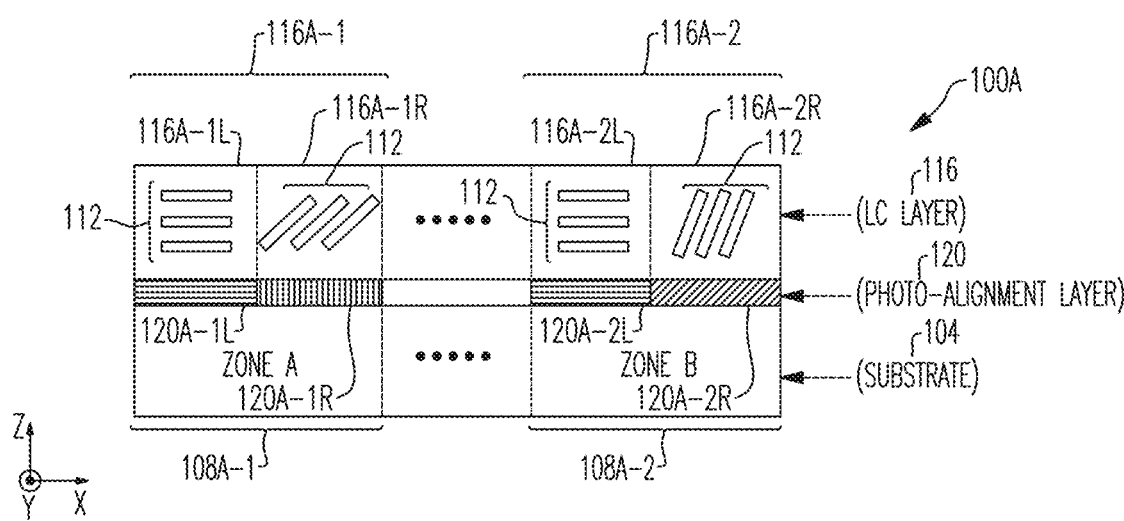

FIGS. 11A and 11B illustrate a method for fabricating diffraction gratings having liquid crystal molecules with non-uniform pre-tilt angles across the surface such as, e.g., diffraction gratings 100A-100C of FIGS. 10A-10C described above, using photo-alignment techniques, according to embodiments.

Referring to an intermediate structure 100a of FIG. 11A, a substrate 104 is provided, on which a photo-alignment layer 120 is formed. The substrate 104 can be an optically transparent substrate that is transparent in the visible spectrum, such as, e.g., silica-based glass, quartz, sapphire, indium tin oxide (ITO) or polymeric substrates, to name a few examples.

As described herein, a photo-alignment layer can refer to a layer on which, when a liquid crystal molecules are deposited, the liquid crystal molecules become oriented, for example, due to anchoring energy exerted on the liquid crystal molecule by the photo-alignment layer. Examples of photo-alignment layers include polyimide, linear-polarization photopolymerizable polymer (LPP), azo-containing polymers, courmarine-containing polymers and cinnamate-containing polymers, to name a few.

The photo-alignment layer 120 can be formed by dissolving precursors, e.g., monomers, in a suitable solvent and coating, spin-coating, the surface of the substrate 104 with the solution. The solvent can thereafter be removed from the coated solution.

After coating and drying the photo-alignment layer 120, a photomask 130 can be used to expose different regions of the underlying photo-alignment layer 120 to different doses of light and/or different polarizations of light. For example, the regions of the photo-alignment layer 120 that are to be exposed differently can correspond to first (e.g., left) and second (e.g., right) regions of each of zones 108A-1 and 108A-2 described above with respect to the diffraction grating 100A of FIG. 10A.

In some embodiments, the photo-alignment layer 120 can be configured such that the resulting liquid crystal molecules are oriented substantially parallel to the polarization direction of the exposure light (e.g., the azimuthal angle φ and the linear polarization angle of the exposure light are substantially the same). In other embodiments, the photo-alignment layer 120 can be configured such that the liquid crystal molecules are oriented substantially orthogonal to the polarization direction of the exposure light (e.g., the azimuthal angle φ and the linear polarization angle of the exposure light are substantially offset by about +/−90 degrees).

In one example, the photomask 130 can be a gray-scale mask having a plurality of mask regions 130a-130d that are at least partially transparent and possibly have one or more opaque regions. Different ones of the plurality of mask regions 130a-130d may be configured to transmit different amounts of the incident light 140, such that transmitted light 140a-140d transmitted through different ones of the plurality of mask regions 130a-130d has varying intensities that are proportional to the relative transparency of the different mask regions 130a-130d to the incident light 140. However, embodiments are not so limited and other mask types can be used. For example, the photomask 130 can be a binary mask having the plurality of mask regions 130a-130d each being fully or nearly fully transparent or fully or nearly fully opaque, such that transmitted light 140a-140d transmitted through the plurality of mask regions 130a-130d has binary intensities.

The photomask 130 can be formed of a suitable material which at least partially absorbs UV light. In some embodiments, the varying intensities of transmitted light across different mask regions 130a-130d can be achieved by using different materials (e.g., having different absorption coefficients) in the different regions, materials doped possibly different amounts in different regions or by using different thicknesses in the different regions. Other types of masks can be used. In some embodiments, the photomask 130 can contact the underlying photo-alignment layer 120, while in other embodiments, the photomask 130 does not contact the underlying photo-alignment layer 120.

The incident light can be UV light, e.g., from a high pressure Hg-lamp, e.g., for their spectral lines at 436 nm ("g-line"), 405 nm ("h-line") and 365 nm ("i-line"). However, embodiments are not so limited, and the incident light can be any suitable light to which the photo-alignment layer 120 is responsive, including visible light. When polarized, the incident UV-light can be polarized using a suitable polarizer. Accordingly, in various cases, the mask is transmissive to UV-light. Other ways of patterning besides utilizing a photo-mask can be employed.

In some embodiments, the incident light 140 can be generated for a duration by using a single uniform incident light source. However, embodiments are not so limited, and in other embodiments, the incident light 140 can vary in intensity across different mask regions 130a-130d. Furthermore, in yet other embodiments, the incident light 140 can be selectively generated for different durations across different mask regions 130a-130d.

Furthermore, in the illustrated embodiment, the incident light 140 can be polarized, e.g., linearly polarized, as schematically depicted by polarization vectors 134a-134d. However, the incident light 140 according to other embodiments can be circularly or elliptically polarized. In some embodiments, the polarization vectors 134a-134d can represent different polarization angles, while in some other embodiments, the incident light 140 can have a single polarization angle.

Without being bound to any theory, the combination of the photo-alignment material and the different doses and polarization(s) of the transmitted light 140a-140d causes various regions of the resulting photo-alignment layer 120 to exert different amounts of anchoring energy on the overlying liquid crystal molecules, thereby causing the different orientations of the liquid crystal molecules, as described herein. Other methods that may or may not employ masks may be used as well.

Referring to FIG. 11B, after exposing the photo alignment layer 120 to varying doses of transmitted light 140a-140d using various techniques described above, a liquid crystal layer 116 can be formed on the photo alignment layer 120.

The liquid crystal layer 116 can be formed by dissolving liquid crystal precursors, e.g., monomers, in a suitable solvent and coating, e.g., spin-coating, the surface of the alignment layer 120 with the solution having the liquid crystal precursors dissolved therein. The solvent can thereafter be removed from the coated solution In various embodiments, the reactive mesogen materials used for forming the liquid crystal layer 116 include liquid crystalline mono- or di-acrylate, for example.

Because of the different doses and or polarization angle of light received by different regions of the photo alignment layer 120 as described above, the liquid crystal layer, e.g., as-deposited, forms the liquid crystal layers 116A-1 and 116A-2 in zones 108A-1 and 108A-2, respectively. The liquid crystal layers 116A-1 and 116A-2, in turn, have first and second diffracting regions 116A-1L and 116A-1R, and 116A-2L and 116A-2R, respectively. As described above with respect to FIG. 10A, the first regions and second regions alternate in the x-direction, where each of the first regions 116A-1L and 116A-2L has substantially the same first pre-tilt angle Φ, while the second regions 116A-1R and 116A-2R have pre-tilt angles Φ that are different from each other and from the first pre-tilt angle of the first regions. Without being bound to any theory, in some types of photo-alignment materials, exposure of the underlying photo-alignment layer 120 to light is believed to increase the anchoring energy that causes the in-plane alignment of the liquid crystal molecules. As a result, in these photo-alignment materials, increasing the exposure leads to a corresponding reduction in the pre-tile angle Φ of the liquid crystal layers formed thereon, according to embodiments. However, in other types of photo-alignment materials, exposure of the underlying photo-alignment layer 120 to light is believed to decrease the anchoring energy that causes the in-plane alignment of the liquid crystal molecules. As a result, in these photo-alignment materials, increasing the exposure leads to a corresponding increase in the pre-tilt angle Φ of the liquid crystal layers formed thereon, according to embodiments.

Thus, according to embodiments, the degree of tilt, as measured by the pre-tilt angle Φ, is inversely proportional to the dose of transmitted light received by the underlying photo-alignment layer 120. For example, in the illustrated embodiment, the photo-alignment layers 120A-1L and 120A-2L receive the highest amount of incident light, followed by the alignment layer 120A-1R, followed by the alignment layer 120-2R. As a result, the resulting pre-tilt angles are highest for the second region 116A-2R of the zone 108A-2, followed by the second region 116A-1R of the zone 108A-1, followed by the first regions 116A-1L and 116A-2L of the zones 108A-1 and 108A-2, respectively.

Figure 12A:
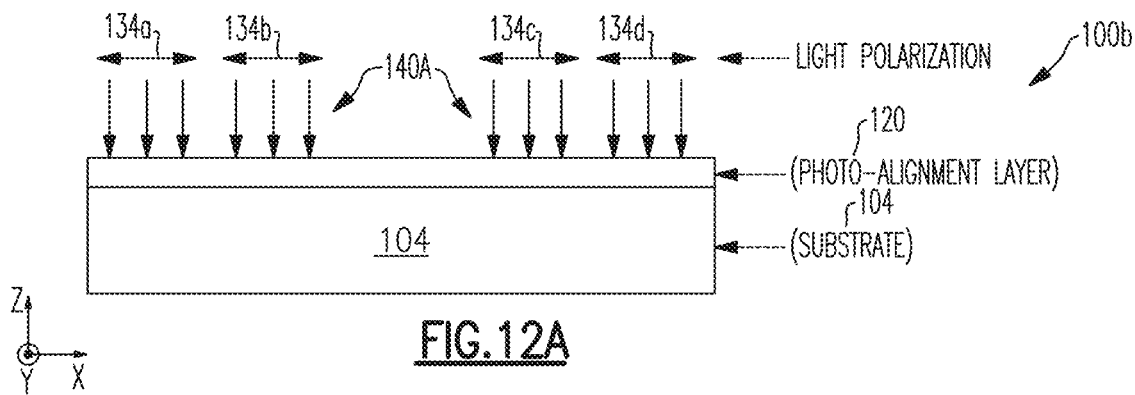
FIGS. 12A-12C are cross-sectional side views of intermediate structures and a diffraction grating illustrating a method of fabricating the diffraction gratings illustrated in FIGS. 10A-10C, according to embodiments.
Figure 12B:
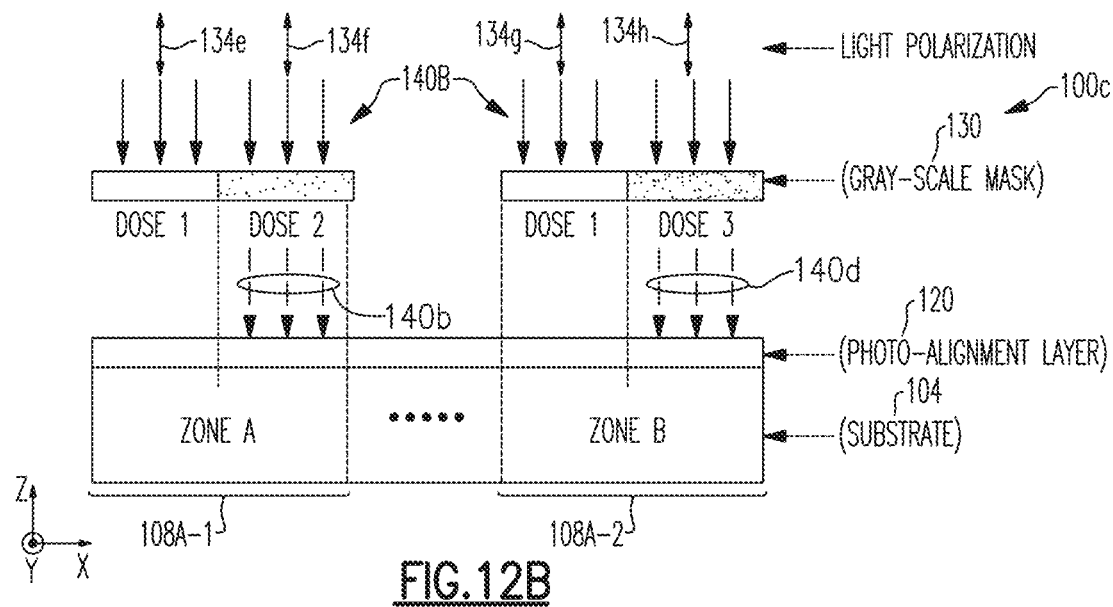
Figure 12C:
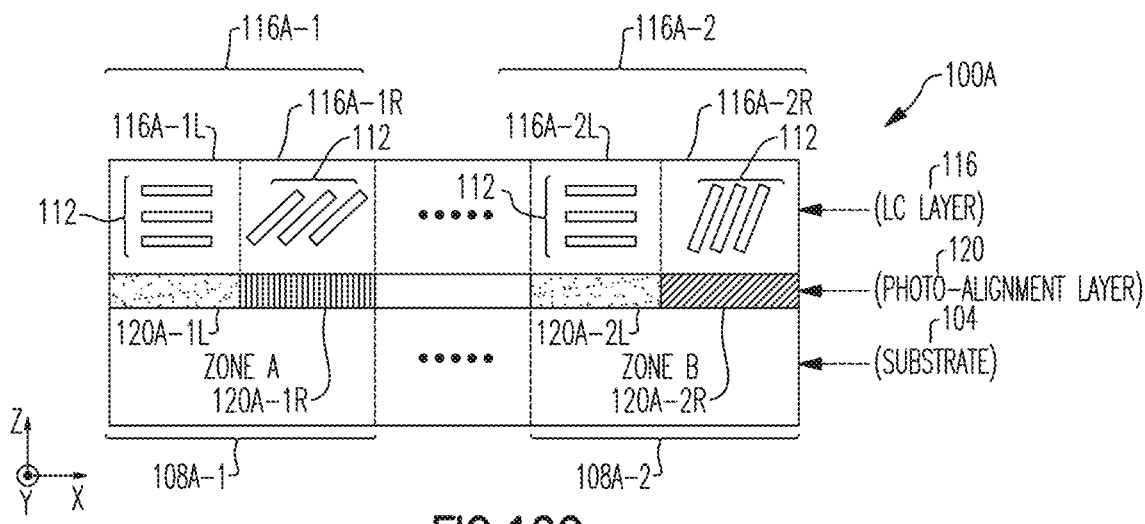

FIGS. 12A-12C illustrate another method for fabricating diffraction gratings having non-uniform pre-tilt angles, e.g., diffraction gratings 100A-100C of FIGS. 10A-10C described above, using photo-alignment techniques, according to embodiments. In particular, in the illustrated embodiment, the method uses multiple exposures of the alignment layers prior to formation of the liquid crystals.

In the illustrated method of FIGS. 12A-12C, similar to the method illustrated with respect to FIGS. 11A-11B, a substrate 104 is provided on which a photo-alignment layer 120 is formed. However, unlike the method illustrated with respect to FIGS. 11A-11B, prior to using a photomask 130 to expose different regions of the underlying photo-alignment layer 120 to different doses of light and/or different polarizations of light, the photo-alignment layer 120 is exposed to a primary (e.g., blanket) pattern of light using a first incident light 140A. The primary pattern of light may be produced using, e.g., blanket exposing using, e.g., a blanket semitransparent gray scale mask (not shown). In the illustrated embodiment, a mask may be omitted for the blanket exposure to the primary pattern of light.

The first incident light 140A can be polarized, e.g., linearly polarized at a first polarization angle, as schematically depicted by polarization vectors 134a-134d. The first incident light 140A that is linearly polarized can create a uniform alignment of the liquid crystal molecules. Subsequent to exposing to the primary (e.g., blanket) pattern of light, the alignment layer 120 may be further exposed to a secondary pattern of light using a second incident light 140B and a photomask 130, which is configured to expose different regions of the underlying photo-alignment layer 120 to different doses of light and/or different polarizations of light, in a manner substantially similar to the method described above with respect to FIGS. 11A-11B. For example, different regions of the photo-alignment layer 120 corresponding to first (e.g., left) and second (e.g., right) regions of each of zones 108A-1 and 108A-2 as described above with respect to the diffraction grating 100A can be exposed to different doses and/or different polarization of light. Unlike the first incident light 140A, the second incident light 140B can be unpolarized or circularly polarized. The second incident light 140B that is unpolarized or circularly polarized can redistribute alignment directions of the liquid crystal molecules. The resulting diffraction grating 100A is similar to that described above with respect to FIG. 11B, where first regions and second regions alternate in the x-direction, and where each of the first regions 116A-1L and 116A-2L has substantially the same first pre-tilt angle Φ, while the second regions 116A-1R and 116A-2R have pre-tilt angles Φ that are different from each other and from the first pre-tilt angle of the first regions.

The second incident light 140B can be polarized, e.g., linearly polarized at a second polarization angle different from, e.g., orthogonal to, the second polarization angle of the first incident light 140A, as schematically depicted by polarization vectors 134e-134h. In some other embodiments, the first and second polarization angles are the same. In yet some other embodiments, the first and second polarization angles are different while not orthogonal. Furthermore, the second incident light 140B according to other embodiments can be circularly or elliptically polarized, having similar or different polarization orientation relative to the first incident light 140A.

In the embodiments described above in reference to FIGS. 11A-11B and FIGS. 12A-12C, methods of controlling pre-tilt angles of liquid crystals using photo-alignment technique have been described. However, it will be appreciated that other embodiments are possible, including a process referred to as micro-rubbing, in which the alignment layers are rubbed with a metallic object, e.g., a metallic sphere under a load. For example, a metallic sphere is in direct contact with the alignment layer may be moved across the alignment layer to creating micrometer-sized rubbed lines, which induce the pre-tilting of the subsequently deposited liquid crystals. In yet other embodiments, alignment materials pre-configured to induce different pre-tilt angles can be deposited, instead of post-treating them to induce the pre-tilting of the liquid crystal molecules.

Referring now to FIGS. 13A and 13B, cross-sectional (x-z plane) views of diffraction gratings 103A and 103B according to some other embodiments are illustrated. The diffraction gratings 103A and 103B can be polarization gratings (PGs), which are configured to locally modify the polarization state of transmitted light, which can be achieved by spatially varying birefringence and/or dichroism. While not shown for clarity, each of the diffraction gratings 103A and 103B comprises a substrate and an alignment layer formed thereon, and a plurality of differently arranged diffracting zones 154A-1 and 154A-2 in FIG. 13A and diffracting zones 154B-1 and 154B-2 in FIG. 13B. The diffracting zones 154A-1 and 154A-2 of the diffraction grating 103A have corresponding liquid crystal layers 144A-1 and 144A-2, respectively and diffracting zones 154A-1 and 154A-2 of the diffraction grating 103B have corresponding liquid crystal layers 144B-1 and 144B-2, respectively.

Each of the liquid crystal layers 144A-1 and 144A-2 of the diffraction grating 103A in turn has a plurality of differently arranged diffracting regions 144A-1a through 144A-1g and 144A-2a through 144A-2g, respectively. Similarly, each of the liquid crystal layers 144B-1 and 144B-2 of the diffraction grating 103B in turn has a plurality of differently arranged diffracting regions 144B-1a through 144B-1g and 144B-2a through 144A-2g, respectively.

Referring to the diffraction grating 103A of FIG. 13A, each of the plurality of regions 144A-1a to 144A-1g of the zone 154A-1 and each of the plurality of regions 144A-2a to 144A-2g of the zone 154A-2 has liquid crystal molecules 112 that are aligned substantially along the same alignment direction within the same region. The liquid crystal molecules 112 of all regions of the zone 154A-1 have a first pre-tilt angle $\Phi$ that is substantially the same. In contrast, the liquid crystal molecules 112 of different regions of the zone 154A-2 have different pre-tilt angles 1. While in the illustrated embodiment, the pre-tilt angle $\Phi$ of a central region (144A-2d) of the zone 154A-2 has a pre-tilt angle $\Phi$ that is the smallest with increasing pre-tilt angles $\Phi$ for increasingly outer regions of the zone 154A-2, embodiments are not so limited. In addition, while the central region (144A-2d) in the illustrated embodiment has a pre-tilt angle $\Phi$ that is similar to the first pre-tilt angle $\Phi$ of the zone 154A-1, embodiments are not so limited. The pre-tilt angles of different regions of the diffraction grating 103A can have any of the magnitudes described supra with respect to FIGS. 10A-10C.

Still referring to FIG. 13A, in the illustrated embodiment, the liquid crystal molecules 112 of different regions of the zone 154A-1 have different azimuthal angles cp. However, embodiments are not so limited and in other embodiments, the liquid crystal molecules 112 of different regions of the zone 154A-1 can have the same azimuthal angles cp. The azimuthal angles of different regions of the diffraction grating 103A can have any of the magnitudes described infra with respect to FIGS. 15A-15C.

Referring to the diffraction grating 103B of FIG. 13B, similar to the diffraction grating 103A of FIG. 13A, each of the plurality of regions 144B-1a to 144B-1g of the zone 154B-1 has liquid crystal molecules 112 that are aligned substantially along the same alignment direction within the same region. Similar to the zone 154A-2 of the diffraction grating 103A of FIG. 13A, the liquid crystal molecules 112 of different regions of the zone 154B-1 have substantially different pre-tilt angles $\Phi$ and substantially different azimuthal angles cp. In contrast, each of the plurality of regions 144B-2a to 144B-2g of the zone 154B-2 has liquid crystal molecules 112 that are aligned substantially differently within the same region. That is, the individual liquid crystal molecules 112 of each region of the zone 154B-2 have substantially different pre-tilt angles $\Phi$ and substantially different azimuthal angles cp. For example, the liquid crystal molecules 112 of each region of the zone 154B-2 can have chirality, as described more in detail with respect to FIGS. 19A and 19B, infra.

Still referring to FIGS. 13A and 13B, while specific combinations of zones and regions within different zones have been presented as examples, it will be appreciated that the zone and regions within the zones can be mixed and matched. For example, a combination of the zone 154A-1 of FIG. 13A and the zone 154B-2 of FIG. 13B in a diffraction grating is possible.

FIGS. 14A-14B illustrate another method for fabricating diffraction gratings having non-uniform pre-tilt angles, e.g., diffraction gratings 103A and 103B of FIGS. 13A and 13B, respectively, using photo-alignment techniques, according to embodiments. In particular, in the illustrated embodiment, the method comprises polarization interference holographic exposure using a gray-scale mask, according to embodiments.

Polarization interference holographic exposure is a technique to create an interference pattern using multiple beams of coherent light. While most conventional holography uses an intensity modulation, polarization holography involves a modulation of the polarization state to create an interference pattern.

Referring to FIG. 14A, in the illustrated method, processes leading up to exposing the photo-alignment layer 120 to UV light is similar to the method described above with respect to FIGS. 11A-11B. In particular, the photo-alignment layer 120 is formed on a substrate 104 and a gray scale mask 130 is disposed partially over the photo-alignment layer 120. Thereafter, a plurality of coherent light beams 142a, 142b having different polarizations are directed to the plurality of differently arranged diffracting zones 154A-1 and 154A-2. In the illustrated embodiment, the light beams 142a and 142b include orthogonal circular polarized light beams. However, the light beams 142a and 142b can include non-orthogonal circular polarized light beams, for example. In the illustrated embodiment, the zone 154A-1 is exposed while the zone 154A-2 is masked with the gray scale mask 130. The plurality of light beams 142a and 142b are positioned and polarized such that the resulting interference effect results in the liquid crystal layers 144A-1 and 144A-2 of the diffraction grating 103A having a plurality of differently arranged diffracting regions 144A-1a through 144A-1g and 144A-2a through 144A-2g, respectively, as described above with respect to FIG. 13A. Similarly, using similar concepts, referring back to FIG. 13B, the liquid crystal layers 144B-1 and 144B-2 of the diffraction grating 103B having a plurality of differently arranged diffracting regions 144B-1a through 144B-1g and 144B-2a through 144B-2g, respectively, can be fabricated.

Figure 15A:
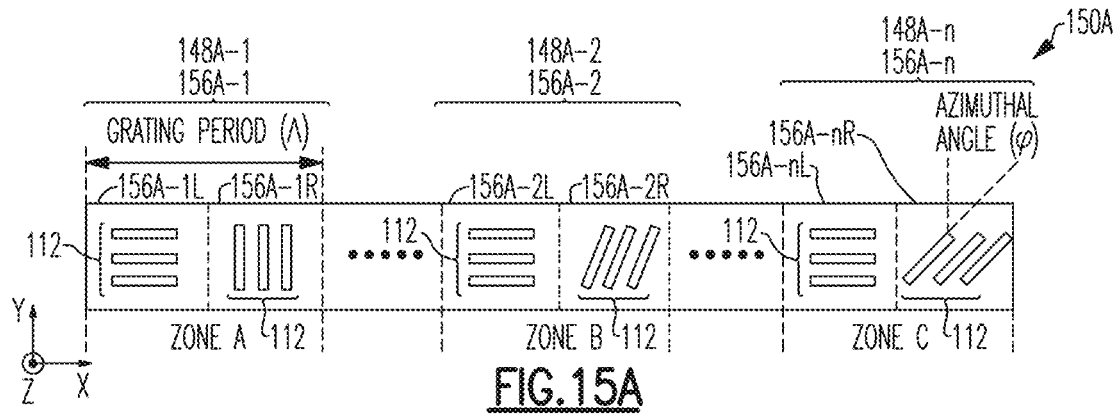
FIGS. 15A-15C illustrate top down plan views of diffraction gratings having zones in which liquid crystal molecules have different azimuthal angles, according to embodiments.
Figure 15B:
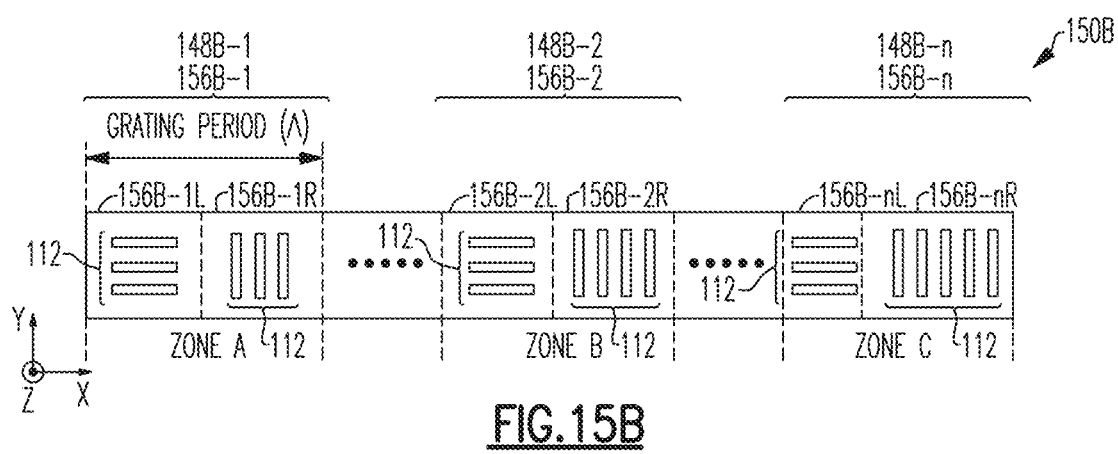
Figure 15C:
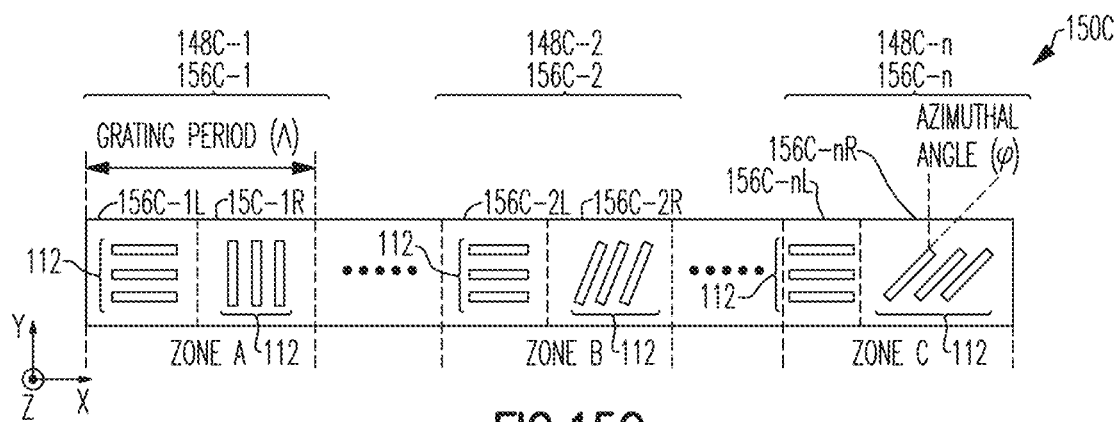

Referring to FIGS. 15A-15C, top-down views (viewed along the x-y plane) of diffraction gratings 150A-150C according to various embodiments are illustrated. Because FIGS. 15A-15C are top down views, only the liquid crystal layers (as opposed to the alignment layer or substrate) are illustrated, while underlying features are not shown. However, it will be understood that the liquid crystal layer of each of the diffraction gratings 150A-150C is formed over a substrate and comprises a plurality of diffracting zones, i.e., diffracting zones 148A-1, 148A-2, . . . and 148A-n in FIG. 15A, diffracting zones 148B-1, 148B-2, . . . and 148B-n in FIG. 15B, and diffracting zones 148C-1, 148C-2, . . . and 148C-n in FIG. 15C.

The diffracting zones of each of the diffraction gratings 150A-150C have a periodically repeating lateral dimension or a grating period $\Lambda$ and include corresponding liquid crystal layers formed of liquid crystal molecules 112. The lateral dimension or the grating A can be similar to those described above with respect to FIGS. 10A-10C.

Analogous to FIGS. 10A-10C, the diffracting zones 148A-1, 148A-2, . . . 148A-n of the diffraction grating 150A have corresponding liquid crystal layers 156A-1, 156A-2, . . . 156A-n, respectively; diffracting zones 148B-1, 148B-2, . . . 148B-n of the diffraction grating 150B have corresponding liquid crystal layers 156B-1, 156B-2, . . . 156B-n, respectively; and diffracting zones 148C-1, 148C-2, . . . 148C-n of the diffraction grating 150C have corresponding liquid crystal layers 156C-1, 156C-2 and 156C-n, respectively. The number of each type of diffracting zones can be similar to those described above with respect to FIGS. 10A-10C. In addition, the diffracting zones as arranged can periodically repeat any suitable number of times.

Each of the liquid crystal layers 156A-1, 156A-2 and 156A-n of the diffraction grating 150A in turn has differently arranged first and second diffracting regions 156A-1L and 156A-1R, 156A-2L and 156A-2R, . . . and 156A-nL and 156A-nR, respectively. Similarly, each of the liquid crystal layers 156B-1, 156B-2 and 156B-n of the diffraction grating 150B in turn has differently arranged first and second diffracting regions 156B-1L and 156B-1R, 156B-2L and 156B-2R, . . . and 156B-nL and 156B-nR, respectively. Similarly, each of the liquid crystal layers 156C-1, 156C-2 and 156C-n of the diffraction grating 150C in turn has differently arranged first and second diffracting regions 156C-1L and 156C-1R, 156C-2L and 156C-2R, . . . and 156C-nL and 156C-nR, respectively.

Analogous to the diffraction gratings 100A-100C described above with respect to FIGS. 10A-10C, each of the different diffracting zones further comprises an alignment layer (not shown) interposed between the substrate and the corresponding liquid crystal layer. That is, while not shown for clarity, interposed between the substrate 104 and differently arranged first/second diffracting regions 156A-1L/156A-1R, 156A-2L/156A-2R, . . . and 156A-nL/156A-nR of the diffraction grating 150A of FIG. 15A are first and second alignment layers 160A-1L/160A-1R, 160A-2L/160A-2R, . . . and 160A-nL/160A-nR, respectively. Similarly interposed between the substrate 104 and differently arranged first/second diffracting regions 156B-1L/156B-1R, 156B-2L/156B-2R, . . . and 156B-nL/156B-nR of the diffraction grating 150C of FIG. 15B are first/second alignment layers 160B-1L/160B-1R, 160B-2L/160B-2R, . . . and 160B-nL/160B-nR, respectively. Similarly, interposed between the substrate 104 and differently arranged first/second diffracting regions 156C-1L/156C-1R, 156C-2L/156C-2R, . . . and 156C-nL/156C-nR of the diffraction grating 150C of FIG. 15C are first/second alignment layers 160C-1L/160C-1R, 160C-2L/160C-2R, . . . and 160C-nL and 160C-nR, respectively.

Still referring to FIGS. 15A-15C, each zone of the diffraction gratings 150A, 150B and 150C include first and second regions that alternate in the x-direction. Each of the first regions 156A-1L, 156A-2L, . . . and 156A-nL of the diffraction grating 150A, each of the first regions 156B-1L, 156B-2L, . . . and 156B-nL of the diffraction grating 150B and each of the first regions 156C-1L, 156C-2L, . . . and 156C-nL of the diffraction grating 150C have liquid crystal molecules 112 that are aligned substantially along the same first alignment direction and have an azimuthal angle φ that is substantially the same. In contrast, each of the second regions 156A-1R, 156A-2R, . . . and 156A-nR of the diffraction grating 150A, each of the second regions 156B-1R, 156B-2R, . . . and 156B-nL of the diffraction grating 150B and each of the second regions 156C-1R, 156C-2R, . . . and 156A-nR of the diffraction grating 150C have liquid crystal molecules 112 that are aligned substantially along a second alignment direction different from the first alignment direction and have a second azimuthal angle φ that is different, e.g., smaller, than the first azimuthal angle φ of the respective first regions.

In each of the diffraction gratings 150A-150C of FIGS. 15A-15C, respectively, at least some of the diffracting zones have liquid crystal layers formed of liquid crystal molecules that are spatially arranged differently, e.g., have azimuthal angles that are different from each other (FIGS. 15A and 15C), or have different duty cycles that are different from each other (FIGS. 15B and 15C), such that the diffracting zones have different optical properties, e.g., different refractive indices and/or different diffraction efficiencies, according to embodiments.

In particular, referring to diffraction grating 150A of FIG. 15A, in addition to having alignment directions and azimuthal angles φ that are different from the first azimuthal angle φ of the first regions 156A-1L, 156A-2L, . . . and 156A-nL, the liquid crystal molecules of the second regions 156A-1R, 156A-2R, . . . and 156A-nR are aligned along second alignment directions that are different from each other. For example, in the illustrated embodiment, the zones 148A-1, 148A-2 and 148A-n are arranged such that the first regions and second regions alternate in the x-direction, where each of the first regions 156A-1L, 156A-2L, . . . and 156A-nL has substantially the same azimuthal angle φ, while the second regions 156A-1R, 156A-2R, . . . and 156A-nR have azimuthal angles φ that are different from each other. By way of example, the first regions 156A-1L, 156A-2L, . . . and 156A-nL have a an azimuthal angles φ that is between about 0 and about 15 degrees or between about 0 and 10 degrees, for instance 0 degrees. The second regions 156A-1R, 156A-2R, . . . and 156A-nR can have azimuthal angles φ that are different from each other, where each can be between about 75 degrees and about 90 degrees, for instance about 90 degrees; between about 60 degrees and about 90 degrees or between about 65 degrees and about 85 degrees, for instance about 75 degree; between about 30 degrees and about 60 degrees or between about 35 degrees and about 55 degrees, for instance about 45 degrees; between about 10 degrees and about 40 degrees or between about 15 degrees and about 35 degrees, for instance about 25 degrees.

Still referring to FIG. 15A, in some embodiments, as illustrated, the second regions 156A-1R, 156A-2R, . . . and 156A-nR can have azimuthal angles φ that vary, e.g., increase or decrease in one direction in a lateral direction, such that a gradient in diffraction properties is created. In other embodiments, the second regions 156A-1R, 156A-2R, . . . and 156A-nR can have azimuthal angles φ that do not vary in one direction in the lateral direction.

Still referring to FIG. 15A, the duty cycle can be between about 10% and about 30%, between about 30% and about 50%, between about 50% and about 70% or between about 70% and about 90%, which in the illustrated embodiment is substantially constant in the x-direction.

Referring now to FIG. 15B, as discussed above, the diffraction grating 150B share some common features as the diffraction grating 150A of FIG. 15A. However, unlike the diffracting grating 150B of FIG. 15A, while the liquid crystal molecules of different second regions 156B-1R, 156B-2R, . . . and 156B-nR have azimuthal angles φ that are different from the first azimuthal angle φ of the first regions 156B-1L, 156B-2L, ... and 156B-nL, they are not aligned differently from each other. For example, in the illustrated embodiment, the zones 148B-1, 148B-2 and 148B-n are arranged such that the first regions and second regions alternate in the x-direction, where each of the first regions 156B-1L, 156B-2L, ... and 156B-nL has substantially the same first azimuthal angle φ, and each of the second regions 156B-1R, 156B-2R, ... and 156B-nR has substantially the same second azimuthal angle φ. The first and second azimuthal angles of the first and second regions can have any of the values discussed above with respect to the diffraction grating 150A of FIG. 15A.

However, unlike the grating 150A of FIG. 15A, the zones 148B-1, 148B-2 and 148B-3 have substantially the same azimuthal angle, e.g., between about 0 to 50 degrees, while having substantially different duty cycles, e.g., between about 40% and about 60%, for instance about 50%; between about 30% and about 50%, for instance about 40% and a duty cycle between about 20% and about 40%, for instance about 30%, respectively, such that the diffraction grating 150B has spatially varying optical properties.

Still referring to FIG. 15B, in some embodiments, as illustrated, the zones can have duty cycles that vary, e.g., increase or decrease in one direction in a lateral direction, such that a gradient in optical properties is created. In other embodiments, the duty cycles do not vary in one direction in the lateral direction.

Referring now to FIG. 15C, the illustrated diffraction grating 150C combines features similar to those described above with respect to the diffraction gratings 150A and 150B of FIGS. 15A and 15B. In particular, the liquid crystal molecules of different second regions 156C-1R, 156C-2R, ... and 156C-nR can have azimuthal angles φ that are different from the first azimuthal angles φ of the first regions 116C-1L, 116C-2L, ... and 116C-nL, and different from each other. In addition, the duty cycle varies between adjacent zones across a lateral direction, e.g., x-direction. The first and second azimuthal angles of the first and second regions can have any of the values discussed above with respect to the diffraction grating 150A of FIG. 15A. In addition, the duty cycle variation between adjacent zones across a lateral direction, e.g., x-direction, can also have values discussed above with respect to the diffraction grating 150B of FIG. 15B.

Referring now to FIG. 16A, a top-down view (x-y plane) of a diffraction grating 160 according to some other embodiments are illustrated, in which azimuthal angles of liquid crystal molecules rotate across a lateral length of a zone. The diffraction grating having such arrangement is sometimes referred a polarization grating. While not shown for clarity, the diffraction grating 160 comprises a substrate and an alignment layer formed thereon, and a plurality of differently arranged diffracting zones 164-1 and 164-2. The diffracting zones 164-1 and 164-2 have corresponding liquid crystal layers 168-1 and 168-2, respectively. Each of the liquid crystal layers liquid crystal layers 168-1 and 168-2 of the diffraction grating 160 in turn has a plurality of differently arranged diffracting regions 168-1a to 168-li and 168-2a to 168-2i, respectively. Each of the plurality of regions 168-1a to 168-1i of the zone 164-1 and each of the plurality of regions 168-2a to 168-2i of the zone 164-2 has liquid crystal molecules 112 that are aligned substantially along the same alignment direction within the same region. Thus, it will be understood that, each of the zones include a stack of liquid crystal molecules stacked in the z-direction.

The liquid crystal molecules 112 of each of the diffracting regions 168-1a to 168-1i of the zone 164-1 and regions 168-2a to 168-2i of the zone 164-2 have substantially the same azimuthal angle φ within the same region. However, the liquid crystal molecules 112 of different diffracting regions have substantially different azimuthal angles. In addition, the liquid crystal molecules 112 of different diffracting regions can have substantially the same or different pre-tilt angle Φ, similar to as described above with respect to FIGS. 13A and 13B.

In the illustrate embodiment, the liquid crystal molecules 112 of each of the diffracting regions 168-1a to 168-li of the zone 164-1 and the corresponding regions 168-2a to 168-2i of the zone 164-2 have substantially the same azimuthal angle φ within the same region. However, distances between adjacent regions are substantially different between the zone 164-1 and the zone 164-2, such that spatially varying diffraction properties are generated, as illustrated in reference to FIG. 16B. Referring to FIG. 16B, a graph 162 schematically showing the azimuthal angle φ as a function of a lateral position x for the diffraction grating 160 in FIG. 16A is illustrated. The x-axis represents a lateral distance in the x-direction and the y-axis represents the azimuthal angle φ. The curves 162-1 and 162-1 represent the azimuthal angle φ as a function of the lateral position x for the zone 164-1 and the zone 164-2, respectively.

Referring back to FIG. 16A, the liquid crystal molecules 112 of the diffracting region 164-1 are arranged such that the rate of change in azimuthal angle φ per a unit of lateral length, i.e., $\Delta\varphi/\Delta x$ in the x-direction, is relatively constant, as illustrated by the curve 162-1 of FIG. 16B. In contrast, the liquid crystal molecules 112 of the diffracting region 164-2 are arranged such that the $\Delta\varphi/\Delta x$ in the x-direction varies substantially across x, as illustrated by the curve 162-2 of FIG. 16B. As a result, the curve 162-2 is characterized by a central region of the zone 164-2 in which the $\Delta\varphi/\Delta x$ varies relatively slowly and end regions of the zone 164-2 in which the $\Delta\varphi/\Delta x$ varies relatively rapidly. As a result, the diffraction properties (including efficiencies and refractive indices) differ from those of the grating with a uniform variation of its azimuthal angle of liquid crystals.

FIGS. 17A-17E illustrate a method for fabricating diffraction gratings having non-uniform azimuthal angles, e.g., diffraction gratings 150A-150C of FIGS. 15A-15C described above, using photo-alignment techniques, according to embodiments. In particular, in the illustrated embodiment, the method uses multiple exposures of the alignment layers prior to deposition of the liquid crystals. In the illustrated method of FIGS. 17A-17E, similar to the method illustrated with respect to FIGS. 11A-11B, a substrate 104 is provided on which a photo-alignment layer 120 is formed.

Figure 17A:
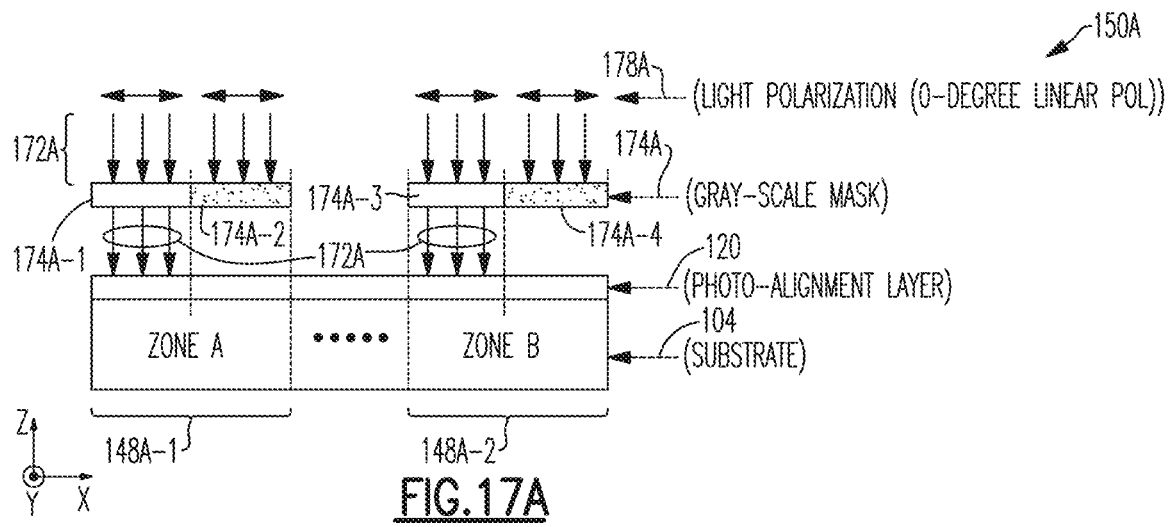
FIGS. 17A-17D illustrate cross-sectional side views of intermediate structures and a diffraction gratings illustrating a method of fabricating the diffraction gratings illustrated in FIGS. 15A-15C, according to embodiments.

Referring to an intermediate structure 150A illustrated in FIG. 17A, after forming the photo-alignment layer 120 on the substrate 104, a first photomask 174A is used to expose different regions of the underlying photo-alignment layer 120 to different doses of light and/or different polarizations of light. For example, different regions of the photo-alignment layer 120 corresponds to first (e.g., left) and second (e.g., right) regions of each of the zones 148A-1 and 148A-2 as described above with respect to the diffraction grating 150A in FIG. 15A.

In some embodiments, the first photomask 174A can be a gray-scale mask having a plurality of mask regions 174A-1-to 174A-4 that are at least partially transparent and possibly have one or more opaque regions. Different one of the plurality of mask regions 174A-1-to 174A-4 may be configured to transmit different doses of a first incident light 172A, such that transmitted light 172A transmitted through different ones of the plurality of mask regions have varying intensities that are proportional to the relative transparency of the different mask regions. In other embodiments, the photomask 174A can be a binary mask having the plurality of mask regions 174A-1-to 174A-4 each being fully or nearly fully transparent or fully or nearly fully opaque, such that transmitted light 172A has binary intensities. In the illustrated example, the first incident light 172A can be polarized, e.g., linearly polarized at a first angle, e.g., 0 degrees, as schematically depicted by polarization vectors 178A, and substantially transmits through the mask regions 174A-1 and 174A-3 corresponding to first (e.g., left) regions of each of the zones 148A-1 and 148A-2 of the diffraction grating 150A as illustrated in FIG. 15A, while substantially being blocked in other regions.

Figure 17B:
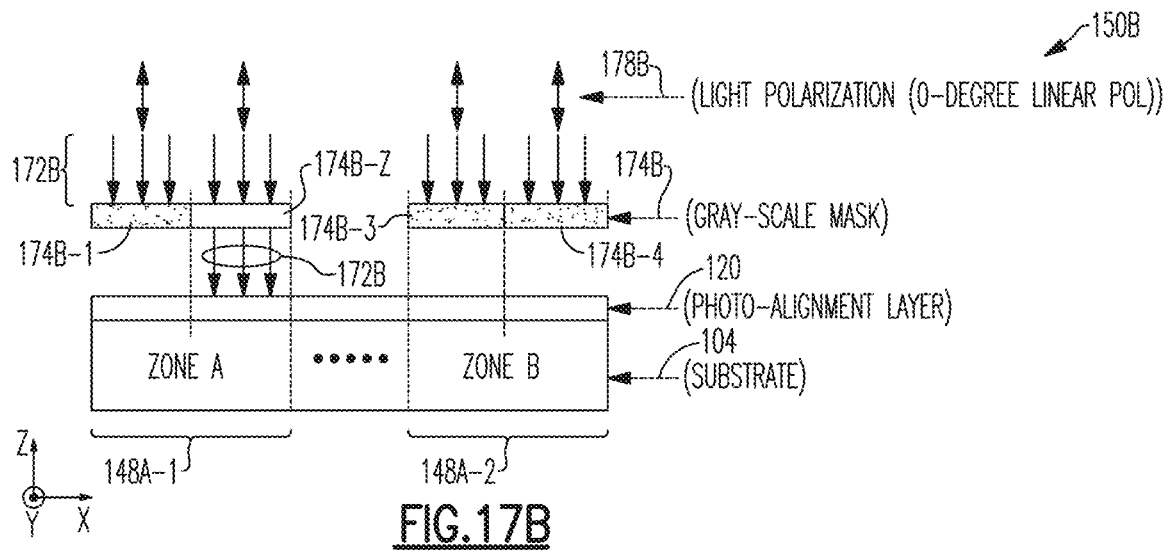

Referring to an intermediate structure 150B illustrated in FIG. 17B, after exposing different regions of the photo-alignment layer 120 to the first incident light 172A, a second photomask 174B is used to expose different regions of the underlying photo-alignment layer 120 to different doses of light and/or different polarizations of light using a second incident light 172B.

In some embodiments, the second photomask 174B can be a gray-scale mask different from the first photomask 174A and having a plurality of mask regions 174B-1-to 174B-4 that are at least partially transparent and possibly have one or more opaque regions. Different ones of the plurality of mask regions 174B-1-to 174B-4 may be configured to transmit different doses of the second incident light 172B. In other embodiments, the photomask 174B can be a binary mask having the plurality of mask regions 174B-1-to 174B-4 each being fully or nearly fully transparent or fully or nearly fully opaque, such that transmitted light 172B has binary intensities. The second incident light 172B can be polarized, e.g., linearly polarized at a second angle different, e.g., orthogonal, from the first polarization angle of the first incident light 178A. For example, the second incident light 172B can be orthogonally linearly polarized relative to the first incident light 172A, e.g., at 90 degrees, as schematically depicted by polarization vectors 178B and substantially transmits through the mask region 174B-2 corresponding to a second (e.g., right) region of the zone 148A-1 of the diffraction grating 150A illustrated in FIG. 15A, while substantially being blocked in other regions.

Figure 17C:
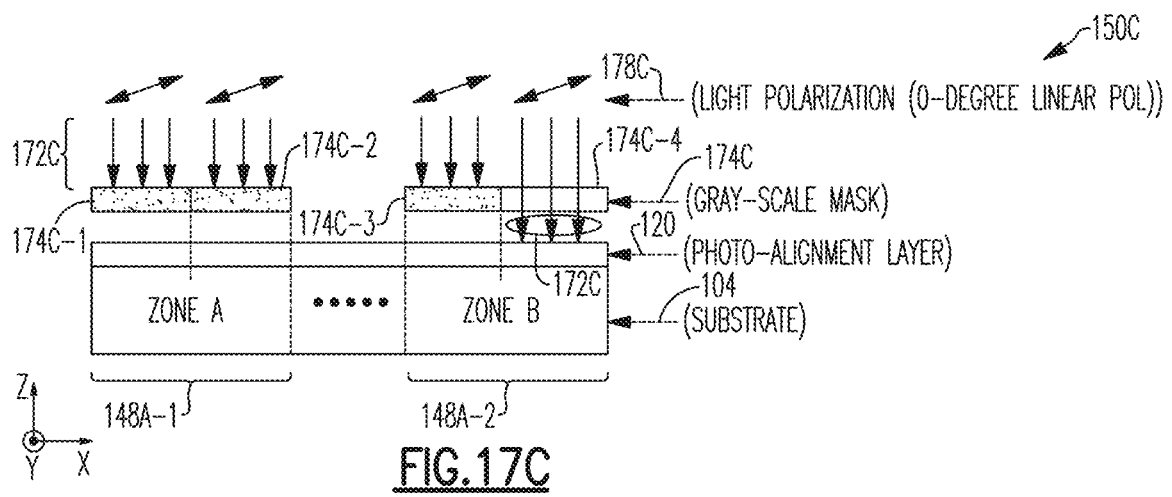

Referring to an intermediate structure in FIG. 17C, after exposing different regions of the photo-alignment layer 120 to the second incident light 172B, a third photomask 174C is used to expose different regions of the underlying photo-alignment layer 120 to different doses of light and/or different polarizations of light using a third incident light 172C.

In some embodiments, the third photomask 174C can be a gray-scale mask different from the first and second photomasks 174A, 174B and having a plurality of mask regions 174C-1-to 174C-4 that are at least partially transparent and possibly have one or more opaque regions. Different ones of the plurality of mask regions 174C-1-to 174C-4 may be configured to transmit different doses of the third incident light 172C. In other embodiments, the photomask 174C can be a binary mask having the plurality of mask regions 174C-1-to 174C-4 each being fully or nearly fully transparent or fully or nearly fully opaque, such that transmitted light 172C has binary intensities. The third incident light 178C can be polarized, e.g., linearly polarized at a third angle different from the first and second polarization angles of the first and second incident lights 178A and 178B. In the illustrated embodiment, the third incident light 172C is linearly polarized at 45 degrees, as schematically depicted by polarization vectors 178C and substantially transmits through the mask region 174A-4 corresponding to a second (e.g., right) region of the zone 148A-2 of the diffraction grating 150A illustrated in FIG. 15A, while substantially being blocked in other regions.

Figure 17D:
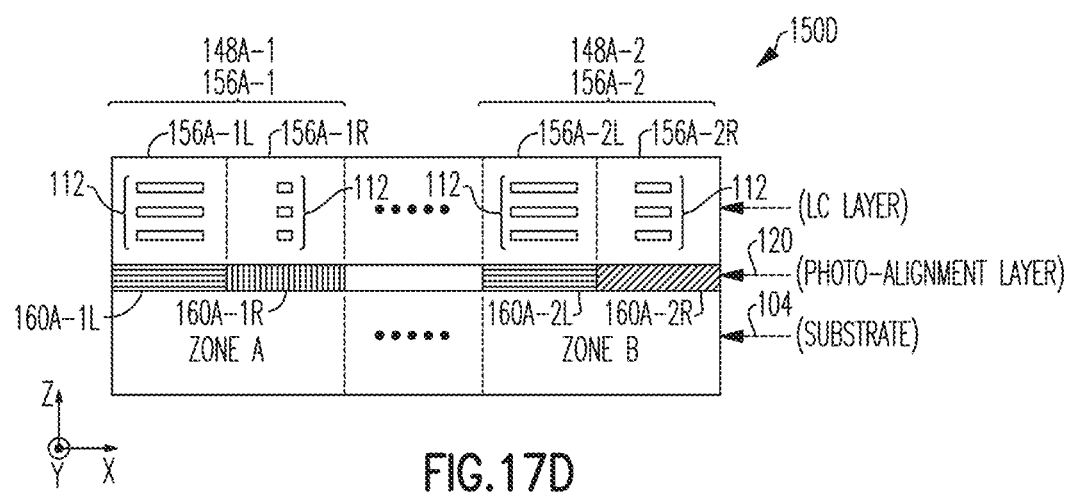

Referring to FIGS. 17D (cross-sectional view) and 17E (top-down view), after exposing different regions of the photo alignment layer 120 through the multi-exposure process described above with respect to FIGS. 17A-17C, a liquid crystal layer can be deposited on the photo alignment layer 120. As a result of the different doses and/or polarizations of light received by different regions of the photo alignment layer 120, differently configured liquid crystal layers 156A-1 and 156A-2 are formed in respective zones 148A-1 and 148A-2, respectively. The liquid crystal layers 156A-1 and 156A-2 have first and second diffracting regions 156A-1L and 156A-1R and 156A-2L and 156A-2R, respectively. As described above with respect to FIG. 15A, the first regions and second regions alternate in the x-direction, where each of the first regions 156A-1L and 156A-2L has substantially the same first azimuthal angle $\varphi$, while the second regions 156A-1R and 156A-2R have azimuthal angles $\varphi$ that are different from each other and from the first azimuthal angle of the first regions. Without being bound to any theory, in some cases, exposure of the underlying photo-alignment layer 120 to light having different polarization angles leads to different azimuthal angles of the liquid crystal molecules.

Figure 17E:
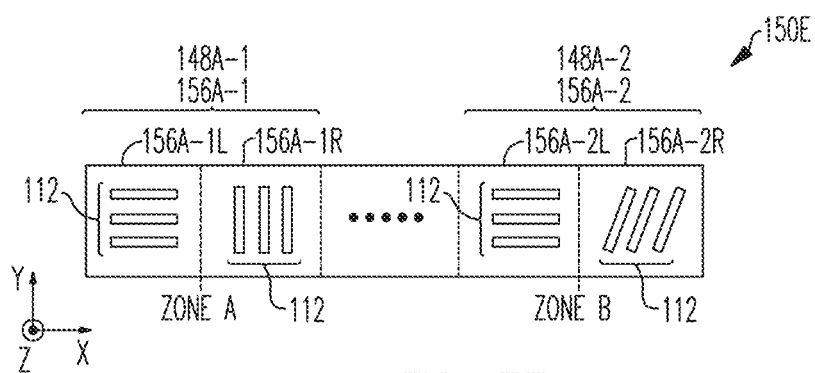
FIG. 17E illustrates a top down plan view of the diffraction grating illustrated in FIG. 17D, according to embodiments.

Still referring to FIGS. 17D and 17E, the azimuthal angle $\varphi$ of the liquid crystal molecules can be determined by the linear polarization angle of the exposure light and the type of photo-alignment layer 120. In the illustrated embodiment, the photo-alignment layer 120 is configured such that the degree of rotation of the liquid crystal molecules, as measured by an absolute value the azimuthal angle $\varphi$ up to +/−90 degrees, is determined by the linear polarization orientation angle of transmitted light received by the underlying alignment layer up to +/−90 degrees. In some embodiments, such as the illustrated embodiment, the photo-alignment layer 120 can be configured such that the liquid crystal molecules are oriented substantially parallel to the polarization direction of the exposure light (e.g., the azimuthal angle $\varphi$ and the linear polarization angle of the exposure light are substantially the same). Embodiments are not so limited, however, and in other embodiments, the photo-alignment layer 120 can be configured such that the liquid crystal molecules are oriented substantially orthogonal to the polarization direction of the exposure light (e.g., the azimuthal angle $\varphi$ and the linear polarization angle of the exposure light are substantially offset by about +/−90 degrees). For example, in the illustrated embodiment, the photo-alignment layers 160A-1L and 160A-2L receive light with the same linear polarization orientation and the photo alignment layer 160A-1R receives light with the larger difference in linear polarization orientation angle with respect to the linear polarization orientation of the photo-alignment layers 160A-1L and 160A-2L, followed by the photo alignment layer 160A-2R. As a result, the resulting azimuthal angles are the same for the first regions 156A-1L and 156A-2L and the difference in the resulting azimuthal angles with respect to the first regions 156A-1L and 156A-2L is larger for the second region 156A-1R than that for the second region 156A-2R In various embodiments described herein, photomasks can comprise linear polarizers such as wire-grid polarizers having a regular array of parallel metallic wires placed in a plane perpendicular to the direction of propagation of the incident light. In some embodiments described herein, the photomasks may be configured to provide illumination having uniform polarization angle across the photo-alignment layer. When comprising wire-grid polarizers, these embodiments may be realized by configuring the array of metallic wires to be uniform across the photomasks, e.g., uniform in the thickness and/or the density of the metallic wires. In other embodiments, the photomasks may be configured to provide illumination having non uniform or having multiple polarization angles across different regions of the photo-alignment layer. When comprising wire-grid polarizers, these embodiments may be realized by configuring the array of metallic wires to be nonuniform and varying across the photomasks, e.g., nonuniform and varying in the thickness and/or the density of the metallic wires. Thus, varying the thickness and density of metallic wires, both the polarization angle and the transmittance of the light can be controlled, according to various embodiments.

FIGS. 18A-18D illustrate another method for fabricating a diffraction grating 160 according to some other embodiments, in which azimuthal angles of liquid crystal molecules rotate across a lateral length of a zone, e.g., polarization grating. In particular, in the illustrated embodiment, the method uses polarization interference holographic exposure using a gray-scale mask, according to embodiments.

Figure 18A:
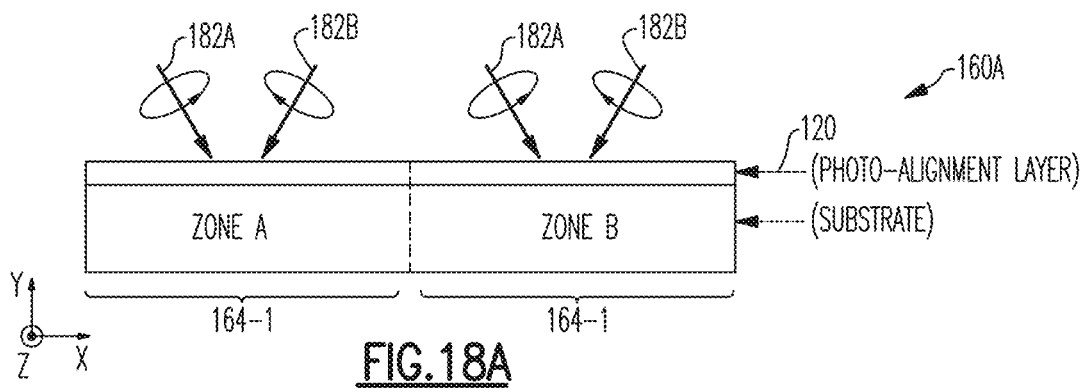
FIGS. 18A-18C illustrate cross-sectional side views of intermediate structures and a diffraction gratings illustrating a method of fabricating the diffraction gratings illustrated in FIG. 16A, according to embodiments.

Referring to FIG. 18A showing an intermediate structure 160A, in the illustrated method, processes leading up to forming the photo-alignment layer 120 to UV light is similar to the method described above with respect to FIGS. 17A-17E. Thereafter, a plurality of coherent light beams 182A, 182B having different polarizations are directed to the plurality of differently arranged diffracting zones 164A-1 and 164A-2. In the illustrated embodiment, the light beams 182A and 182B include orthogonal circular polarized light beams. However, the light beams 182A and 182B can include elliptical polarized light beams, for example. In the illustrated embodiment, both zones 164-1 and 164-2 are unmasked.

Figure 18B:
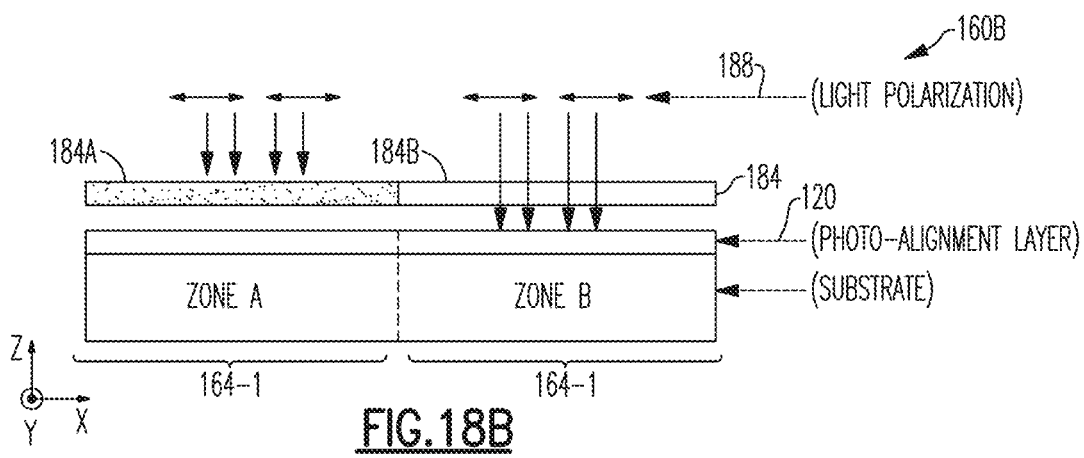

Thereafter, referring to FIG. 18B showing an intermediate structure 160B, a photomask 184 is used to expose different zones of the underlying photo-alignment layer 120 to different doses of light and/or different polarizations of light using a linearly polarized incident light 188 having any polarization angle discussed above with respect to FIGS. 17A-17E. For example, different zones of the photo-alignment layer 120 may correspond to the zones 164-1 and 164-2 as described above with respect to the diffraction grating 160 in FIG. 16B. As a result of the secondary exposure to linearly polarized light 188, a fraction of the photo-alignment layer 120 can be realigned. Without being bound to any theory, when the photo-alignment layer 120 is exposed twice with different linear polarization orientations, the orientations of the liquid crystal molecules can be determined by the relative linear polarization orientations and the exposure doses of two exposures.

Figure 18C:
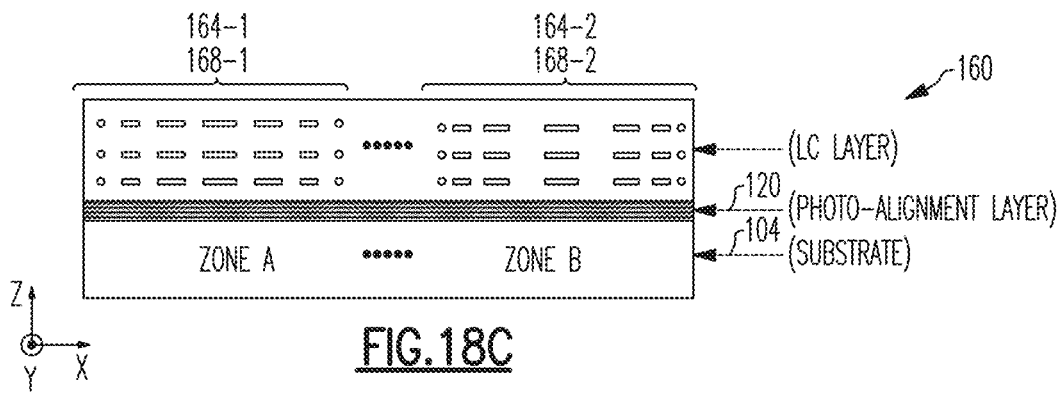
Figure 18D:
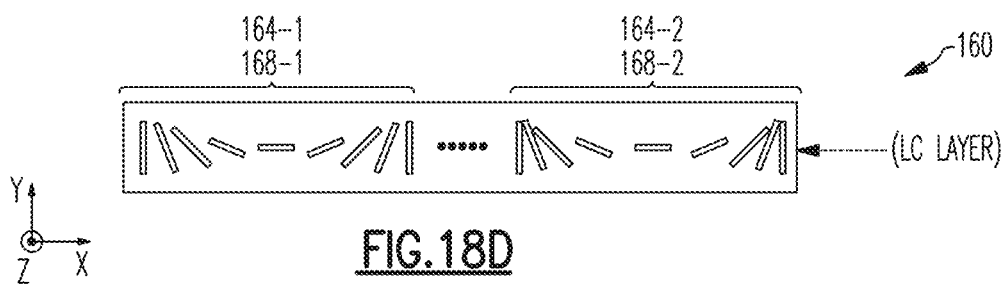
FIG. 18D illustrates a top down plan view of the diffraction grating illustrated in FIG. 18C, according to embodiments.

Referring now to FIGS. 18C and 18D, a cross-sectional view (x-z plane) and a top-down view (x-y plane) of the diffraction grating 160 corresponding to that in FIG. 16B is illustrated. At least in part as a result of the first and second exposures as described above with respect to FIGS. 18A and 18B, liquid crystal layers 168-1 and 168-2 having a plurality of differently arranged diffracting regions 168-1a to 168-1i and 168-2a to 168-2i are generated, respectively. Each of the plurality of regions 168-1a to 168-1i of the zone 164-1 and each of the plurality of regions 168-2a to 168-2i of the zone 164-2 has liquid crystal molecules 112 that are aligned substantially along the same alignment direction within the same region. Thus, it will be understood that, each of the zones include a stack of liquid crystal molecules stacked in the z-direction.

Spatially Variable Liquid Crystal Diffraction Gratings Based on Spatially Varying Liquid Crystal Materials In various embodiments discussed supra, the liquid crystal molecules are fabricated using photo-alignment techniques. However, other embodiments are possible, which can be fabricated with or without photo-alignment.

Referring to FIGS. 19A and 19B, top-down (viewed along the x-y plane) and side (viewed along the x-z plane) views of a diffraction grating 190, which can be fabricated with or without photo-alignment, according to some embodiments are illustrated. The diffraction grating 190 comprises a plurality of diffracting zones, i.e., diffracting zones 198-1, 198-2, . . . and 198-n that have a periodically repeating lateral dimension or a grating period Λ and include corresponding liquid crystal layers formed of liquid crystal molecules 112. The lateral dimension or the grating period Λ can be similar to those described above with respect to FIGS. 10A-10C.

The diffracting zones 198-1, 198-2, . . . 198-n of the diffraction grating 190 have corresponding liquid crystal layers 186-1, 186-2, . . . 186-n, respectively. The number of each type of diffracting zones can be similar to those described above with respect to FIGS. 10A-10C. In addition, the diffracting zones as arranged can periodically repeat any suitable number of times. Each of the liquid crystal layers 186-1, 186-2 and 186-n of the diffraction grating 190 in turn has differently arranged first and second diffracting regions 186-1L and 186-1R, 186-2L and 186-2R, . . . and 186-nL and 186-nR, respectively.

The different liquid crystal layers 186-1, 186-2 and 186-n have liquid crystal molecules 112 that are arranged to have different degrees of chirality. As described above, chirality can be described by a chiral pitch, p, which can refer to the distance over which the liquid crystal molecules undergo a full 360° twist. The chirality can also be characterized by a twist deformation angle, which is an angle of twist the liquid crystal molecules undergo within a thickness of the liquid crystal layer. For example, in the illustrated embodiment, the first liquid crystal layer 186-1 has the first and second diffracting regions 186-1L and 186-1R that have liquid crystal molecules 112 having different azimuthal angles with little or no chirality (very large or infinite chiral pitch p). The second and third liquid crystal layers 186-2 and 186-n have respective first/second diffracting regions 186-2L/186-2R and 186-nL/186-nR, respectively, that have liquid crystal molecules 112 having substantial and substantially different degrees of chirality. Similarly, in various embodiments, the azimuthal angles of or the difference in azimuthal angles between the uppermost liquid crystal molecules in the first and second diffracting regions 186-2L/186-2R and 186-nL/186-nR of the second and nth liquid crystal layers 186-2 and 186-n, respectively, can be any value described above with respect to the diffraction gratings 150A-150C in FIGS. 15A-15C In some embodiments, each pair of first/second diffracting regions within a zone, e.g., the pair of regions 186-2L/186-2R of the zone 198-2 (see FIG. 19A) and the pair of regions 186-nL/186-nR of the zone 198-n have uppermost liquid crystal molecules that have different azimuthal angles φ but have the same chiral pitch p. In some other embodiments, the pairs of regions within zones have uppermost liquid crystal molecules that have the same azimuthal angles φ but have different chiral pitches p. In various embodiments, a chiral twist (e.g., twist angle or twist deformation angle) of the liquid crystal molecules in a given region of the pair of regions 186-2L/186-2R of the zone 198-2 and the pair of regions 186-nL/186-nR of the zone 198-n can be, e.g., about +/−45°, about +/−90°, about +/−135°, or about +/−180°. The corresponding chiral period p can be 8D, 4D, or 3D, where 2D is the thickness of the liquid crystal layers.

For example, in the illustrated embodiment, the uppermost liquid crystal molecules of the first and second regions 186-2L and 186-2R have first and second azimuthal angles φ of, e.g., 135° and 45°, respectively, while having a first chiral pitch, e.g., of about 8D, where D is the thickness of the liquid crystal layers. As a result, in each of the first and second regions 186-2L and 186-2R, the uppermost liquid crystal molecule and the lowermost liquid crystal molecule are twisted relative to each other by about −45 degrees. In addition, in the illustrated embodiment, the uppermost liquid crystal molecules of the first and second regions 186-nL, 186-nR have third and fourth azimuthal angles φ of, e.g., 90° and 0°, respectively, while having a second chiral pitch of about 4D, where D is the thickness of the liquid crystal layers. As a result, in each of the first and second regions 186-nL and 186-nR, the uppermost liquid crystal molecule and the lowermost liquid crystal molecule are twisted relative to each other by about −90 degrees. However, the azimuthal angles φ of uppermost liquid crystal molecules of the first/second diffracting regions 186-2L/186-2R and 186-nL/186-nR can have any value such as described above with respect to FIG. 15A-15C.

Still referring to FIGS. 19A and 19B, in some embodiments, the liquid crystal molecules 112 in each region have the same pre-tilt angle Φ, which can be zero or higher.

Still referring to FIGS. 19A and 19B, the duty cycle of different liquid crystal layers 186-1, 186-2 and 186-n, can be different, and each can be between about 10% and about 30%, between about 30% and about 50%, between about 50% and about 70% or between about 70% and about 90%.

Figure 20:
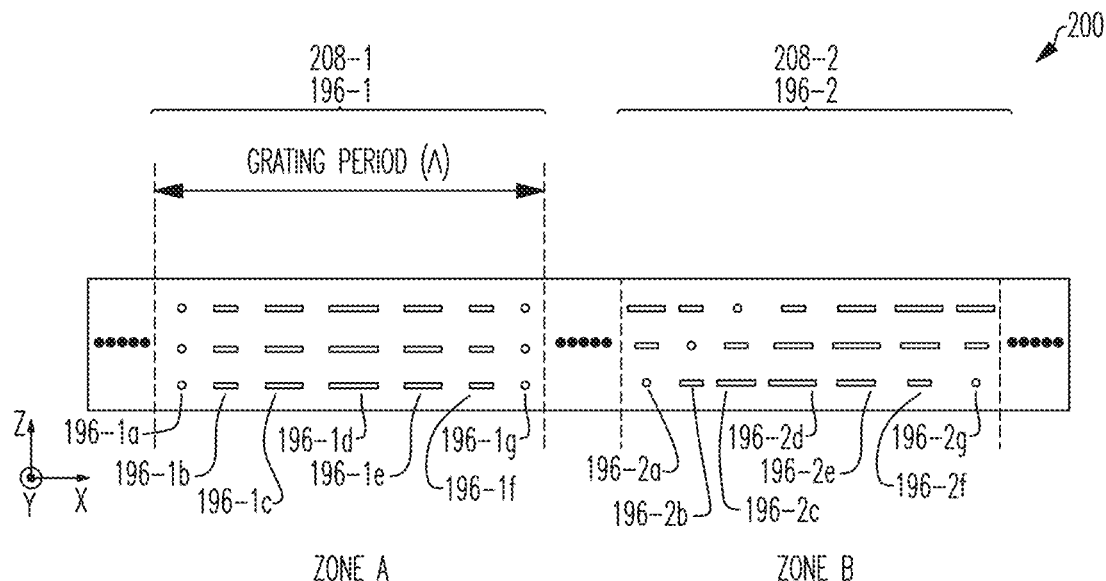
FIG. 20 is a cross-sectional side view of a diffraction grating having zones in which liquid crystal molecules have different chirality, according to embodiments.

Referring now to FIG. 20, cross-sectional side (x-z plane) view of a diffraction grating 200 according to some other embodiments are illustrated. While not shown for clarity, the diffraction grating 200 comprises a substrate and a plurality of differently arranged diffracting zones 208-1 and 208-2 having corresponding liquid crystal layers 196-1 and 196-2, respectively. Each of the liquid crystal layers liquid crystal layers 196-1 and 196-2 of the diffraction grating 200 in turn has a plurality of differently arranged diffracting regions 196-1a through 196-1g and 196-2a through 196-2g, respectively.

Similar to liquid crystal molecules 112 of the liquid crystal layer 186-1 of FIGS. 19A/19B, the liquid crystal molecules 112 of the diffracting regions 196-1a through 196-1g of the liquid crystal layer 196-1 illustrated in FIG. 20 has different azimuthal angles but little or no chirality (very large or infinite chiral pitch p) from layer to layer. The azimuthal angles and other arrangements of adjacent diffracting regions 196-1a through 196-1g are similar to those described with respect to the first and second diffracting regions 186-1L and 186-1R with respect to FIGS. 19A/19B.

Similar to liquid crystal molecules 112 of the liquid crystal layers 186-2 and 186-n of FIGS. 19A/19B, the liquid crystal molecules 112 of the diffracting regions 196-2a through 196-2g of the liquid crystal layer 196-2 illustrated in FIG. 20 have substantial and substantially different degrees of chirality along the length of the zone (along the x direction), and have uppermost liquid molecules that have different azimuthal angles. The azimuthal angles, the chirality and other arrangements of adjacent diffracting regions 196-2a through 196-2g are similar to those described with respect to the first and second diffracting regions 186-2L/186-2R and 186-nL/186-nR of the second and nth liquid crystal layers 186-2 and 186-n.

It will be appreciated that, when a twist is induced to liquid crystal molecules as illustrated above with respect to FIGS. 19A/19B and 20, the resulting diffraction grating exhibits spatially varying diffraction properties, including refractive index and diffraction efficiencies. Some liquid crystal molecules can be made chiral by substituting one or more of the carbon atoms asymmetrically by four different ligands. Other liquid crystal molecules can be made chiral by adding mesogenic or non-mesogenic chiral dopants at varying concentration to one of liquid crystal phases described above. According to embodiments, by adding small concentrations, including, for example, but not limited to below 5%-10% by weight, chirality related effects can be increased with the concentration of the dopant. Some examples of chiral liquid crystal molecules include cholesteryl-benzoate, a ferroelectric liquid crystal N(p-n-Decyloxybenzylidene) p-amino 2-methylbutyl cinnamate (DOBAMBC), and achiral MBBA (4-butyl-N-[4-methoxybenzylidene]-aniline), which is a room temperature nematic, doped with chiral R1011. Other chiral liquid crystal molecules may be used.

Figure 21:
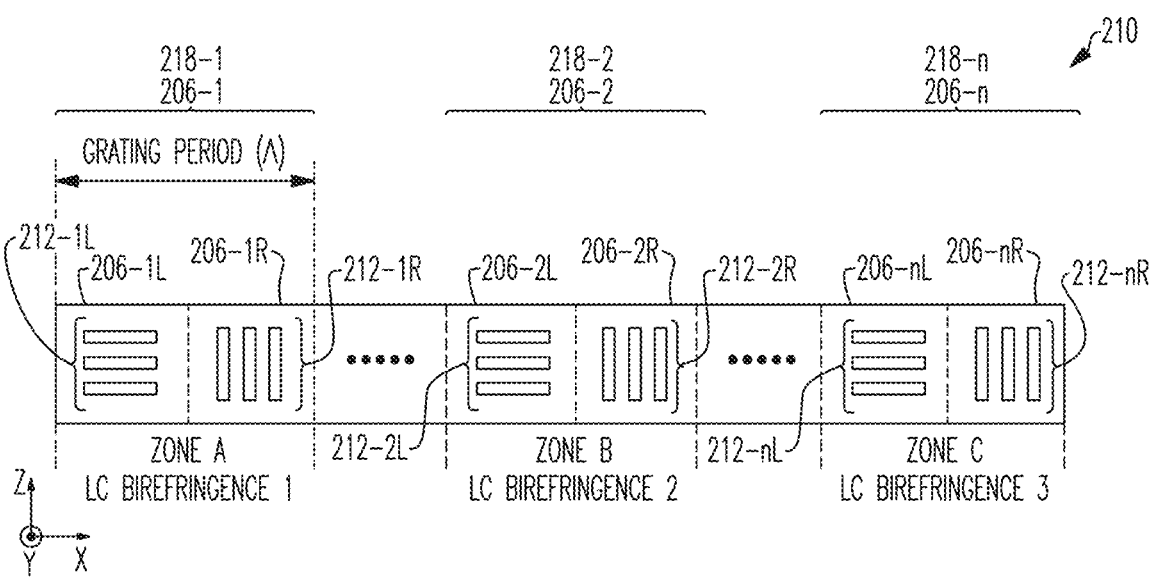
FIG. 21 is a cross-sectional side view of a diffraction grating having zones in which liquid crystal layers are formed of different liquid crystal materials, according to embodiments.

Referring to FIG. 21, a side view (viewed along the x-z plane) of a diffraction grating 210, which can be fabricated with or without photo-alignment, according to some embodiments are illustrated. The diffraction grating 210 comprises a plurality of diffracting zones, i.e., diffracting zones 218-1, 218-2, . . . and 218-n that have a periodically repeating lateral dimension or a grating period Λ in a similar manner to those described above with respect to FIGS. 10A-10C. The diffracting zones 218-1, 218-2, . . . and 218-n of the diffraction grating 210 have corresponding liquid crystal layers 206-1, 206-2, . . . and 206-n, respectively. The number of each type of diffracting zones can be similar to those described above with respect to FIGS. 10A-10C. In addition, the diffracting zones as arranged can periodically repeat any suitable number of times.

In the diffraction grating 210, different liquid crystal layers 206-1, 206-2 and 206-n comprise different liquid crystal materials. In particular, first and second diffracting regions 206-1L and 206-1R, 206-2L and 206-2R, . . . and 206-nL and 206-nR have liquid crystal molecules 212-1L and 212-1R, 212-2L and 212-2R, . . . and 212-nL and 212-nR, respectively which can be the same or different liquid crystal molecules. For example, in some implementations, regions within a first zone can have a first liquid crystal material, regions within a second zone can have a first liquid crystal material and regions within a third zone can have a third liquid crystal material. In other implementations, any given zone can have a first region having a first liquid crystal material and a second region having a second liquid crystal material. Accordingly, the optical properties can be changed along the length of the diffraction grating by changing the composition of the material, for example, using the same host material with different level of the same dopant (or with different dopants with same or different levels), and not necessary changing the orientation of the liquid crystal molecules.

In some embodiments, different zones have different liquid crystal molecules while other aspects of the liquid crystal orientation, e.g., the tilt angle, the azimuthal angle, and chirality as described above are similar or the same between different zones. In some other embodiments, different zones have different liquid crystal molecules while having other aspects of the liquid crystal orientation, e.g., the tilt angle, the azimuthal angle, and chirality that are also different, as discussed supra in the context of various embodiments.

By depositing different liquid crystal materials during deposition or by modifying the liquid crystal material after deposition, local birefringence can be controlled to be different across different zones. In various embodiments, birefringence of individual zones can be between about 0.05 and about 0.15, for instance about 0.10, between about 0.15 and about 0.25, for instance about 0.2, and between about 0.25 and about 0.35, for instance about 0.3.

ADDITIONAL EXAMPLES

In a $1^{st}$ example, a diffraction grating includes a plurality of different diffracting zones having a periodically repeating lateral dimension corresponding to a grating period adapted for light diffraction. The diffraction grating additionally includes a plurality of different liquid crystal layers corresponding to the different diffracting zones. The different liquid crystal layers have liquid crystal molecules that are aligned differently, such that the different diffracting zones have different optical properties associated with light diffraction.

In a $2^{nd}$ example, in the diffraction grating of the $1^{st}$ example, the optical properties include one or more of refractive index, absorption coefficient, diffraction efficiency and birefringence.

In a $3^{rd}$ example, in the diffraction grating of any of the $1^{st}$ to $2^{nd}$ examples, each of the different liquid crystal layers has a plurality of differently arranged regions, wherein the differently arranged regions have liquid crystal molecules that are aligned differently with respect to each other.

In a $4^{th}$ example, in the diffraction grating of any of the $1^{st}$ to $3^{rd}$ examples, each of the different diffracting zones further comprises an alignment layer interposed between a substrate and the corresponding liquid crystal layer, wherein different alignment layers between the different diffracting zones and the substrate are formed of the same material composition, said different alignment layers causing the liquid crystal molecules to be aligned differently in the different diffracting zones.

In a $5^{th}$ example, in the diffraction grating of any of the $1^{st}$ to $4^{th}$ examples, the liquid crystal molecules comprise calamitic liquid crystal molecules that are elongated and aligned along an elongation direction.

In a $6^{th}$ example, in the diffraction grating of any of the $1^{st}$ to $5^{th}$ examples, the different liquid crystal layers include a first region and a second region, wherein liquid crystal molecules of the first region are aligned along a first alignment direction which forms a first alignment angle with respect to a reference direction, and wherein liquid crystal molecules of the second region are aligned along a second alignment direction which forms a second alignment angle with respect to the reference direction, the second alignment angle different from the first alignment angle.

In a $7^{th}$ example, in the diffraction grating of the $6^{th}$ example, liquid crystal molecules of a first region of a first liquid crystal layer and liquid crystal molecules of a corresponding first region of a second liquid crystal layer have substantially the same alignment angle.

In an $8^{th}$ example, in the diffracting grating of the $7^{th}$ example, liquid crystal molecules of a second region of the first liquid crystal layer and liquid crystal molecules of a corresponding second region of the second liquid crystal layer have different alignment angles.

In a $9^{th}$ example, in the diffraction grating of the $6^{th}$ example, liquid crystal molecules of a first region of a first liquid crystal layer and the liquid crystal molecules of a corresponding first region of a second liquid crystal layer have substantially different alignment angles, and wherein liquid crystal molecules of a second region of the first liquid crystal layer and liquid crystal molecules of a corresponding second region of the second liquid crystal layer have different alignment angles.

In a $10^{th}$ example, in the diffraction grating of the $6^{th}$ example, a ratio of lateral widths between first regions and second regions is substantially the same between different zones.

In an $11^{th}$ example, in the diffraction grating of the $6^{th}$ example, liquid crystal molecules of a second region of a first liquid crystal layer and liquid crystal molecules of a second region of a second liquid crystal layer have substantially same alignment angles, and wherein a ratio of lateral widths between the first regions and the second regions is substantially different between different zones.

In a $12^{th}$ example, in the diffraction grating of the $6^{th}$ example, liquid crystal molecules of a second region of a first liquid crystal layer and liquid crystal molecules of a second region of a second liquid crystal layer have different alignment angles, and wherein a ratio of lateral widths between the first regions and the second regions is substantially different between different zones.

In a $13^{th}$ example, in the diffracting grating of the $6^{th}$ example, the first and second alignment angles are pre-tilt angles that are measured in a plane perpendicular to a major surface of a substrate and between respective alignment directions and the major surface.

In a $14^{th}$ example, in the diffraction grating of the $6^{th}$ example, the first and second alignment angles are azimuthal angles that are measured in a plane parallel to a major surface of the substrate and between respective alignment directions and a reference direction parallel to the major surface.

In a $15^{th}$ example, in the diffraction grating of the $3^{rd}$ example, the different liquid crystal layers include a first region and a second region, wherein liquid crystal molecules of the first region are aligned along a plurality of first alignment directions which forms a plurality of first alignment angles with respect to a reference direction, and wherein liquid crystal molecules of the second region are aligned along a plurality of second alignment directions which forms a plurality of second alignment angles with respect to the reference direction.

In a $16^{th}$ example, in the diffraction grating of any of the $1^{st}$ to $15^{th}$ examples, the diffraction grating is a transmissive diffraction grating having a transparent substrate.

In a $17^{th}$ example, in the diffraction grating of any of the $1^{st}$ to $16^{th}$ examples, different diffracting zones comprise different material compositions such that the different diffracting zones have different optical properties associated with light diffraction.

In an $18^{th}$ example, a method of fabricating a diffraction grating includes providing a substrate. The method additionally includes providing a plurality of different diffracting zones having a periodically repeating lateral dimension corresponding to a grating period adapted for light diffraction. The method further includes forming a plurality of different liquid crystal layers comprising liquid crystal molecules over the substrate, the different liquid crystal layers corresponding to the different diffracting zones, wherein forming the different liquid crystal layers comprises aligning the liquid crystal molecules differently, thereby providing different optical properties associated with light diffraction to the different diffracting zones.

In a 19th example, in the method of the 18th example, the method further includes forming a photo-alignment layer on the substrate prior to forming the liquid crystal layers and illuminating the photo-alignment layer thereby causing the liquid crystal molecules formed on the alignment layer to be aligned differently in the different diffracting zone.

In a 20th example, in the method of the 19th example, forming the photo-alignment layer includes depositing a material selected from the group consisting of polyimide, linear-polarization photopolymerizable polymer, azo-containing polymers, courmarine-containing polymers, cinnamate-containing polymers and combinations thereof.

In a 21st example, in the method of any of the 19th and 20th examples, the method further includes, after forming the photo-alignment layer and prior to forming the liquid crystal layers, exposing the different diffracting zones to different doses of light using a gray scale mask.

In a 22nd example, in the method of any of 19th to 21st examples, forming the different liquid crystal layers includes forming a plurality of differently arranged regions in the different liquid crystal layers, wherein the differently arranged regions have liquid crystal molecules that are aligned differently with respect to each other.

In a 23rd example, in the method of the 22nd example, forming the different liquid crystal layers comprises forming a first region and a second region, wherein forming the first region comprises aligning liquid crystal molecules of the first region along a first alignment direction which forms a first alignment angle with respect to a reference direction, and wherein forming the second region comprises aligning liquid crystal molecules of the second region along a second alignment direction which forms a second alignment angle with respect to the reference direction, wherein the second alignment angle different from the first alignment angle.

In a 24th example, in the method of the 23rd example, aligning the liquid molecules of the first and second regions includes forming the respective first and second alignment angles that are inversely proportional to the different doses of light.

In a 25th example, in the methods of any of the 18th to 24th examples, forming the plurality of different liquid crystal layers comprises inducing chirality in at least some of the liquid crystal molecules by adding a chiral dopant to the liquid crystal layers.

In a 26th example, in the method of the 18th example, forming the different liquid crystal layers includes forming a first region and a second region in the liquid crystal layers, wherein liquid crystal molecules of the first region are aligned along a plurality of first alignment directions which forms a plurality of first alignment angles with respect to a reference direction, and wherein liquid crystal molecules of the second region are aligned along a plurality of second alignment directions which forms a plurality of second alignment angles with respect to the reference direction.

In a 27th example, a diffraction grating includes a plurality of contiguous liquid crystal layers extending in a lateral direction and arranged to have a periodically repeating lateral dimension, a thickness and indices of refraction such that the liquid crystal layers are configured to diffract light. Liquid crystal molecules of the liquid crystal layers are arranged differently in different liquid crystal layers along the lateral direction such that the contiguous liquid crystal layers are configured to diffract light with a gradient in diffraction efficiency.

In a 28th example, in the diffraction grating of the 27th example, the liquid crystal layers have a first region and a second region, and wherein the contiguous liquid crystal layers are arranged such that a plurality of first regions and a plurality of second regions alternate in the lateral direction.

In a 29th example, in the diffraction grating of the 28th example, the liquid crystal molecules in the first regions have substantially the same alignment orientation, whereas the liquid crystal molecules in the second regions are have substantially different alignment directions.

In a 30th example, a head-mounted display device is configured to project light to an eye of a user to display augmented reality image content. The head-mounted display device includes a frame configured to be supported on a head of the user. The head-mounted display device additionally includes a display disposed on the frame, at least a portion of said display comprising one or more waveguides, said one or more waveguides being transparent and disposed at a location in front of the user's eye when the user wears said head-mounted display device such that said transparent portion transmits light from a portion of an environment in front of the user to the user's eye to provide a view of said portion of the environment in front of the user, said display further comprising one or more light sources and at least one diffraction grating configured to couple light from the light sources into said one or more waveguides or to couple light out of said one or more waveguides. The diffraction grating includes a plurality of different diffracting zones having a periodically repeating lateral dimension corresponding to a grating period adapted for light diffraction. The diffraction grating additionally includes a plurality of different liquid crystal layers corresponding to the different diffracting zones, wherein the different liquid crystal layers have liquid crystal molecules that are aligned differently, such that the different diffracting zones have different optical properties associated with light diffraction.

In a 31st example, in the device of the 30th example, the one or more light sources include a fiber scanning projector.

In a 32nd example, in the device of any of the 30th to 31st examples, the display is configured to project light into the user's eye so as to present image content to the user on a plurality of depth planes.

In a 33rd example, in the diffraction grating of any of the 30th to 32nd examples, the optical properties include one or more of refractive index, absorption coefficient, diffraction efficiency and birefringence.

In the embodiments described above, augmented reality display systems and, more particularly, spatially varying diffraction gratings are described in connection with particular embodiments. It will be understood, however, that the principles and advantages of the embodiments can be used for any other systems, apparatus, or methods with a need for the spatially varying diffraction grating. In the foregoing, it will be appreciated that any feature of any one of the embodiments can be combined and/or substituted with any other feature of any other one of the embodiments.

Unless the context clearly requires otherwise, throughout the description and the claims, the words "comprise," "comprising," "include," "including" and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," "infra," "supra," and words of similar import, when used in this application, shall refer to this application as a whole and not to any particular portions of this application. Where the context permits, words in the above Detailed Description using the singular or plural number may also include the plural or singular number, respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or whether these features, elements and/or states are included or are to be performed in any particular embodiment.

While certain embodiments have been described, these embodiments have been presented by way of example only, and are not intended to limit the scope of the disclosure. Indeed, the novel apparatus, methods, and systems described herein may be embodied in a variety of other forms; furthermore, various omissions, substitutions and changes in the form of the methods and systems described herein may be made without departing from the spirit of the disclosure. For example, while blocks are presented in a given arrangement, alternative embodiments may perform similar functionalities with different components and/or circuit topologies, and some blocks may be deleted, moved, added, subdivided, combined, and/or modified. Each of these blocks may be implemented in a variety of different ways. Any suitable combination of the elements and acts of the various embodiments described above can be combined to provide further embodiments. The various features and processes described above may be implemented independently of one another, or may be combined in various ways. All suitable combinations and subcombinations of features of this disclosure are intended to fall within the scope of this disclosure.

What is claimed is:

1. A diffraction grating, comprising:
a plurality of different diffracting zones arranged in a continuous layer in a lateral direction substantially parallel to a major surface of a substrate, the different diffracting zones having a same thickness vertically defined by upper and lower surfaces of the continuous layer and having a same lateral dimension corresponding to a grating period adapted for light diffraction,
wherein each of the different diffracting zones is laterally divided into a first region and a second region each comprising liquid crystals, wherein the liquid crystals of the first region are aligned along a first alignment direction which forms a first alignment angle with respect to a reference direction, and wherein the liquid crystals of the second region are aligned along an alignment direction different from the first alignment direction which forms a different alignment angle relative to the first alignment angle,
wherein substantially all of the liquid crystals of the first region between the upper and lower surfaces are permanently aligned in the first alignment direction and substantially all of the liquid crystals of the second region between the upper and lower surfaces are permanently aligned in the second alignment direction, and
wherein the different diffracting zones are arranged differently from each other with respect to arrangements of liquid crystals in corresponding portions of different second regions.

2. The diffraction grating of claim 1, wherein the liquid crystals of the different first regions of the different diffracting zones have substantially the same first alignment angle.

3. The diffraction grating of claim 2, wherein the liquid crystals of different second regions of the different diffracting zones have substantially the same second alignment angle.

4. The diffraction grating of claim 2, wherein the liquid crystals of different second regions of the different diffracting zones have alignment angles that are different from each other.

5. The diffraction grating of claim 1, wherein a ratio of lateral widths between the first region and the second region is substantially the same for different diffracting zones.

6. The diffraction grating of claim 1, wherein a ratio of lateral widths between the first region and the second region is substantially different for different diffracting zones.

7. The diffraction grating of claim 1, wherein the alignment angles are azimuthal angles that are measured in a plane parallel to the major surface of the substrate and between respective alignment directions and a reference direction that is parallel to the major surface.

8. The diffraction grating of claim 1, wherein the alignment angles are pre-tilt angles that are measured in a plane perpendicular to the major surface of the substrate and between respective alignment directions and a reference direction that is normal to the major surface.

9. The diffraction grating of claim 1, wherein liquid crystals of the first region are aligned along a plurality of first alignment directions which form a plurality of first alignment angles with respect to the reference direction, and wherein liquid crystals of the second region are aligned along a plurality of second alignment directions which form a plurality of second alignment angles with respect to the reference direction.

10. The diffraction grating of claim 1, wherein the first regions and the second regions of the different diffracting zones alternate with each other in the lateral direction such that immediately adjacent ones of the first and second regions contact each other without having intervening liquid crystals therebetween.

11. A diffraction grating, comprising:
a plurality of different diffracting zones arranged in a continuous layer in a lateral direction substantially parallel to a major surface of a substrate, the different diffracting zones having a same thickness vertically defined by upper and lower surfaces of the continuous layer and having a same lateral dimension corresponding to a grating period adapted for light diffraction,
wherein each of the different diffracting zones is laterally divided into a first region and a second region each comprising liquid crystals, a combined width of the first and second regions being the same lateral dimension, wherein the liquid crystals of the first region are aligned along a first alignment direction which forms a first alignment angle with respect to a reference direction, and wherein the liquid crystals of the second region are aligned along an alignment direction different from the first alignment direction which forms a different alignment angle relative to the first alignment angle, wherein substantially all of the liquid crystals of the first region between the upper and lower surfaces are permanently aligned in the first alignment direction and substantially all of the liquid crystals of the second region between the upper and lower surfaces are permanently aligned in the second alignment direction, and wherein the different diffracting zones are arranged differently from each other with respect to ratios of lateral widths between respective first and second regions.

12. The diffraction grating of claim 11, wherein the liquid crystals of the different first regions of the different diffracting zones have substantially the same first alignment angle.

13. The diffraction grating of claim 12, wherein the liquid crystals of different second regions of the different diffracting zones have substantially the same second alignment angle.

14. The diffraction grating of claim 12, wherein the liquid crystals of different second regions of the different diffracting zones have alignment angles that are different from each other.

15. The diffraction grating of claim 11, wherein a ratio of lateral widths between the first region and the second region increases along the lateral direction across three or more different diffracting zones.

16. The diffraction grating of claim 11, wherein the alignment angles are azimuthal angles that are measured in a plane parallel to a major surface of the substrate and between respective alignment directions and the reference direction that is parallel to the major surface.

17. The diffraction grating of claim 11, wherein the alignment angles are pre-tilt angles that are measured in a plane perpendicular to a major surface of a substrate and between respective alignment directions and the reference direction that is normal to the major surface.

18. The diffraction grating of claim 11, wherein the first regions and the second regions of the different diffracting zones alternate with each other in the lateral direction such that immediately adjacent ones of the first and second regions contact each other without having intervening liquid crystals therebetween.

* * * * *